United States Patent [19]

Ohara et al.

[11] Patent Number: 4,814,791
[45] Date of Patent: Mar. 21, 1989

[54] LASER BEAM SCANNING METHOD FOR MAINTAINING A LINEAR BEAM INTENSITY OVER THE LED AND LASER OSCILATION REGIONS AND IMPLEMENTING APPARATUS

[75] Inventors: Yuji Ohara; Hideo Watanabe; Takashi Shoji, all of Kanagawa, Japan

[73] Assignee: Fuji Photo Film Co., Ltd., Kanagawa, Japan

[21] Appl. No.: 110,403

[22] Filed: Oct. 20, 1987

[30] Foreign Application Priority Data

| Oct. 20, 1986 | [JP] | Japan | 61-248873 |
| Oct. 20, 1986 | [JP] | Japan | 61-248874 |
| Oct. 20, 1986 | [JP] | Japan | 61-248875 |
| Oct. 20, 1986 | [JP] | Japan | 61-248876 |
| Oct. 20, 1986 | [JP] | Japan | 61-248877 |
| Oct. 20, 1986 | [JP] | Japan | 61-248878 |
| Dec. 29, 1986 | [JP] | Japan | 61-310245 |
| Feb. 19, 1987 | [JP] | Japan | 62-36584 |
| Feb. 19, 1987 | [JP] | Japan | 62-36585 |
| Feb. 19, 1987 | [JP] | Japan | 62-36586 |

[51] Int. Cl.$^4$ .......................... G01D 9/42; H04N 1/23
[52] U.S. Cl. ...................................... 346/108; 358/296
[58] Field of Search ............... 346/1.1, 76 L, 107 R, 346/108, 160; 358/296, 300, 302; 369/116

[56] References Cited

U.S. PATENT DOCUMENTS

| 4,570,251 | 2/1986 | Yokota | 369/116 |
| 4,583,128 | 4/1986 | Anderson | 346/109 |
| 4,698,692 | 10/1987 | Fry | 346/108 |
| 4,727,428 | 2/1988 | Futatsugi | 346/160 |

Primary Examiner—E. A. Goldberg
Assistant Examiner—Mark Reinhart
Attorney, Agent, or Firm—Sughrue, Mion, Zinn, Macpeak & Seas

[57] ABSTRACT

A laser beam recording method and apparatus are constituted for recording a continuous tone image by scanning a laser beam emitted by a semiconductor laser on a photosensitive material by a beam scanning system, and controlling a drive current for the semiconductor laser based on a light emission level instructing signal corresponding to an image signal, thereby to modulate the intensity of the laser beam. The laser beam intensity is detected, and a feedback signal corresponding to the detected intensity is fed back to the light emission level instructing signal. The light emission level instructing signal is corrected by a correction table to compensate for nonlinearity of drive current-optical output characteristics of the semiconductor laser and/or nonlinearity of incident light intensity-optical transmittance characteristics of an optical element of the beam scanning system, thereby to make linear the relationship between the intensity of the laser beam based on the corrected light emission level instructing signal and the uncorrected light emission level instructing signal.

72 Claims, 28 Drawing Sheets

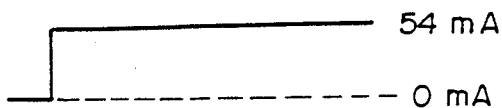
FIG. 7A
APPLIED CURRENT
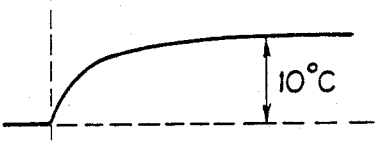
FIG. 7B
CHIP TEMP.
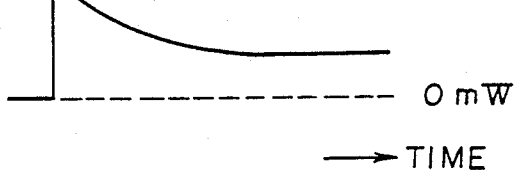
FIG. 7C
OPTICAL OUTPUT
FIG. 8
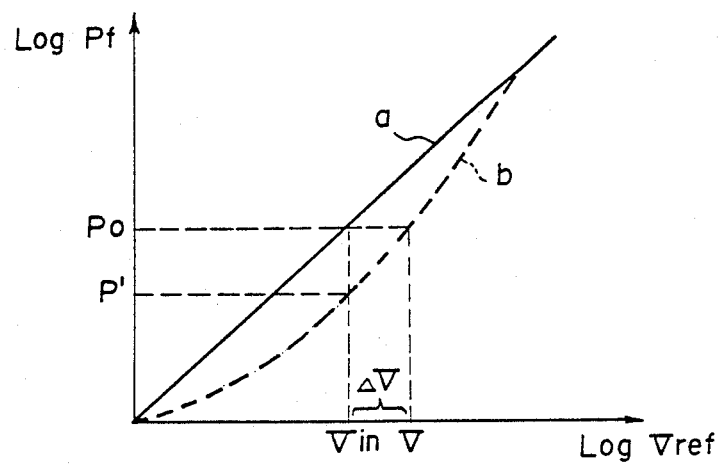

OPTICAL OUTPUT

PEAK HOLD TIMING

PEAK HOLD OUTPUT

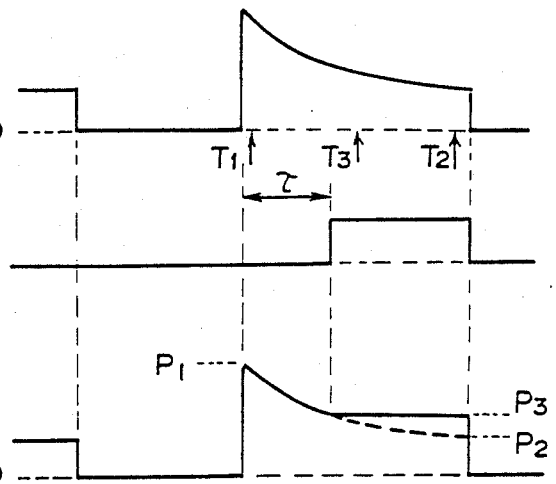
FIG. 35A OPTICAL OUTPUT
FIG. 35B SAMPLE HOLD TIMING
FIG. 35C SAMPLE HOLD TIMING
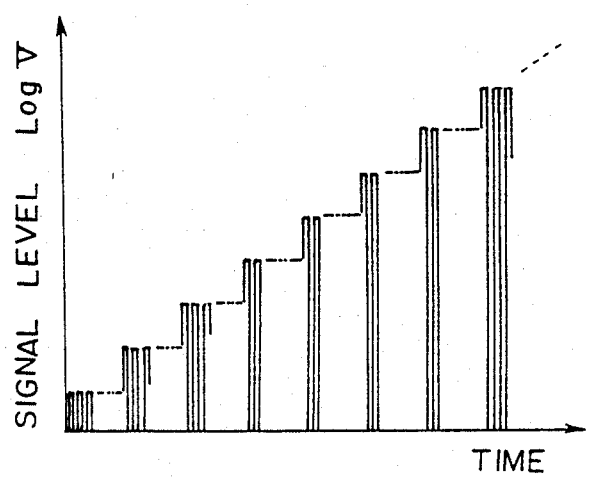
FIG. 38

LASER BEAM SCANNING METHOD FOR MAINTAINING A LINEAR BEAM INTENSITY OVER THE LED AND LASER OSCILATION REGIONS AND IMPLEMENTING APPARATUS

BACKGROUND OF THE INVENTION

1. Field of the Invention

This invention relates to a laser beam recording method for recording a continuous tone image on a photosensitive material by scanning the photosensitive material with a laser beam modulated in accordance with an image signal, and an apparatus for carrying out the method. This invention particularly relates to a laser beam recording method for recording an image of high gradation by analog modulation of the optical intensity of the laser beam, and an apparatus for carrying out the method.

2. Description of the Prior Art

Light beam scanning recording apparatuses wherein a light beam is deflected by a light deflector and scanned on a photosensitive material for recording an image on the photosensitive material have heretofore been used widely. A semiconductor laser is one of the means used for generating a light beam in the light beam scanning recording apparatuses. Ths semiconductor laser has various advantages over a gas laser or the like in that the semiconductor laser is small, cheap and consumes little power, and that the laser beam can be modulated directly by changing the drive current.

FIG. 2 is a graph showing the optical output characteristics of the semiconductor laser with respect to the drive current. With reference to FIG. 2, the optical output characteristics of the semiconductor laser with respect to the drive current change sharply between a LED region (natural light emission region) and a laser oscillation region. Therefore, it is not always possible to apply the semiconductor laser to recording of a continuous tone image. Specifically, in the case where intensity modulation is carried out by utilizing only the laser oscillation region in which the optical output characteristics of the semiconductor laser with respect to the drive current are linear, it is possible to obtain a dynamic range of the optical output of only approximately 2 orders of ten at the most. As is well known, with a dynamic range of this order, it is impossible to obtain a continuous tone image having a high quality.

Accordingly, as disclosed in, for example, Japanese Unexamined Patent Publication Nos. 56(1981)-115077 and 56(1981)-152372, an attempt has been made to obtain a continuous tone image by maintaining the optical output of the semiconductor laser constant, continuously turning on and off the semiconductor laser to form a pulsed scanning beam, and controlling the number or the width of pulses for each picture element to change the scanning light amount.

However, in the case where the pulse number modulation or the pulse width modulation as mentioned above is carried out, in order to obtain a density scale, i.e. a resolution of the scanning light amount, of 10 bits (approximately 3 orders of ten) when the picture element clock frequency is 1 MHz for example, the pulse frequency must be adjusted to be very high (at least 1 GHz). Though the semiconductor laser itself can be turned on and off at such a high frequency, a pulse counting circuit or the like for control of the pulse number or the pulse width cannot generally be operated at such a high frequency. As a result, it becomes necessary to decrease the picture element clock frequency to a value markedly lower than the aforesaid value. Therefore, the recording speed of the apparatus must be decreased markedly.

Also, with the aforesaid method, the heat value of the semiconductor laser chip varies depending on the number or the widths of the pulses which are output during the recording period of each picture element, so that the optical output characteristics of the semiconductor laser with respect to the drive current change, and the exposure amount per pulse fluctuates. As a result, the gradation of the recorded image deviates from the correct gradation, and a continuous tone image of a high quality cannot be obtained.

On the other hand, as disclosed in Japanese Unexamined Patent Publication No. 56(1981)-71374 for example, it has been proposed to record a high-gradation image by combining pulse number modulation or pulse width modulation with optical intensity modulation. However, also with the proposed method, the heat value of the semiconductor laser chip varies depending on the number or the widths of the pulses which are output during the recording period of each picture element, so that the exposure amount per pulse fluctuates.

In view of the above, in order to record a high-gradation image of a density scale of approximately 10 bits, i.e. approximately 1024 levels of gradation, it is desired that a dynamic range of the optical output be adjusted to approximately 3 orders of ten by carrying out optical intensity modulation over the LED region and the laser oscillation region as shown in FIG. 2. However, the optical output characteristics of the semiconductor laser with respect to the drive current are not linear over the two regions. Therefore, in order to control the image density at an equal density interval for a predetermined difference among the image signals so that a high-gradation image can be recorded easily and accurately, it is necessary to make linear the relationship between the light emission level instructing signal and the optical output of the semiconductor laser by compensation of the optical output characteristics of the semiconductor laser with respect to the drive current.

As a circuit for making linear the relationship between the light emission level instructing signal and the optical output of the semiconductor laser, it has heretofore been known to use an optical output stabilizing circuit (an automatic power control circuit, hereinafter abbreviated to the APC circuit) for detecting the optical intensity of a laser beam and feeding back a feedback signal, which corresponds to the detected optical intensity, to the light emission level instructing signal for the semiconductor laser. FIG. 3 is a block diagram showing an example of the APC circuit. The APC circuit will hereinbelow be described with reference to FIG. 3. A light emission level instructing signal Vref for instructing the optical intensity of a semiconductor laser 1 is fed to a voltage-to-current conversion amplifier 3 via an addition point 2. The amplifier 3 feeds a drive current proportional to the light emission level instructing signal Vref to the semiconductor laser 1. A laser beam 4 emitted forward by the semiconductor laser 1 is utilized for scanning a photosensitive material via a scanning optical system (not shown). On the other hand, the intensity of a laser beam 5 emitted rearward from the semiconductor laser 1 is detected by a pin photodiode 6 disposed for optical amount monitoring, for example, in a case housing of the semiconductor laser 1. The intensity of the laser beam 5 thus detected is proportional to the intensity of the laser beam 4 actually utilized for image recording. The output current of the pin photodiode 6 which represents the intensity of the laser beam 5, i.e. the intensity of the laser beam 4, is converted into a feedback signal (voltage signal) Vpd by a current-to-voltage conversion amplifier 7, and the feedback signal Vpd is sent to the addition point 2. From the addition point 2, a deviation signal Ve representing a deviation between the light emission level instructing signal Vref and the feedback signal Vpd is output. The deviation signal Ve is converted into a current signal by the voltage-to-current amplifier 3 and is utilized for operating the semiconductor laser 1.

With the aforesaid APC circuit, the intensity of the laser beam 5 is proportional to the light emission level instructing signal Vref in the case where ideal linearity compensation is effected. Specifically, the intensity Pf of the laser beam 4 (i.e. the optical output of the semiconductor laser 1) utilized for image recording is proportional to the light emission level instructing signal Vref. FIG. 4 is a graph showing the relationship between the light emission level instructing signal Vref and the optical output Pf of the semiconductor laser 1. In FIG. 4, the solid line indicates the ideal relationship between the intensity Pf of the laser beam 4 and the light emission level instructing signal Vref.

With the aforesaid APC circuit, it is comparatively easy to control the operation of the semiconductor laser so that the optical intensity Pf is always maintained at a predetermined level. However, it is not always possible to obtain the characteristics as indicated by the solid line in FIG. 4 in the course of the operation of the semiconductor laser by quickly changing the light emission level instructing signal Vref analog-wise for recording a continuous tone image as mentioned above, particularly in the case where the picture element clock frequency is adjusted to approximately 1 MHz as mentioned above and a high-gradation image of a density scale of approximately 10 bits is to be recorded.

The reasons for the above will be described hereinbelow. The optical output characteristics of the semiconductor laser 1 inserted into the APC circuit as shown in FIG. 3 with respect to the drive current are markedly nonlinear as shown in FIG. 2. FIG. 5 is a graph showing the relationship between optical output of the semiconductor laser 1 and differential quantum efficiency. Specifically, as shown on a logarithmic basis in FIG. 5, the differential quantum efficiency as the gain of the semiconductor laser 1 itself varies sharply between the LED region and the laser oscillation region. Therefore, in order to obtain the characteristics as indicated by the solid line in FIG. 4, it is necessary to adjust the loop gain of the APC circuit shown in FIG. 3 to a very large value. The curves as indicated by the broken lines in FIG. 4 show examples of the optical output characteristics of the semiconductor laser 1 with respect to the light emission level instructing signal, which characteristics vary in accordance with the loop gain. As shown in FIG. 4, in order to obtain the nearly ideal characteristics as indicated by the solid line, a gain of as high as approximately 60 dB is necessary.

Also, FIG. 4 shows the characteristics in the case where the light emission level instructing signal Vref is of a very low frequency that is close to a direct current. However, in the case where the light emission level instructing signal Vref is of a high frequency, different problems further arise as described below. FIG. 6 is a graph showing dependence of the drive current-optical output characteristics of the semiconductor laser as shown in FIG. 2 on the temperature in the case housing of the semiconductor laser. As shown in FIG. 6, when the drive current is constant, the optical output of the semiconductor laser is lower as the temperature in the case housing of the semiconductor laser is higher. In general, in the case where the semiconductor laser is applied to a laser beam recording apparatus or the like, the apparatus is provided with a control means for maintaining the temperature in the case housing of the semiconductor laser at a predetermined value. However, it is impossible to restrict even transitional variations of the temperature of a laser diode chip arising when the drive current is applied to the semiconductor laser. FIGS. 7A, 7B and 7C are explanatory graphs showing the drooping characteristics of the semiconductor laser. Specifically, at the time the drive current is applied step-wise to the semiconductor laser as shown in FIG. 7A, the temperature of the laser diode chip changes transitionally as shown in FIG. 7B until it comes into the steady condition by the aforesaid control for maintaining the temperature in the case housing of the semiconductor laser at a predetermined value. As a result, in accordance with the characteristics as shown in FIG. 6, the optical output of the semiconductor laser changes as shown in FIG. 7C. Such changes in the optical output are referred to as the drooping characteristics of the semiconductor laser. It has been known that, in order to eliminate the nonlinearity of the drive current-optical output characteristics of the semiconductor laser 1 based on the drooping characteristics in the APC circuit as shown in FIG. 3, a loop gain of approximately 10 dB is necessary. Therefore, in order to obtain the light emission level instructing signal-optical output characteristics (linearity) close to the solid line as shown in FIG. 4 while maintaining high response characteristics in the case where signals ranging from a low frequency to a high frequency (for example, 1 MHz) are used as the light emission level instructing signal Vref, a total loop gain of approximately 70 dB (i.e. 60 dB plus 10 dB) is necessary in the laser oscillation region At the present time, it is almost impossible to realize such a high-speed, high-gain APC circuit with the technique.

SUMMARY OF THE INVENTION

The primary object of the present invention is to provide a laser beam recording method wherein optical output characteristics of a semiconductor laser with respect to a light emission level instructing signal are made linear over a LED region and a laser oscillation region even though a high-gain APC circuit is not used, so that a high-gradation image is recorded quickly by optical intensity modulation.

Another object of the present invention is to provide a laser beam recording method wherein scanning beam intensity characteristics of a semiconductor laser with respect to a light emission level instructing signal are made linear over a LED region and a laser oscillation region even though a high-gain APC circuit is not used and even though an optical element such as a polarizing filter, an interference filter or an aperture stop plate is disposed in a beam scanning system, so that a high-gradation image is recorded quickly by optical intensity modulation.

A further object of the present invention is to provide a laser beam recording method wherein scanning beam intensity characteristics of a semiconductor laser with respect to a light emission level instructing signal are made linear over a LED region and a laser oscillation region even though an optical element such as a polarizing filter, an interference filter, an aperture stop plate or a collimator lens is disposed in a beam scanning system, so that a high-gradation image is recorded quickly by optical intensity modulation.

The specific object of the present invention is to provide an apparatus for carrying out the laser beam recording method.

The present invention provides a laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam, wherein the improvement comprises the steps of:
(i) detecting the optical intensity of said laser beam, and feeding back a feedback signal corresponding to the detected optical intensity to said light emission level instructing signal, and
(ii) correcting said light emission level instructing signal by use of a correction table so as to compensate for nonlinearity of optical output characteristics of said semiconductor laser with respect to the drive current, thereby to make linear the relationship between the optical output of said semiconductor laser based on said corrected light emission level instructing signal and said uncorrected light emission level instructing signal.

The laser beam recording method is carried out by an apparatus provided with a semiconductor laser for emitting a laser beam, a beam scanning system for scanning the laser beam on a photosensitive material, and a laser operation control circuit for producing a light emission level instructing signal corresponding to an image signal, and controlling a drive current for the semiconductor laser on the basis of the light emission level instructing signal, thereby to modulate the optical intensity of the laser beam, wherein the improvement comprises providing said laser operation control circuit with:
(i) an optical output stabilizing circuit for detecting the optical intensity of said laser beam, and feeding back a feedback signal corresponding to the detected optical intensity to said light emission level instructing signal, and
(ii) a correction table for correcting said light emission level instructing signal so as to compensate for nonlinearity of optical output characteristics of said semiconductor laser with respect to the drive current, thereby to make linear the relationship between the optical output of said semiconductor laser based on said corrected light emission level instructing signal and said uncorrected light emission level instructing signal.

The present invention also provides a laser beam recording method wherein the improvement comprises the steps of:
(i) detecting the optical intensity of said laser beam, and feeding back a feedback signal corresponding to the detected optical intensity to said light emission level instructing signal, and
(ii) correcting said light emission level instructing signal by use of a correction table so as to compensate for nonlinearity of optical output characteristics of said semiconductor laser with respect to the drive current and nonlinearity of optical transmittance characteristics of an optical element of said beam scanning system with respect to the incident light intensity, thereby to make linear the relationship between the intensity of the scanning beam based on said corrected light emission level instructing signal and said uncorrected light emission level instructing signal.

The second-mentioned laser beam recording method is carried out by an apparatus provided with a semiconductor laser for emitting a laser beam, a beam scanning system for scanning the laser beam on a photosensitive material and comprising an optical element whose optical transmittance characteristics with respect to the incident light intensity are nonlinear, and a laser operation control circuit for producing a light emission level instructing signal corresponding to an image signal, and controlling a drive current for the semiconductor laser on the basis of the light emission level instructing signal, thereby to modulate the optical intensity of the laser beam, wherein the improvement comprises providing said laser operation control circuit with:
(i) an optical output stabilizing circuit for detecting the optical intensity of said laser beam, and feeding back a feedback signal corresponding to the detected optical intensity to said light emission level instructing signal, and
(ii) a correction table for correcting said light emission level instructing signal so as to compensate for nonlinearity of optical output characteristics of said semiconductor laser with respect to the drive current and nonlinearity of the optical transmittance characteristics of said optical element of said beam scanning system with respect to the incident light intensity, thereby to make linear the relationship between the intensity of the scanning beam based on said corrected light emission level instructing signal and said uncorrected light emission level instructing signal.

The present invention further provides a laser beam recording method wherein the improvement comprises the steps of:
(i) detecting the optical intensity of said laser beam, and feeding back a feedback signal corresponding to the detected optical intensity to said light emission level instructing signal,
(ii) correcting said light emission level instructing signal by use of a correction table so as to compensate for nonlinearity of optical output characteristics of said semiconductor laser with respect to the drive current, thereby to make linear the relationship between the optical output of said semiconductor laser based on said corrected light emission level instructing signal and said uncorrected light emission level instructing signal, and
(iii) feeding a test signal whose level changes to said laser operation control circuit, and creating said correction table on the basis of the relationship between the intensity of said laser beam and said test signal at the time said test signal is fed to said laser operation control circuit.

The third-mentioned laser beam recording method is carried out by an apparatus wherein the improvement comprises providing said laser operation control circuit with:
(i) an optical output stabilizing circuit for detecting the optical intensity of said laser beam, and feeding back a feedback signal corresponding to the detected optical intensity to said light emission level instructing signal,
(ii) a correction table for correcting said light emission level instructing signal so as to compensate for nonlinearity of optical output characteristics of said semiconductor laser with respect to the drive current, thereby to make linear the relationship between the optical output of said semiconductor laser based on said corrected light emission level instructing signal and said uncorrected light emission level instructing signal, and
(iii) a table creation means for feeding a test signal whose level changes to said laser operation control circuit, and creating said correction table on the basis of the relationship between the intensity of said laser beam and said test signal at the time said test signal is fed to said laser operation control circuit.

The present invention still further provides a laser beam recording method wherein the improvement comprises the steps of:
(i) detecting the optical intensity of said laser beam, and feeding back a feedback signal corresponding to the detected optical intensity to said light emission level instructing signal,
(ii) correcting said light emission level instructing signal by use of a correction table so as to compensate for nonlinearity of optical output characteristics of said semiconductor laser with respect to the drive current and nonlinearity of optical transmittance characteristics of an optical element of said beam scanning system with respect to the incident light intensity, thereby to make linear the relationship between the intensity of the scanning beam based on said corrected light emission level instructing signal and said uncorrected light emission level instructing signal, and
(iii) feeding a test signal whose level changes to said laser operation control circuit, and creating said correction table on the basis of the relationship between the intensity of said laser beam and said test signal at the time said test signal is fed to said laser operation control circuit.

The fourth-mentioned laser beam recording method is carried out by an apparatus wherein the improvement comprises providing said laser operation control circuit with:
(i) an optical output stabilizing circuit for detecting the optical intensity of said laser beam, and feeding back a feedback signal corresponding to the detected optical intensity to said light emission level instructing signal, p0 (ii) a correction table for correcting said light emission level instructing signal so as to compensate for nonlinearity of optical output characteristics of said semiconductor laser with respect to the drive current and nonlinearity of the optical transmittance characteristics of said optical element of said beam scanning system with respect to the incident light intensity, thereby to make linear the relationship between the intensity of the scanning beam based on said corrected light emission level instructing signal and said uncorrected light emission level instructing signal, and
(iii) a table creation means for feeding a test signal whose level changes to said laser operation control circuit, and creating said correction table on the basis of the relationship between the intensity of said scanning beam and said test signal at the time said test signal is fed to said laser operation control circuit.

The present invention also provides a laser beam recording method wherein the improvement comprises the steps of:
(i) detecting the optical intensity of said laser beam, and feeding back a feedback signal corresponding to the detected optical intensity to said light emission level instructing signal, and
(ii) correcting said light emission level instructing signal by use of a correction table so as to compensate for nonlinearity of optical transmittance characteristics of an optical element of said beam scanning system with respect to the incident light intensity, thereby to make linear the relationship between the intensity of the scanning beam based on said corrected light emission level instructing signal and said uncorrected light emission level instructing signal.

The fifth-mentioned laser beam recording method is carried out by an apparatus wherein the improvement comprises providing said laser operation control circuit with:
(i) optical output stabilizing circuit for detecting the optical intensity of said laser beam, and feeding back a feedback signal corresponding to the detected optical intensity to said light emission level instructing signal, and
(ii) a correction table for correcting said light emission level instructing signal so as to compensate for nonlinearity of the optical transmittance characteristics of said optical element of said beam scanning system with respect to the incident light intensity, thereby to make linear the relationship between the intensity of the scanning beam based on said corrected light emission level instructing signal and said uncorrected light emission level instructing signal.

The present invention further provides a laser beam recording method wherein the improvement comprises the steps of:
(i) detecting the optical intensity of said laser beam after passage through an optical element of said beam scanning system, and feeding back a feedback signal corresponding to the detected optical intensity to said light emission level instructing signal, and
(ii) correcting said light emission level instructing signal by use of a correction table so as to compensate for nonlinearity of optical output characteristics of said semiconductor laser with respect to the drive current and nonlinearity of optical transmittance characteristics of said optical element of said beam scanning system with respect to the incident light intensity, thereby to make linear the relationship between the intensity of the scanning beam based on said corrected light emission level instructing signal and said uncorrected light emission level instructing signal.

The sixth-mentioned laser beam recording method is carried out by an apparatus wherein the improvement comprises providing said laser operation control circuit with:
(i) an optical output stabilizing circuit for detecting the optical intensity of said laser beam after passage through said optical element of said beam scanning system, and feeding back a feedback signal corresponding to the detected optical intensity to said light emission level instructing signal, and (ii) a correction table for correcting said light emission level instructing signal so as to compensate for nonlinearity of optical output characteristics of said semiconductor laser with respect to the drive current and nonlinearity of the optical transmittance characteristics of said optical element of said beam scanning system with respect to the incident light intensity, thereby to make linear the relationship between the intensity of the scanning beam based on said corrected light emission level instructing signal and said uncorrected light emission level instructing signal.

The present invention still further provides a laser beam recording method wherein the improvement comprises the steps of:

(i) detecting the optical intensity of said laser beam, and feeding back a feedback signal corresponding to the detected optical intensity to said light emission level instructing signal, p0 (ii) correcting said light emission level instructing signal by use of a correction table so as to compensate for nonlinearity of optical output characteristics of said semiconductor laser with respect to the dive current and/or nonlinearity of optical transmittance characteristics of an optical element of said beam scanning system with respect to the incident light intensity, thereby to make linear the relationship between the intensity f the laser beam based on said corrected light emission level instructing signal and said uncorrected light emission level instructing signal, and (iii) in the course of feeding a test signal whose level changes to said laser operation control circuit and creating said correction table on the basis of the relationship between the intensity of said laser beam and said test signal at the time said test signal is fed to said laser operation control circuit, controlling so that the temperature in a case housing of said semiconductor laser is maintained at a predetermined temperature lower than a setting temperature at the time of image recording, and measuring the intensity of said laser beam at the time the optical output of said semiconductor laser has converged nearly to a steady condition.

The seventh-mentioned laser beam recording method is carried out by an apparatus wherein the improvement comprises the provision of:

(i) said laser operation control circuit provided with:
 (a) an optical output stabilizing circuit for detecting the optical intensity of said laser beam, and feeding back a feedback signal corresponding to the detected optical intensity to said light emission level instructing signal, and
 (b) a correction table for correcting said light emission level instructing signal so as to compensate for nonlinearity of optical output characteristics of said semiconductor laser with respect to the drive current and/or nonlinearity of the optical transmittance characteristics of an optical element of said beam scanning system with respect to the incident light intensity, thereby to make linear the relationship between the intensity of the laser beam based on said corrected light emission level instructing signal and said uncorrected light emission level instructing signal, (ii) a table creation means for feeding a test signal whose level changes to said laser operation control circuit, and creating said correction table on the basis of the relationship between the intensity of said laser beam and said test signal at the time said test signal is fed to said laser operation control circuit, and (iii) a temperature control means for maintaining the temperature in a case housing of said semiconductor laser at a setting temperature, and changing said setting temperature to a value at the time of image recording and to a value lower than said value at the time of image recording, said table creation means being formed for measuring the intensity of said laser beam at the time the optical output of said semiconductor laser has converged nearly to a steady condition.

The present invention also provides a laser beam recording method wherein the improvement comprises the steps of:

(i) detecting the optical intensity of said laser beam, and feeding back a feedback signal corresponding to the detected optical intensity to said light emission level instructing signal, (ii) correcting said light emission level instructing signal by use of a correction table so as to compensate for nonlinearity of optical output characteristics of said semiconductor laser with respect to the drive current and/or nonlinearity of optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and (iii) in the course of feeding a test signal whose level changes to said laser operation control circuit and creating said correction table on the basis of the relationship between the intensity of said laser beam and said test signal at the time said test signal is fed to said laser operation control circuit, measuring the intensity of said laser beam by applying peak holding to the measurement signal of the intensity of said laser beam in a first period including rise timing of the optical output of said semiconductor laser by input of said test signal and in a second period after the optical output of said semiconductor laser has converged nearly to a steady condition, and creating said correction table on the basis of a laser beam intensity P3 expressed as $$P3 = P2 + k(P1 - P2) \qquad [0.0 < k < 1.0]$$

where P1 denotes the laser beam intensity detected by applying peak holding in said first period, and P2 denotes the laser beam intensity detected by applying peak holding in said second period.

The eighth-mentioned laser beam recording method is carried out by an apparatus wherein the improvement comprises the provision of:

(i) said laser operation control circuit provided with:
 (a) an optical output stabilizing circuit for detecting the optical intensity of said laser beam, and feeding back a feedback signal corresponding to the detected optical intensity to said light emission level instructing signal, and
 (b) a correction table for correcting said light emission level instructing signal so as to compensate for nonlinearity of optical output characteristics of said semiconductor laser with respect to the drive current and/or nonlinearity of the optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and (ii) a table creation means for feeding a test signal whose level changes to said laser operation control circuit, and creating said correction table on the basis of the relationship between the intensity of said laser beam and said test signal at the time said test signal is fed to said laser operation control circuit, said table creation means being formed for measuring the intensity of said laser beam by applying peak holding to the measurement signal of the intensity of said laser beam in a first period including rise timing of the optical output of said semiconductor laser by input of said test signal and in a second period after the optical output of said semiconductor laser has converged nearly to a steady condition, and creating said correction table on the basis of a laser beam intensity P3 expressed as $$P3 = P2 + k(P1 - P2) \quad [0.0 < k < 1.0]$$

where P1 denotes the laser beam intensity detected by applying peak holding in said first period, and P2 denotes the laser beam intensity detected by applying peak holding in said second period.

The present invention further provides a laser beam recording method wherein the improvement comprises the steps of:

(i) detecting the optical intensity of said laser beam, and feeding back a feedback signal corresponding to the detected optical intensity to said light emission level instructing signal, (ii) correcting said light emission level instructing signal by use of a correction table so as to compensate for nonlinearity of optical output characteristics of said semiconductor laser with respect to the drive current and/or nonlinearity of optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and (iii) in the course of feeding a test signal whose level changes to said laser operation control circuit and creating said correction table on the basis of the relationship between the intensity of said laser beam and said test signal at the time said test signal is fed to said laser operation control circuit, measuring the intensity of said laser beam by sample holding the measurement signal of the intensity of said laser beam at the time a period approximately equal to the time constant of transitional temperature increase characteristics of said semiconductor laser has elapsed after the input of said test signal.

The ninth-mentioned laser beam recording method is carried out by an apparatus wherein the improvement comprises the provision of:

(i) said laser operation control circuit provided with:
(a) an optical output stabilizing circuit for detecting the optical intensity of said laser beam, and feeding back a feedback signal corresponding to the detected optical intensity to said light emission level instructing signal, and (b) a correction table for correcting said light emission level instructing signal so as to compensate for nonlinearity of optical output characteristics of said semiconductor laser with respect to the drive current and/or nonlinearity of the optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and (ii) a table creation means for feeding a test signal whose level changes to said laser operation control circuit, and creating said correction table on the basis of the relationship between the intensity of said laser beam and said test signal at the time said test signal is fed to said laser operation control circuit, said table creation means being formed for measuring the intensity of said laser beam by sample holding the measurement signal of the intensity of said laser beam at the time a period approximately equal to the time constant of transitional temperature increase characteristics of said semiconductor laser has elapsed after the input of said test signal.

The present invention still further provides a laser beam recording method wherein the improvement comprises the steps of:

(i) detecting the optical intensity of said laser beam, and feeding back a feedback signal corresponding to the detected optical intensity to said light emission level instructing signal, (ii) correcting said light emission level instructing signal by use of a correction table so as to compensate for nonlinearity of optical output characteristics of said semiconductor laser with respect to the drive current and/or nonlinearity of optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and (iii) in the course of feeding a test signal whose level changes to said laser operation control circuit and creating said correction table on the basis of the relationship between the intensity of said laser beam and said test signal at the time said test signal is fed to said laser operation control circuit, turning on said semiconductor laser pulse-wise with a turn-on period substantially shorter than an optical output change period based on drooping characteristics of said semiconductor laser and in a duty ratio lower than the duty ratio at the time of image recording, and measuring the intensity of said laser beam at the time the optical output of said semiconductor laser has converged nearly to a steady condition.

The tenth-mentioned laser beam recording method is carried out by an apparatus wherein the improvement comprises the provision of:

(i) said laser operation control circuit provided with:
(a) an optical output stabilizing circuit for detecting the optical intensity of said laser beam, and feeding back a feedback signal corresponding to the detected optical intensity to said light emission level instructing signal, and (b) a correction table for correcting said light emission level instructing signal so as to compensate for nonlinearity of optical output characteristics of said semiconductor laser with respect to the drive current and/or nonlinearity of the optical transmittance characteristics of an optical element of said beam scanning system with respect to the incident light intensity, thereby to make linear the relationship between the intensity of the laser beam based on said corrected light emission level instructing signal and said uncorrected light emission level instructing signal, (ii) a table creation means for feeding a test signal whose level changes to said laser operation control circuit, and creating said correction table on the basis of the relationship between the intensity of said laser beam and said test signal at the time said test signal is fed to said laser operation control circuit, and (iii) a pulse drive circuit for turning on said semiconductor laser pulse-wise with a turn-on period substantially shorter than an optical output change period based on drooping characteristics of said semiconductor laser in the course of creation of said correction table, said table creation means being formed for measuring the intensity of said laser beam at the time the optical output of said semiconductor laser has converged nearly to a steady condition.

In the seventh- to tenth-mentioned laser beam recording methods and apparatuses in accordance with the present invention, in the case where both the optical output characteristics of the semiconductor laser with respect to the drive current and the optical transmittance characteristics of the optical element of the beam scanning system with respect to the incident light intensity are to be corrected to be linear, the correction table may be created by measuring the intensity of the laser beam after passage through the optical element and utilizing the results of the measurement. On the other hand, in the case where the optical element whose optical transmittance characteristics with respect to the incident light intensity are nonlinear is not provided and only the optical output characteristics of the semiconductor laser with respect to the drive current are to be corrected to be linear, the measurement of the intensity of the laser beam may be carried out for the laser beam prior to incidence upon the beam scanning system or for the laser beam after incidence upon the beam scanning system.

With the first-, second-, third-, fourth-, seventh-, eighth-, ninth- and tenth-mentioned laser beam recording methods and apparatuses in accordance with the present invention, nonlinearity of the laser beam optical output characteristics or the scanning beam intensity characteristics with respect to the light emission level instructing signal, which nonlinearity is caused by nonlinearity of the optical output characteristics of the semiconductor laser with respect to the drive current and/or nonlinearity of the optical transmittance characteristics of the optical element of the beam scanning system, such as a polarizing filter used for improving convergence of the scanning beam, with respect to the incident light intensity, is eliminated by use of the correction table provided independently of the circuit for stabilizing the optical output of the semiconductor laser. Therefore, even though the loop gain of the closed loop constituted by the optical output stabilizing circuit is adjusted to such a low value that it can be realized with the present technical level, the relationship between the light emission level instructing signal and the optical output of the semiconductor laser or the scanning beam intensity can be made linear over the LED region and the laser oscillation region while the response characteristics are maintained high. Accordingly, image density can be controlled at equal density intervals by changing the level of the image signal by a predetermined amount. Also, the optical output dynamic range of the semiconductor laser, i.e. the exposure amount of the photosensitive material, can be obtained over a wide range of approximately 3 orders of ten, and therefore a very high-gradation, continuous tone image with a density resolution of, for example, approximately 10 bits can be recorded quickly and accurately.

With the fifth-mentioned laser beam recording method and apparatus in accordance with the present invention, nonlinearity of the scanning beam intensity characteristics with respect to the light emission level instructing signal, which nonlinearity is caused by nonlinearity of the optical output characteristics of the semiconductor laser with respect to the drive current, and nonlinearity of the optical transmittance characteristics of the optical element of the beam scanning system with respect to the incident light intensity, is eliminated by the circuit for stabilizing the optical output of the semiconductor laser. Also nonlinearity of the scanning beam intensity characteristics with respect to the light emission level instructing signal, which nonlinearity is caused by nonlinearity of the optical transmittance characteristics of the optical element of the beam scanning system with respect to the incident light intensity, is eliminated by the correction table provided independently of the optical output stabilizing circuit. Therefore, the relationship between the light emission level instructing signal and the scanning beam intensity can be made linear over the LED region and the laser oscillation region while the response characteristics are maintained high. Accordingly, the same effects as mentioned above can be achieved.

With the fifth-mentioned laser beam recording method and apparatus in accordance with the present invention, nonlinearity of the scanning beam intensity characteristics with respect to the light emission level instructing signal, which nonlinearity is caused by nonlinearity of the optical output characteristics of the semiconductor laser with respect to the drive current and nonlinearity of the optical transmittance characteristics of the optical element of the beam scanning system with respect to the incident light intensity, is eliminated by the circuit for stabilizing the optical output of the semiconductor laser and by the correction table provided independently of the optical output stabilizing circuit. Therefore, even though the loop gain of the closed loop constituted by the optical output stabilizing circuit is adjusted to such a low value that it can be realized with the present technical level, the relationship between the light emission level instructing signal and the scanning beam intensity can be made linear over the LED region and the laser oscillation region while the response characteristics are maintained high. Accordingly, the same effects as mentioned above can be achieved.

Also, with the second-, fourth-, fifth-, sixth-, seventh-, eighth, ninth- and tenth-mentioned laser beam recording methods and apparatuses, the optical element such as a polarizing filter, an interference filter, an aperture stop plate or a collimator lens can be disposed in the beam scanning system without giving rise to any problem with regard to control of the image density. Therefore, the scanning beam can be converged into a minute spot by use of the optical element, and an image of high sharpness can be recorded.

Also, with the third-, fourth-, seventh-, eighth-, ninth- and tenth-mentioned laser beam recording methods and apparatuses wherein the means for creating the correction table is provided, the correction table can be re-created when necessary. Therefore, even though the performance of the semiconductor laser changes with the passage of time for example, an appropriate correction table can always be recreated by compensating for such changes, and the condition for achieving accurate recording can be maintained for a long period.

Further, with the seventh-mentioned laser beam recording method and apparatus in accordance with the present invention, wherein the temperature in the case housing of the semiconductor laser is controlled to be lower than the value at the time of image recording and the intensity of the scanning beam is measured at the time the optical output of the semiconductor laser has converged to the steady condition in the course of the creation of the correction table, the correction table capable of accurately eliminating the aforesaid nonlinearity can be obtained, and the recording accuracy can be increased substantially. The effects will hereinbelow be described in detail. When the test signal is fed to the laser operation control circuit for the creation of the correction table, the intensity of the laser beam corresponding to the value of each test signal is obtained. In this case, since the semiconductor laser has the drooping characteristics as mentioned above with reference to FIGS. 7A, 7B and 7C, the intensity of the laser beam changes transitionally until it converges to the steady condition. Since the transitional changes arise, it is desired that measurement timing for the intensity of the scanning beam in the course of creation of the correction table coincides with the timing of recording of a single picture element in the course of image recording. Specifically, creation of the correction table by use of the test signal is carried out based on the relationship between the level of the light emission level instructing signal and the intensity of the laser beam obtained therewith when no correction with the correction table is effected. Therefore, in the case where a laser beam intensity Px is obtained when image recording is carried out by feeding the light emission level instructing signal of a value Vx without effecting the aforesaid correction, the laser beam intensity of Px must be obtained with the test signal of the value Vx also in the course of creation of the correction table.

However, at the present time, it is almost impossible to make the aforesaid measurement timing and the aforesaid recording timing coincide with each other. Therefore, in the case where the optical output characteristics of the semiconductor laser in the course of image recording change as indicated by the solid line in FIG. 29, the temperature of the case housing of the semiconductor laser in the course of creation of the correction table is controlled to be lower than the temperature of the semiconductor laser case at the time of image recording. As a result, the optical output in the course of creation of the correction table changes as indicated by the broken line in FIG. 29 (see also FIG. 6). Accordingly, when the intensity of the scanning beam is measured at the time the optical output of the semiconductor laser has converged nearly to the steady condition in this case, the measured intensity of the scanning beam is, as indicated by the arrow A in FIG. 29, equivalent to the value obtained by measuring the laser beam intensity midway during transitional changes thereof at the time of image recording without correction. Thus regardless of whether the timing of recording of a single picture element is early as indicated by T1 in FIG. 29 in the transitional change period or is late as indicated by T3 at which the optical output has converged to or nearly to the steady condition, the laser beam intensity obtained with a level of the light emission level instructing signal in the course of creation of the correction table is not so much different from the laser beam intensity obtained with the same level of the light emission level instructing signal in the course of image recording without correction. Also, in the case where the timing of recording of a single picture element is at T2 in FIG. 29, the laser beam intensity obtained with a level of the light emission level instructing signal in the course of creation of the correction table almost coincides with the laser beam intensity obtained with the same level of the light emission level instructing signal in the course of image recording without correction.

In order to obtain the aforesaid effects more reliably, measurement of the laser beam intensity in the course of creation of the correction table should preferably be carried out at the time the transitional change amount of the laser beam intensity in the course of recording of a single picture element reaches ½ of the overall change amount.

Also, with the eighth-, ninth- and tenth-mentioned laser beam recording methods and apparatuses in accordance with the present invention, wherein the correction table is created based on the intensity of the laser beam corresponding to the intensity of the laser beam which is changing based on the drooping characteristics of the semiconductor laser at the time of image recording without correction in the course of the creation of the correction table, the correction table capable of accurately eliminating the aforesaid nonlinearity can be obtained, and the recording accuracy can be increased substantially.

With the eighth-mentioned laser beam recording method and apparatus in accordance with the present invention, wherein the correction table is created based on the laser beam intensity P3 expressed as P3=P2+k(P1−P2), a correction table capable of very accurately eliminating the aforesaid nonlinearity can be obtained. The effects will hereinbelow be described in detail. In the case where the optical output of the semiconductor laser, i.e. the intensity of the laser beam, changes as shown in FIG. 32A, peak holding is applied as shown in FIG. 32B in the course of creation of the correction table, and the laser beam intensity P1 and the laser beam intensity P2 are detected. As shown in FIG. 32C, the laser beam intensity P1 and the laser beam intensity P2 thus detected respectively represent the maximum value and the minimum value of the laser beam intensity changing based on the droop characteristics. Therefore, the value of P3=P2+k(P1−P2) where 0.0<k<1.0 corresponds to the laser beam intensity as measured midway during transitional changes in the course of image recording without correction.

Therefore, regardless of whether the timing of recording of a single picture element is early as indicated by T1 in FIG. 32A in the transitional change period or is late as indicated by T3 at which the optical output has converged to or nearly to the steady condition, the laser beam intensity obtained with a level of the light emission level instructing signal in the course of creation of the correction table is not so much different from the laser beam intensity obtained with the same level of the light emission level instructing signal in the course of image recording without correction. Also, in the case where the timing of recording of a single picture element is at T2 in FIG. 32A, the laser beam intensity obtained with a level of the light emission level instructing signal in the course of creation of the correction table almost coincides with the laser beam intensity obtained with the same level of the light emission level instructing signal in the course of image recording without correction.

Also in this case, in order to obtain the aforesaid effects more reliably, measurement of the laser beam intensity in the course of creation of the correction table should preferably be carried out at the time the transitional change amount of the laser beam intensity in the course of recording of a single picture element reaches ½ of the overall change amount.

With the ninth-mentioned laser beam recording method and apparatus in accordance with the present invention, wherein the intensity of the laser beam is measured in the course of creation of the correction table by sample holding the measurement signal of the laser beam intensity at the time a period approximately equal to the time constant of transitional temperature increase characteristics of the semiconductor laser has elapsed after the input of the test signal, a correction table capable of very accurately eliminating the aforesaid nonlinearity can be obtained. The effects will hereinbelow be described in detail. In the case where the optical output of the semiconductor laser, i.e. the intensity of the laser beam, changes as shown in FIG. 35A, the measurement signal of the laser beam intensity is sample-held as shown in FIG. 35B at the time a period approximately equal to the time constant of transitional temperature increase characteristics of the semiconductor laser has elapsed after the input of the test signal in the course of creation of the correction table. As shown in FIG. 35C, the sample-held signal represents a value P3 slightly smaller than the median value between the maximum value P1 and the minimum value P2 of the laser beam intensity changing based on the drooping characteristics. More specifically, the optical output change characteristics of the semiconductor laser correspond to the transitional temperature increase characteristics thereof, and therefore the laser beam intensity P3 at the time a period equal to the aforesaid time constant has elapsed is expressed as $$P3 = P2 + (P1 - P2) \times 0.4.$$

Thus the laser beam intensity P3 is equal to a value larger than the minimum value P2 by approximately 40% of the change width (P1−P2) of the laser beam intensity. Also, it has been found that the optical output undershoots when the applied current is cut off stepwise after the optical output of the semiconductor laser has converged to the steady condition, and normally the extent of the undershooting is approximately 20% of the change width (P1−P2). Therefore, the laser beam intensity P3 is approximately equal to the median of the change width of the laser beam intensity with the drooping characteristics and the undershooting taken into consideration.

In the case where the correction table is created based on the laser beam intensity P3, regardless of whether the timing of recording of a single picture element is early as indicated by T1 in FIG. 35A in the transitional change period or is late as indicated by T3 at which the optical output has converged to or nearly to the steady condition, the laser beam intensity obtained with a level of the light emission level instructing signal in the course of creation of the correction table is not so much different from the laser beam intensity obtained with the same level of the light emission level instructing signal in the course of image recording without correction. Also, in the case where the timing of recording of a single picture element is at T2 in FIG. 35A, the laser beam intensity obtained with a level of the light emission level instructing signal in the course of creation of the correction table almost coincides with the laser beam intensity obtained with the same level of the light emission level instructing signal in the course of image recording without correction.

With the tenth-mentioned laser beam recording method and apparatus in accordance with the present invention, wherein the semiconductor laser is turned on pulsewise with a turn-on period substantially shorter than the optical output change period based on the drooping characteristics of the semiconductor laser and the intensity of the laser beam is measured at the time the optical output of the semiconductor laser has converged nearly to the steady condition in the course of creation of the correction table, a correction table capable of very accurately eliminating the aforesaid nonlinearity can be obtained. The effects will hereinbelow be described in detail. In the case where the optical output of the semiconductor laser, i.e. the intensity of the laser beam, changes as shown in FIG. 29 in the course of image recording wherein the semiconductor laser is turned on continuously for example (the duty ratio is 100% in this case), the semiconductor laser is turned on pulse-wise as mentioned above in the course of creation of the correction table, so that the chip temperature of the semiconductor laser decreases to a value lower than in the course of image recording. At the time the chip temperature of the semiconductor laser thus decreases, the optical output changes as indicated by the broken line in FIG. 29. Accordingly, when the intensity of the scanning beam is measured at the time the optical output of the semiconductor laser has converged nearly to the steady condition in this case, the measured intensity of the scanning beam is, as indicated by the arrow A in FIG. 29, equivalent to the value obtained by measuring the laser beam intensity midway during transitional changes thereof at the time of image recording without correction. Thus the same effects as mentioned above with reference to FIG. 29 for the seventh-mentioned laser beam recording method and apparatus can be obtained.

Also in this case, in order to obtain the aforesaid effects more reliably, measurement of the laser beam intensity in the course of creation of the correction table should preferably be carried out at the time the transitional change amount of the laser beam intensity in the course of recording of a single picture element reaches ½ of the overall change amount.

BRIEF DESCRIPTION OF THE DRAWINGS

FIGS. 7A, 7B and 7C are explanatory graphs showing the drooping characteristics of the semiconductor laser, FIG. 8 is an explanatory graph showing the effects of the V-P characteristics correction table in the embodiment shown in FIG. 1, FIGS. 35A, 35B and 35C are explanatory views showing the effects of the ninth laser beam recording apparatus in accordance with the present invention, FIG. 38 is a graph showing the wave form of the test signal generated by the table creation means in the embodiment shown in FIG. 37.

DESCRIPTION OF THE PREFERRED EMBODIMENTS

The present invention will hereinbelow be described in further detail with reference to the accompanying drawings.

Figure 1:
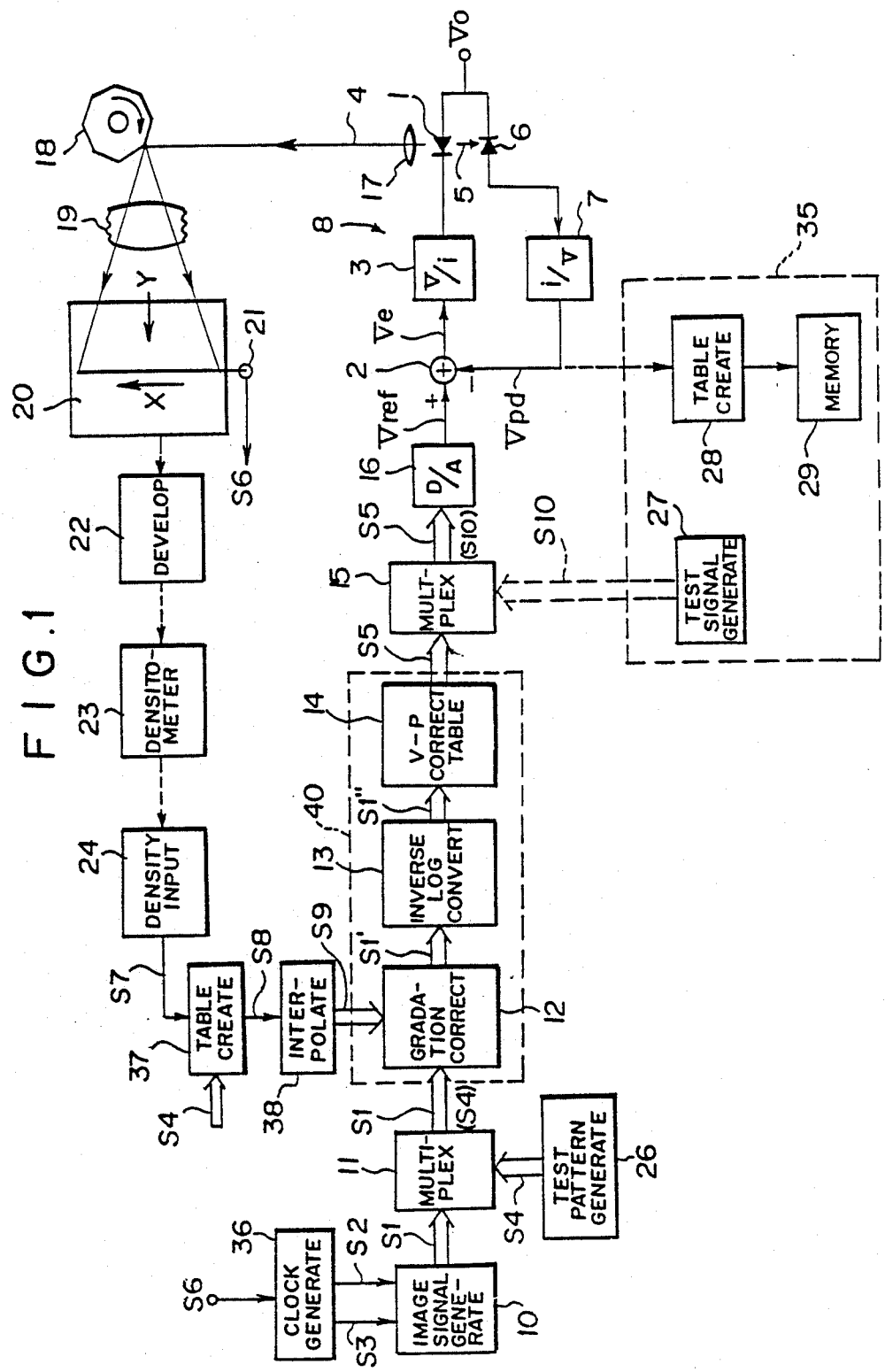
FIG. 1 is a schematic view showing an embodiment of the first laser beam recording apparatus in accordance with the present invention.
Figure 2:
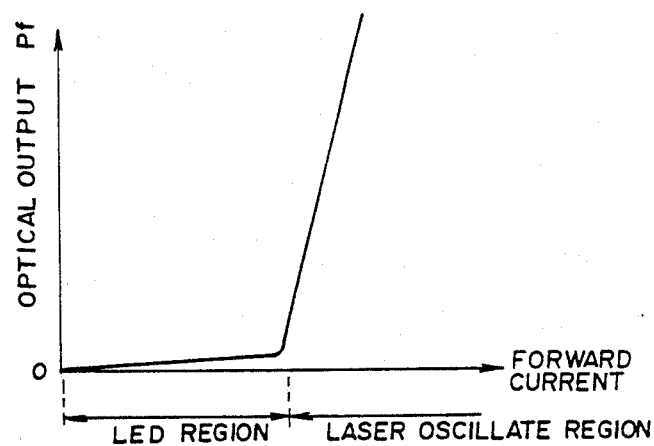
FIG. 2 is a graph showing the optical output characteristics of a semiconductor laser with respect to the drive current.

Referring to FIG. 1, an image signal generator 10 generates an image signal S1 representing a continuous tone image. By way of example, the image signal S1 is a digital signal representing a continuous tone image of a density scale of 10 bits. The image signal generator 10 changes over the signal for a single main scanning line on the basis of a line clock S2 as will be described later, and outputs the image signal S1 at each picture element based on a picture element clock S3. In this embodiment, the picture element clock frequency is adjusted to 1 MHz. In other words, the recording time for a single picture element is adjusted to 1 $\mu$sec.

Figure 3:
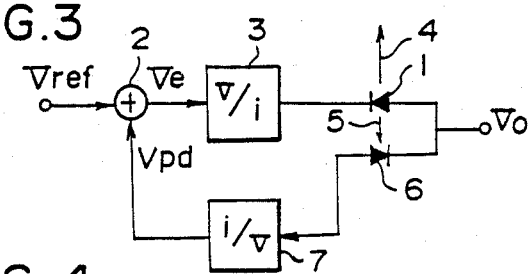
FIG. 3 is a block diagram showing an example of the circuit for stabilizing the optical output of the semiconductor laser.

The image signal S1 is corrected as will be described below by a correction table 40 comprising a RAM via a multiplexer 11, and is converted into a light emission level instructing signal S5 of 16 bits for example. The light emission level instructing signal S5 is fed to a multiplexer 15 and then to a D/A converter 16, and is converted by the D/A converter 16 into a light emission level instructing signal Vref composed of an analog voltage signal. The light emission level instructing signal Vref is fed to an addition point 2 of an APC circuit 8. The addition point 2, a voltage-to-current conversion amplifier 3, a semiconductor laser 1, a photodiode 6, and a current-to-voltage conversion amplifier 7 of the APC circuit 8 are equivalent to the ones in the circuit mentioned above with reference to FIG. 3. Therefore, a laser beam 4 of an intensity corresponding to the light emission level instructing signal Vref, i.e. to the image signal S1, is emitted by the semiconductor laser 1. The laser beam 4 is collimated by a collimator lens 17, and is then reflected and deflected by a light deflector 18 constituted by a polygon mirror or the like. The laser beam 4 thus deflected is passed through a converging lens 19 normally constituted by an f$\theta$ lens, is converged into a minute spot on a photosensitive material 20, and scans the photosensitive material 20 in a main scanning direction as indicated by the arrow X. The photosensitive material 20 is moved by a movement means (not shown) in a sub-scanning direction as indicated by the arrow Y approximately normal to the main scanning direction X, and thus is scanned with the laser beam 4 in the sub-scanning direction Y. In this manner, the photosensitive material 20 is two dimensionally scanned with and exposed to the laser beam 4. Since the laser beam 4 is intensity modulated based on the image signal S1 as mentioned above, the continuous tone image which the image signal S1 represents is recorded as a photographic latent image on the photosensitive material 20. When the laser beam 4 scans on the photosensitive material 20, passage of the laser beam 4 over a start point of the main scanning is detected by a photodetector 21, and a start point detection signal S6 generated by the photodetector 21 is fed to a clock generator 36. The clock generator 36 outputs the aforesaid line clock S2 and the picture element clock S3 in synchronization with the input timing of the start point detection signal S6.

Then, the photosensitive material 20 is sent to a developing machine 22 and is subjected to development processing. Thus the continuous tone image is developed as a visible image on the photosensitive material 20.

Correction of the image signal S1 by the correction table 40 will be described hereinbelow. The correction table 40 comprises a gradation correction table 12, an inverse logarithmic conversion table 13, and a correction table 14 (hereinafter referred to as the V-P characteristics correction table) for making linear the optical output characteristics of the semiconductor laser 1 with respect to the light emission level instructing signal. The gradation correction table 12 is of the known type for correcting the gradation characteristics of the photosensitive material 20 and the development processing system. The gradation correction table 12 may be of the fixed correction characteristics type. However, in this embodiment, by taking into consideration changes of the gradation characteristics of the photosensitive material 20 among the lots thereof, changes of characteristics of the developing solution in the developing machine 22 with passage of time, or the like, the gradation correction table 12 is constituted for changing the correction characteristics when necessary in accordance with actual gradation characteristics. Specifically, a test pattern signal S4 representing some steps (e.g. 16 steps) of image density on the photosensitive material 20 is generated by a test pattern generating circuit 26, and is fed to the multiplexer 11. At this time, the multiplexer 11 is changed over from the condition at the time of image recording for feeding the image signal S1 to the correction table 40 as mentioned above to the condition for feeding the test pattern signal S4 to the correction table 40. The semiconductor laser 1 is operated in the manner as mentioned above on the basis of the test pattern signal S4, and therefore the laser beam 4 is intensity modulated. As a result, a step wedge (test pattern) whose density changes step-wise, for example, in 16 steps, is recorded as a photographic latent image on the photosensitive material 20. The photosensitive material 20 is sent to the developing machine 22, and the step wedge is developed. After the development is finished, the photosensitive material 20 is sent to a densitometer 23, and the optical density at each step of the step wedge is measured. The optical density thus measured is sent to a density value input means 24 in conformity with each step of the step wedge, and a density signal S7 representing the optical density of each step of the step wedge is generated by the density value input means 24. The density signal S7 is fed to a table creation means 37. On the basis of the density signal S7 and the test pattern signal S4, the table creation means 37 creates the gradation correction table such that predetermined image density is obtained with a predetermined value of the image signal S1. As mentioned above, the gradation correction table makes the image signal values of approximately 16 steps correspond respectively to predetermined image density values. A signal S8 representing the gradation correction table is fed to a signal interpolation means 38, which carries out interpolation processing to obtain a gradation correction table adapted to the image signal S1 of 1024 steps (i.e. 10 bits). The aforesaid gradation correction table 12 is created on the basis of a signal S9 representing the thus obtained gradation correction table.

In the course of image recording based on the image signal S1, the image signal S1 fed to the gradation correction table 12 via the multiplexer 11 is converted to a signal S1' by the gradation correction table 12, and is then converted by the inverse logarithmic conversion table 13 into a light emission level instructing signal S1".

The V-P characteristics correction table 14 will now be described below. As mentioned above, even though the feedback signal Vpd is fed back to the addition point 2 in the APC circuit 8, it is not always possible to obtain the ideal relationship between the light emission level instructing signal and the intensity of the laser beam 4 as indicated by the solid line in FIG. 4. The V-P characteristics correction table 14 is provided for obtaining such an ideal relationship. Specifically, the ideal relationship between the light emission level instructing signal Vref and the optical output of the semiconductor laser 1 is indicated by a straight line "a" in FIG. 8, the actual relationship therebetween is indicated by a curve "b" in FIG. 8, and the voltage value at the time the light emission level instructing signal S1" is directly D/A converted is assumed to be equal to Vin. In this case, the V-P characteristics correction table 14 is constituted to convert the voltage value Vin to a voltage value V. When the value of the light emission level instructing signal Vref is equal to Vin, only the optical intensity equal to P' can be obtained. However, in the case where the voltage value Vin is converted to the voltage value V as mentioned above, the optical intensity equal to Po can be obtained with respect to the voltage value Vin. Thus the relationship between the voltage value Vin corresponding to the light emission level instructing signal S1" and the optical output Pf becomes linear.

With the aforesaid configuration, density on the photosensitive material 20 can be controlled at equal density intervals by changing the level of the image signal S1 by a predetermined amount. Also, as mentioned above, the characteristic curve "b" shown in FIG. 8 is for the case where the semiconductor laser 1 is operated over the LED region and the laser oscillation region. Therefore, with the aforesaid embodiment, an optical output dynamic range of approximately 3 orders of ten can be obtained, and consequently a high-gradation image of approximately 1024 levels of gradation can be recorded easily and accurately as mentioned above.

As mentioned above, nonlinearity of the laser beam optical output characteristics with respect to the light emission level instructing signal, which nonlinearity is caused by nonlinearity of the optical output characteristics of the semiconductor laser 1 with respect to the drive current, is eliminated and said characteristics are made linear by the V-P characteristics correction table 14. Accordingly, the loop gain of the system of the APC circuit 8 passing through the addition point 2, the voltage-to-current conversion amplifier 3, the semiconductor laser 1, the photodiode 6, and the current-to-voltage conversion amplifier 7 and then returning to the addition point 2 need not include the gain necessary for the correction for eliminating the aforesaid nonlinearity. Thus it is only necessary that the loop gain be of a value required for the compensation for deviations of the optical output characteristics of the semiconductor laser 1 with respect to the drive current which are caused by transitional changes in the temperature arising in the course of the operation of the semiconductor laser 1 or by error in the control for making constant the temperature in the case of the semiconductor laser 1, and for the compensation for drifts of the amplifiers or the like. Specifically, in the case where the picture element clock frequency is 1 MHz and the semiconductor laser 1 is operated to generate an optical output of 3 mW, it is only necessary that the aforesaid loop gain be approximately 30 dB. The loop gain of this order can be achieved easily with the present technical level.

Creation of the V-P characteristics correction table 14 will be described hereinbelow. To the apparatus shown in FIG. 1, a table creation device 35 can be connected when necessary. The table creation device 35 comprises a test signal generating circuit 27, a table creation circuit 28 and a memory 29. When the V-P characteristics correction table 14 is to be created, a variable level digital test signal S10 is generated by the test signal generating circuit 27 and is fed to the multiplexer 15. At this time, the multiplexer 15 is changed over from the condition for feeding the light emission level instructing signal S5 to the D/A converter 16 in the course of image recording to the condition for feeding the test signal S10 to the D/A converter 16. Also, the table creation circuit 28 is connected so that it receives the feedback signal Vpd from the current-to-voltage conversion amplifier 7 of the APC circuit 8. The test signal S10 is output such that the signal level increases or decreases step-wise. At this time, the table creation circuit 28 activates a variable-level signal generator built therein to generate a reference signal corresponding to the minimum optical output, and compares the feedback signal Vpd with the reference signal. The reference signal has the voltage value Vin as shown in FIG. 8. The table creation circuit 28 latches the value of the test signal S10 at the time the feedback signal Vpd and the reference signal coincide with each other. The voltage value represented by the latched test signal S10 corresponds to the voltage value V as shown in FIG. 8, and therefore the relationship between the voltage value Vin and the voltage value V can be found. The table creation circuit 28 changes the value of the reference signal in 1024 steps, and detects the relationship between the voltage value Vin and the voltage value V for each reference signal value. In this manner, the correction table for converting 1024 levels of the voltage value Vin to the voltage value V is created. The creation table thus created is stored in the memory 29, and is then set as the V-P characteristics correction table 14. After the V P characteristics correction table 14 is created in this manner, the table creation device 35 is disconnected from the APC circuit 8.

Instead of detecting one by one the relationships between the voltage value Vin and the voltage value V for all image density levels in the manner as mentioned above, the V-P characteristics correction table 14 may also be created by detecting the relationships between the voltage value Vin and the voltage value V for some major image density levels and carrying out signal interpolation in the same manner as in the creation of the gradation correction table 12. The V-P characteristics correction table 14 may also be created by calculation based on the V-P characteristics of the semiconductor laser 1. Also, the gradation correction table 12, the inverse logarithmic conversion table 13, and the V-P characteristics correction table 14 may be combined into a single correction table having all of the necessary conversion characteristics, or may be constituted independently of one another.

Figure 9:
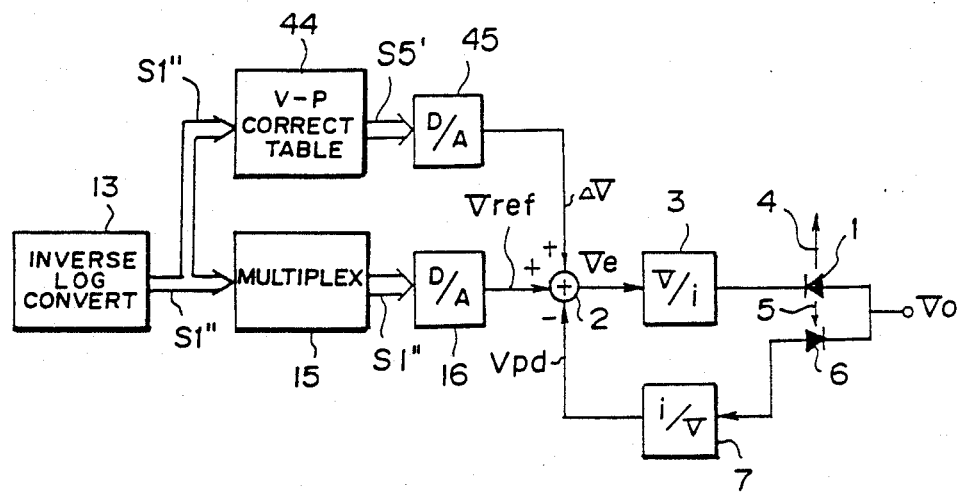
FIG. 9 is a block diagram showing the semiconductor laser operation control circuit in another embodiment of the first laser beam recording apparatus in accordance with the present invention.

Another embodiment of the first laser beam recording apparatus in accordance with the present invention will hereinbelow be described with reference to FIG. 9. In FIG. 9, similar elements are numbered with the same reference numerals with respect to FIG. 1 (this also applies to FIG. 10). Though only the laser operation control circuit is shown in FIG. 9, the sections such as the laser beam scanning system in this embodiment which are not shown in FIG. 9 are formed in the same manner as in the embodiment shown in FIG. 1. In FIG. 9, the light emission level instructing signal S1'' generated by the inverse logarithmic conversion table 13 is directly fed to the D/A converter 16 via the multiplexer 15. On the other hand, the light emission level instructing signal S1'' is branched and fed to a V-P characteristics correction table 44. The V-P characteristics correction table 44 is slightly different from the V-P characteristics correction table 14 as shown in FIG. 1, and is constituted for calculating a difference ΔV between the voltage values V and Vin shown in FIG. 8. A digital signal S5' representing the voltage difference ΔV is converted by a D/A converter 45 into an analog signal, and is then added to the voltage value Vin (which corresponds to the light emission level instructing signal S1'') at the addition point 2. This operation is equivalent to the feeding of the signal representing the voltage value V as the light emission level instructing signal Vref to the addition point 2 in the embodiment shown in FIG. 1, and therefore the same effects as mentioned above can be obtained.

Figure 10:
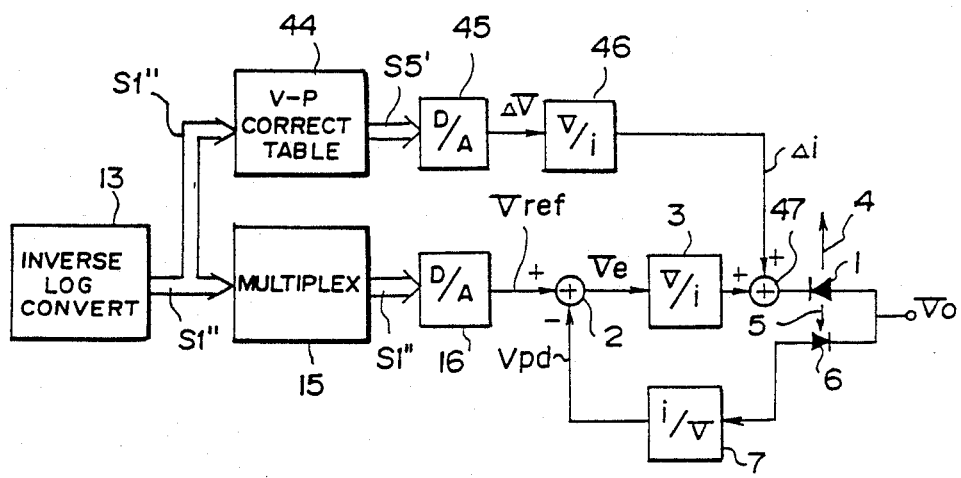
FIG. 10 is a block diagram showing the semiconductor laser operation control circuit in a further embodiment of the first laser beam recording apparatus in accordance with the present invention.

A further embodiment of the first laser beam recording apparatus in accordance with the present invention will now be described with reference to FIG. 10. In this embodiment, the light emission level instructing signal S1'' is branched and fed to the V-P characteristics correction table 44 for carrying out correction as mentioned above, and the obtained signal S5' is converted by the D/A converter 45 into the analog signal in the same manner as in the embodiment shown in FIG. 9. However, the voltage signal ΔV generated by the D/A converter 45 is not fed to the addition point 2, but instead is fed to a voltage-to-current conversion amplifier 46 which converts the voltage signal ΔV into a current Δi. The current Δi is added to a drive current, which is obtained by conversion of the deviation signal Ve, at an addition point 47 disposed at the stage after the voltage-to-current conversion amplifier 3 of the APC circuit 8. This embodiment is different from the embodiment shown in FIG. 9 only in that the voltage signal ΔV is not directly fed to the APC circuit 8, but instead is converted into the current Δi and then fed to the APC circuit 8. Therefore, also with this embodiment, the same effects as with the embodiment shown in FIG. 1 are obtained.

On the other hand, in the case where the semiconductor laser is utilized by carrying out intensity modulation over the LED region and the laser oscillation region, the problem that convergence of the scanning beam is adversely affected also arises besides the aforesaid problem that the optical output characteristics of the semiconductor laser with respect to the drive current become nonlinear. Specifically, the natural emission light generated by the semiconductor laser includes various angle components as compared with the laser oscillation light. Also, in the case of the longitudinal multi-mode semiconductor laser for example, the natural emission light has spectrum components ranging over approximately 40 nm unlike the laser oscillation light having spectrum components ranging over approximately 2 nm. Therefore, when the natural emission light is converged by a converging lens, it cannot be converged to such a small spot diameter as the laser oscillation light. Therefore, spatial resolution of scanning is deteriorated in the case where light of a low output region wherein the natural emission light is predominant (of course, the ratio of the natural emission light is 100% in the LED region) is utilized together with light of a high output region wherein the laser oscillation light is predominant.

One approach to improvement of the convergence of the scanning beam is to utilize a polarizing filter as proposed in, for example, Japanese Patent Application No. 61(1986)-075077, an interference filter as proposed in, for example, Japanese Patent Application No. 61(1986)-150227, or an aperture stop plate as proposed in, for example, Japanese Patent Application No. 61(1986)-196352.

Specifically, in the laser beam emitted by the semiconductor laser, the laser oscillation light is linearly polarized in parallel with the junction face of the laser diode chip, and the natural emission light is polarized randomly. Therefore, when the laser beam emitted by the semiconductor laser is made to impinge upon a polarizing filter which transmits only the light polarized in parallel with the junction face of the laser diode chip, almost all laser oscillation light passes therethrough, and only approximately ½ of the natural emission light can pass therethrough. Accordingly, when the laser beam emitted by the semiconductor laser in the region near the threshold value of the semiconductor laser, i.e. in the region including both the laser oscillation properties and the LED properties, is made to impinge upon the polarizing filter, the ratio of the laser oscillation light in the scanning beam becomes higher, and consequently the convergence of the scanning beam is improved.

Also, when the laser beam emitted by the semiconductor laser is made to impinge upon an interference filter which transmits only the light having a wavelength in the vicinity of the wavelength range of the laser oscillation light, the laser oscillation light is not cut off, and a scanning beam composed of a very narrow range of the spectrum components as in the laser oscillation light can be obtained. In this case, even though chromatic aberration of the lenses such as the converging lens disposed in the beam scanning system is not eliminated very accurately, the convergence of the scanning beam is improved.

Also, it has been found that the convergence of the scanning beam can be improved by disposing an aperture stop plate having a small aperture, through which only a part of the laser beam is to be passed, between the semiconductor laser and a collimator lens or between the collimator lens and the converging lens.

In the case where the aforesaid polarizing filter, the interference filter or the aperture stop plate is utilized, an image of high sharpness can be recorded by converging the scanning beam into a smaller spot.

Figure 15:
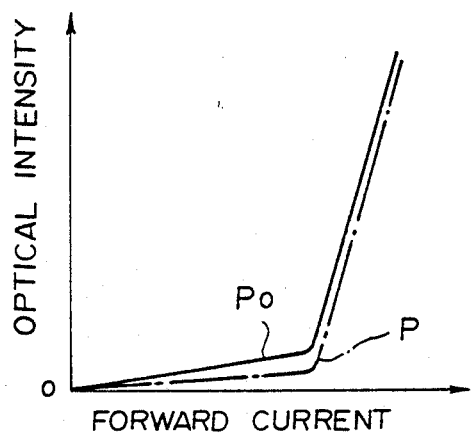
FIG. 15 is an explanatory graph showing the effects of the polarizing filter in the second laser beam recording apparatus in accordance with the present invention.

However, the aforesaid polarizing filter, the interference filter and the aperture stop plate each has the problem that the optical transmittance characteristics thereof with respect to the incident light intensity change nonlinearly. The problem will now be described below with reference to FIG. 15 by taking the polarizing filter as an example. In FIG. 15, a curve Po indicates the intensity of the laser beam emitted by the semiconductor laser. When the laser beam is passed through the polarizing filter, the intensity of the laser beam after passage therethrough changes as indicated by a curve P. Specifically, in the LED region, only the natural emission light is generated, and approximately ½ of the natural emission light passes through the polarizing filter as mentioned above (i.e. the optical transmittance is approximately 50%). On the other hand, in the laser oscillation region, approximately ½ of the natural emission light passes through the polarizing filter as mentioned above, and almost all laser oscillation light which is included in a very much larger ratio than the natural emission light in the laser beam generated in the laser oscillation region passes through the polarizing filter. Therefore, the transmittance of the laser beam generated in the laser oscillation region through the polarizing filter becomes markedly higher than approximately 50%. Also, the optical transmittance becomes higher as the intensity of the laser beam increases and the ratio of the laser oscillation light contained in the laser beam increases. The above also applies to the case where an interference filter is used.

On the other hand, as is well known, the spread angle of the radiant beam emitted by the semiconductor laser fluctuates as the optical output changes. Therefore, in the case where the aforesaid aperture stop plate is provided, the ratio of the light amount intercepted by the aperture stop plate, i.e. the optical transmittance, changes in accordance with optical output of the semiconductor laser, i.e. the intensity of the light incident upon the aperture stop plate.

Figure 4:
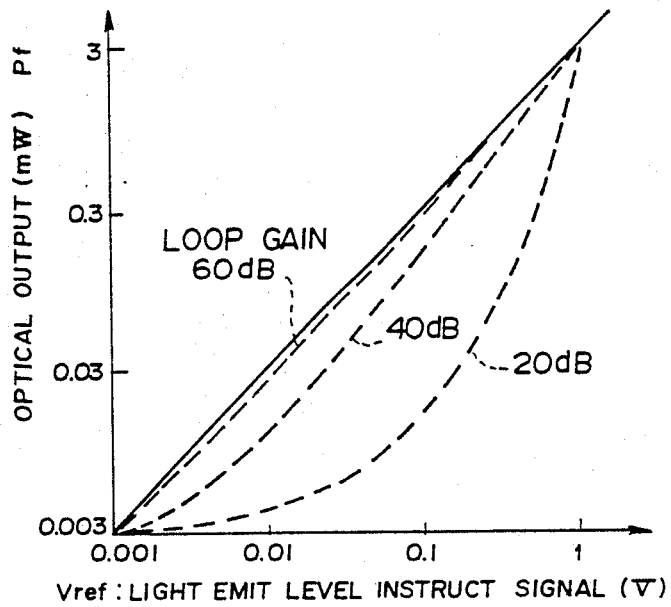
FIG. 4 is a graph showing the relationship between a light emission level instructing signal and the optical output of the semiconductor laser.
Figure 5:
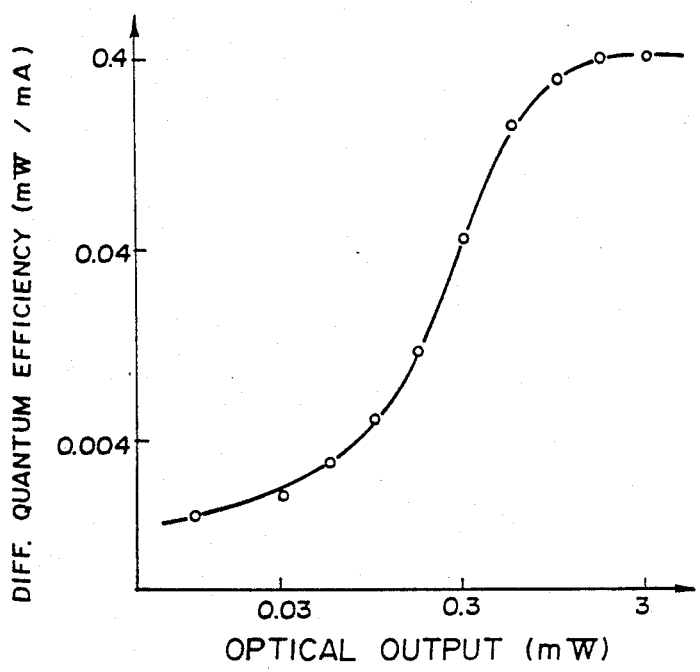
FIG. 5 is a graph showing the relationship between the optical output of the semiconductor laser and the differential quantum efficiency.
Figure 6:
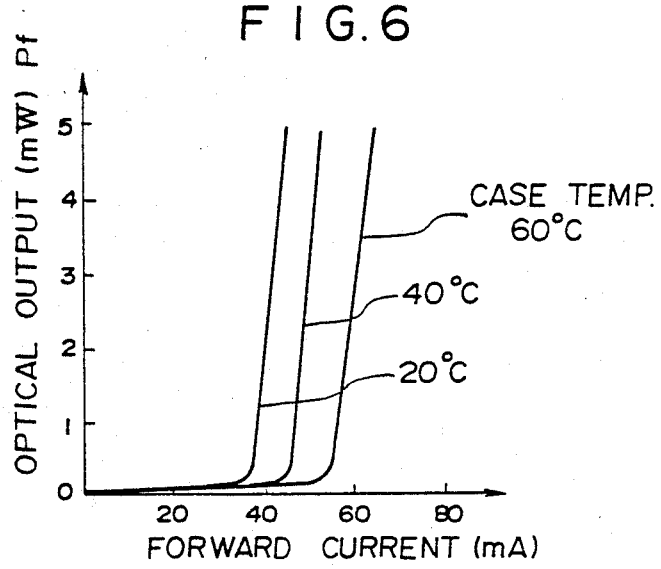
FIG. 6 is a graph showing dependence of the optical output characteristics of the semiconductor laser with respect to the drive current on the temperature.

As mentioned above, in the case where the optical transmittance characteristics of the optical element, such as a polarizing filter, with respect to the incident light intensity are nonlinear, even though the ideal characteristics as indicated by the solid line in FIG. 4 are obtained by use of the aforesaid APC circuit or the like, the relationship between the intensity of the laser beam actually scanning on the photosensitive material and the light emission level instructing signal does not become linear, and therefore a high-gradation image cannot be recorded easily and accurately.

Figure 11:
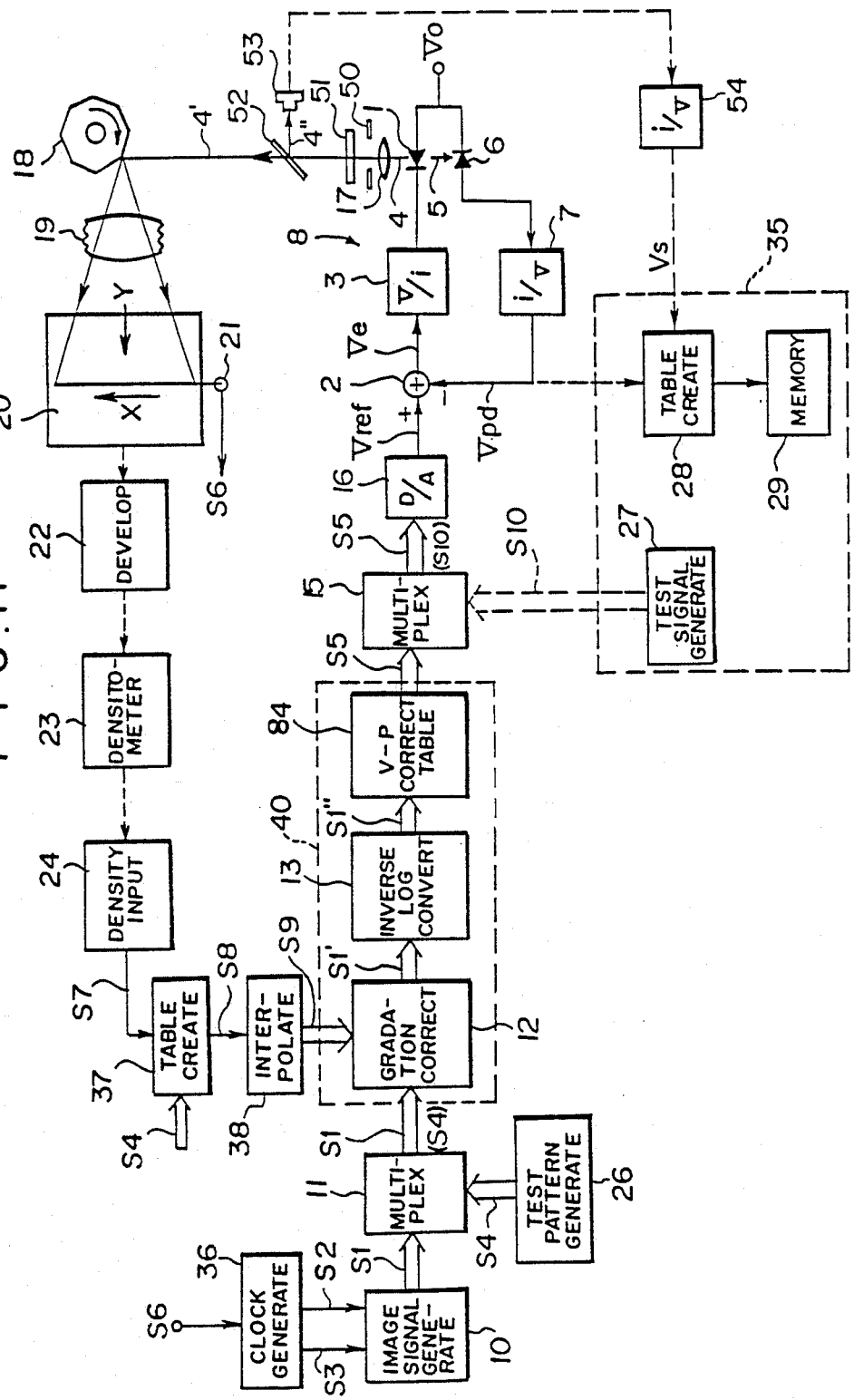
FIG. 11 is a schematic view showing an embodiment of the second laser beam recording apparatus in accordance with the present invention.

An embodiment of the second laser beam recording apparatus in accordance with the present invention which eliminates also the problems just mentioned above will hereinbelow be described with reference to FIG. 11. In FIG. 11, similar elements are numbered with the same reference numerals with respect to FIG. 1.

In FIG. 11, the laser beam 4 of an intensity corresponding to the light emission level instructing signal Vref, i.e. to the image signal S1, is emitted by the semiconductor laser 1 in the same manner as mentioned with reference to FIG. 1. The laser beam 4 is collimated by the collimator lens 17, and is then passed through an aperture stop plate 50 and a polarizing filter 51 to obtain a laser beam 4'. The laser beam 4' is passed through a semi-transparent mirror 52, and is then reflected and deflected by a light deflector 18 constituted by a polygon mirror or the like. The laser beam 4' thus deflected is passed through the converging lens 19, is converged into a minute spot on the photosensitive material 20, and two-dimensionally scans the photosensitive material 20 as mentioned with reference to FIG. 1. Since the laser beam 4, i.e. the laser beam 4', is intensity modulated based on the image signal S1 as mentioned above, the continuous tone image which the image signal S1 represents is recorded as a photographic latent image on the photosensitive material 20. When the laser beam 4' scans on the photosensitive material 20, passage of the laser beam 4' over a start point of the main scanning is detected by the photodetector 21, and the start point detection signal S6 generated by the photodetector 21 is fed to the clock generator 36. The clock generator 36 outputs the aforesaid line clock S2 and the picture element clock S3 in synchronization with the input timing of the start point detection signal S6.

The polarizing filter 51 transmits only the light polarized in parallel with the junction face of the laser diode chip of the semiconductor laser 1. When the laser beam 4 is passed through the polarizing filter 51 and the aperture stop plate 50, the laser beam (scanning beam) 4' obtained after the passage therethrough can be converged into a minute spot as mentioned above. When the photosensitive material 20 is scanned with the scanning beam 4' converged into a minute spot, an image of high sharpness can be recorded thereon.

A V-P characteristics correction table 84 in the embodiment shown in FIG. 11 will now be described below. As mentioned above, even though the feedback signal Vpd is fed back to the addition point 2 in the APC circuit 8, it is not always possible to obtain the ideal relationship between the light emission level instructing signal and the intensity of the laser beam 4 as indicated by the solid line in FIG. 4. Further, as the optical transmittance characteristics of the aperture stop plate 50 and the polarizing filter 51 with respect to the incident light intensity are also nonlinear as mentioned above, it is not always possible to make linear the relationship between the light emission level instructing signal and the optical intensity of the scanning beam 4'. The V-P characteristics correction table 84 is provided for making linear the relationship between the scanning beam intensity and the light emission level instructing signal. Specifically, the ideal relationship between the light emission level instructing signal Vref and an optical intensity Ps of the scanning beam 4' is indicated by a straight line "a" in FIG. 12, the actual relationship therebetween is indicated by a curve "b" in FIG. 12, and the voltage value at the time the light emission level instructing signal S1" is directly D/A converted is assumed to be equal to Vin. In this case, the V-P characteristics correction table 84 is constituted to convert the voltage value Vin to a voltage value V. When the value of the light emission level instructing signal Vref is equal to Vin, only the optical intensity equal to P' can be obtained. However, in the case where the voltage value Vin is converted to the voltage value V as mentioned above, the optical intensity equal to Po can be obtained with respect to the voltage value Vin. Thus the relationship between the voltage value Vin corresponding to the light emission level instructing signal S1" and the scanning beam intensity Ps becomes linear.

With the aforesaid configuration, density on the photosensitive material 20 can be controlled at equal density intervals by changing the level of the image signal S1 by a predetermined amount. Also, as mentioned above, the characteristic curve "b" shown in FIG. 12 is for the case where the semiconductor laser 1 is operated over the LED region and the laser oscillation region. Therefore, with this embodiment, an optical output dynamic range of approximately 3 orders of ten can be obtained, and consequently a high-gradation image of approximately 1024 levels of gradation can be recorded easily and accurately as mentioned above.

As mentioned above, nonlinearity of the scanning beam intensity characteristics with respect to the light emission level instructing signal, which nonlinearity is caused by nonlinearity of the optical output characteristics of the semiconductor laser 1 with respect to the drive current and nonlinearity of the optical transmittance characteristics of the aperture stop plate 50 and the polarizing filter 51 with respect to the incident light intensity, is eliminated and said characteristics are made linear by the V-P characteristics correction table 84. Accordingly, the loop gain of the system of the APC circuit 8 passing through the addition point 2, the voltage-to-current conversion amplifier 3, the semiconductor laser 1, the photodiode 6, and the current-to-voltage conversion amplifier 7 and then returning to the addition point 2 need not include the gain necessary for the correction for eliminating the aforesaid nonlinearity.

Figure 12:
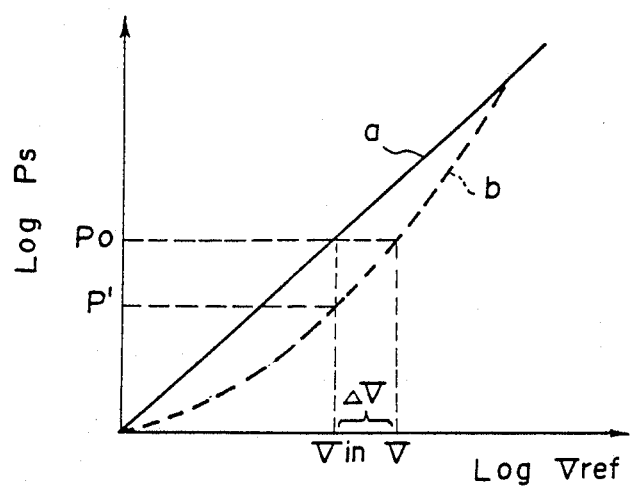
FIG. 12 is an explanatory graph showing the effects of the V-P characteristics correction table in the embodiment shown in FIG. 11.

Creation of the V-P characteristics correction table 84 in the embodiment shown in FIG. 11 will be described hereinbelow. To the apparatus shown in FIG. 11, the table creation device 35 comprising the test signal generating circuit 27, the table creation circuit 28 and the memory 29 can be connected when necessary. When the V-P characteristics correction table 84 is to be created, the variable-level digital test signal S10 is generated by the test signal generating circuit 27 and is fed to the multiplexer 15. At this time, the multiplexer 15 is changed over from the condition for feeding the light emission level instructing signal S5 to the D/A converter 16 in the course of image recording to the condition for feeding the test signal S10 to the D/A converter 16. Also, a laser beam 4" reflected by the semi-transparent mirror 52 for branching a part of the laser beam 4' is received by a photodetector 5 constituted by a photodiode or the like. The table creation circuit 28 is connected so that it receives a light amount signal Vs from a current-to-voltage conversion amplifier 54 for converting the output of the photodetector 53 into a voltage signal. The test signal S10 is output such that the signal level increases or decreases stepwise. At this time, the table creation circuit 28 activates the variable-level signal generator built therein to generate a reference signal corresponding to the minimum optical intensity, and compares the light amount signal Vs with the reference signal. The reference signal has the voltage value Vin as shown in FIG. 12. The table creation circuit 28 latches the value of the test signal S10 at the time the light amount signal Vs and the reference signal coincide with each other. The voltage value represented by the latched test signal S10 corresponds to the voltage value V as shown in FIG. 12, and therefore the relationship between the voltage value Vin and the voltage value V can be found. The table creation circuit 28 changes the value of the reference signal in 1024 steps, and detects the relationship between the voltage value Vin and the voltage value V for each reference signal value. In this manner, the correction table for converting 1024 levels of the voltage value Vin to the voltage value V is created. The creation table thus created is stored in the memory 29, and is then set as the V-P characteristics correction table 84. After the V-P characteristics correction table 84 is created in this manner, the table creation device 35 is disconnected from the APC circuit 8.

The V-P characteristics correction table 84 may be created in any other manner as mentioned with reference to the embodiment shown in FIG. 1.

In the embodiment shown in FIG. 11, the aperture stop plate 50 and the polarizing filter 51 are provided for improving convergence of the scanning beam 4'. However, only either one of the aperture stop plate 50 and the polarizing filter 51 may be used, or the aforesaid interference filter may be used instead of these optical elements. Also, two or all of these three optical elements may be used as a combination.

Figure 13:
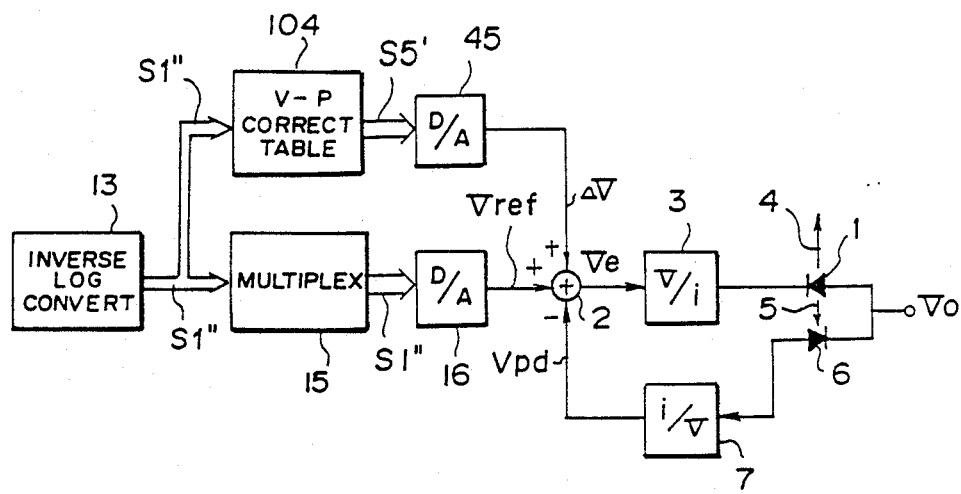
FIG. 13 is a block diagram showing the semiconductor laser operation control circuit in another embodiment of the second laser beam recording apparatus in accordance with the present invention.

Another embodiment of the second laser beam recording apparatus in accordance with the present invention will hereinbelow be described with reference to FIG. 13. In FIG. 13, similar elements are numbered with the same reference numerals with respect to FIG. 11 (this also applies to FIG. 14). Though only the laser operation control circuit is shown in FIG. 13, the sections such as the laser beam scanning system in this embodiment which are not shown in FIG. 13 are formed in the same manner as in the embodiment shown in FIG. 11. In FIG. 13, the light emission level instructing signal S1" generated by the inverse logarithmic conversion table 13 is directly fed to the D/A converter 16 via the multiplexer 15. On the other hand, the light emission level instructing signal S1" is branched and fed to a V-P characteristics correction table 104. The V-P characteristics correction table 104 is slightly different from the V-P characteristics correction table 84 as shown in FIG. 11, and is constituted for calculating a difference $\Delta V$ between the voltage values V and Vin shown in FIG. 12. The digital signal S5' representing the voltage difference $\Delta V$ is converted by the D/A converter 45 into an analog signal, and is then added to the voltage value Vin (which corresponds to the light emission level instructing signal S1") at the addition point 2. This operation is equivalent to the feeding of the signal representing the voltage value V as the light emission level instructing signal Vref to the addition point 2 in the embodiment shown in FIG. 11, and therefore the same effects as mentioned above can be obtained.

Figure 14:
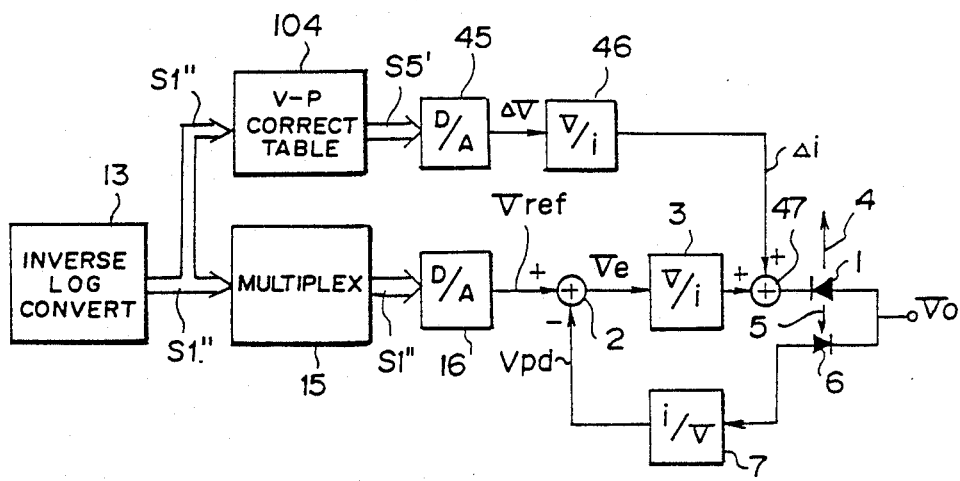
FIG. 14 is a block diagram showing the semiconductor laser operation control circuit in a further embodiment of the second laser beam recording apparatus in accordance with the present invention.

A further embodiment of the second laser beam recording apparatus in accordance with the present invention will now be described with reference to FIG. 14. In this embodiment, the light emission level instructing signal S1" is branched and fed to the V-P characteristics correction table 104 for carrying out correction as mentioned above, and the obtained signal S5' is converted by the D/A converter 45 into the analog signal in the same manner as in the embodiment shown in FIG. 13. However, the voltage signal $\Delta V$ generated by the D/A converter 45 is not fed to the addition point 2, but instead is fed to a voltage-to-current conversion amplifier 46 which converts the voltage signal $\Delta V$ into a current $\Delta i$. The current $\Delta i$ is added to a drive current, which is obtained by conversion of the deviation signal Ve, at the addition point 47 disposed at the stage after the voltage-to-current conversion amplifier 3 of the APC circuit 8. This embodiment is different from the embodiment shown in FIG. 13 only in that the voltage signal $\Delta V$ is not directly fed to the APC circuit 8, but instead is converted into the current $\Delta i$ and then fed to the APC circuit 8. Therefore, also with this embodiment, the same effects as with the embodiment shown in FIG. 11 are obtained.

Embodiments of the third laser beam recording apparatus in accordance with the present invention will hereinbelow be described with reference to FIGS. 16 to 20.

Figure 16:
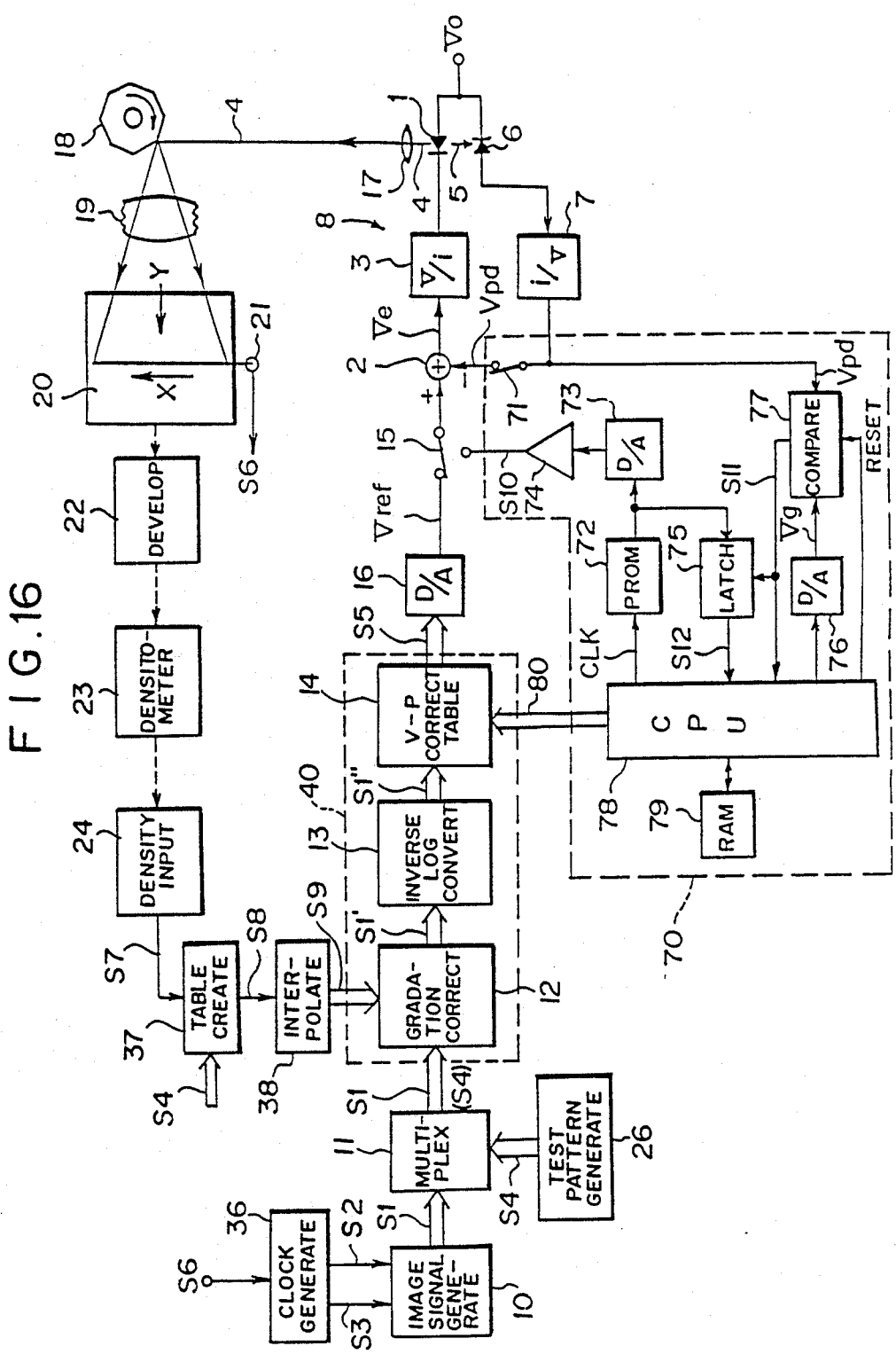
FIG. 16 is a schematic view showing an embodiment of the third laser beam recording apparatus in accordance with the present invention.

In FIG. 16, similar elements are numbered with the same reference numerals with respect to FIG. 1, except that the reference numeral 15 denotes a signal changeover switch. In the embodiment shown in FIG. 16, the image signal S1 generated by the image signal generator 10 is corrected by the correction table 40 via the multiplexer 11 in the same manner as mentioned with reference to FIG. 1, and is converted into the light emission level instructing signal S5 of 16 bits for example. The light emission level instructing signal S5 is fed to the D/A converter 16, and is converted by the D/A converter 16 into the light emission level instructing signal Vref composed of an analog voltage signal. The light emission level instructing signal Vref is fed to the addition point 2 of the APC circuit 8 via the signal change-over switch 15.

In this embodiment, the V-P characteristics correction table 14 is created in the manner as described below. The apparatus shown in FIG. 16 is provided with a table creation means 70. The test signal S10 generated by the table creation means 70 is fed to the addition point 2 via the signal change-over switch 15, and the feedback signal Vpd in the APC circuit 8 is fed to the table creation means 70. When the correction table is to be created, the signal change-over switch 15 is changed over from the condition for feeding the light emission level instructing signal Vref to the addition point 2 in the course of image recording to the condition for feeding the test signal S10 to the addition point 2. At this time, a switch 71 provided in the feedback line of the feedback signal Vpd is opened by being interlocked with the signal change-over switch 15 or by manual operations.

Figure 17:
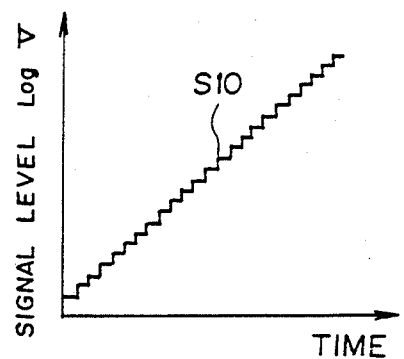
FIG. 17 is a graph showing the wave form of the test signal generated by the table creation means in the embodiment shown in FIG. 16.

The level of the test signal S10 increases stepwise with the passage of time. Specifically, a PROM 72 stores progressions which are arithmetical on the logarithmic axis, and the progressions are sequentially accessed by a clock CLK. The digital values thus read from the PROM 72 are converted into analog values by a D/A converter 73 and amplified by an amplifier 74. As a result, the test signal S10 whose voltage value V increases stepwise with increase of the number of pulses of the clock CLK, i.e. with the passage of time, as shown in FIG. 17 is obtained. Instead of the light emission level instructing signal Vref, the test signal S10 is fed to the addition point 2 via the signal change-over switch 15. As the PROM 72, a PROM storing progressions (e.g. of 14 bits) substantially higher than the density scale (i.e. the light emission level resolution of the semiconductor laser 1) of 10 bits is used.

Upon feeding of the test signal S10 to the addition point 2, the semiconductor laser 1 emits the laser beam 4, and the feedback signal Vpd corresponding to the optical output of the semiconductor laser 1 is fed to a comparator 77. The comparator 77 receives a reference signal Vg which has been generated by a CPU 78 and converted by a D/A converter 76 into an analog signal, and compares the feedback signal Vpd with the reference signal Vg. At this time, the CPU 78 first outputs a reference signal Vg(1) corresponding to the minimum light emission level of the semiconductor laser 1, and the comparator 77 generates a coincidence signal S11 when the feedback signal Vpd coincides with the reference signal Vg(1). The coincidence signal S11 is fed to a latch 75. The latch 75 receives the input from the PROM 72, and latches the input from the PROM 72 at the time the coincidence signal S11 is fed to the latch 75. The signal S12 thus latched represents the value of ΔV as shown in FIG. 8 at the time the value of the reference signal Vg is equal to Vin. The voltage values ΔV corresponding to the reference signals Vg(n) will hereinafter be expressed as ΔV(n). The CPU 78 receives the signal S12 representing the voltage value ΔV(1), and calculates a value V(1) expressed as $$V(1) = Vg(1) + \Delta V(1)$$

on the basis of the signal S12 and the reference signal Vg(1). Also, the CPU 78 creates a table for converting the reference signal Vg(1) into the signal of the voltage value V(1) in a RAM 79.

The coincidence signal S11 is also fed to the CPU 78. Upon receiving the coincidence signal S11, the CPU 78 changes over the reference signal from Vg(1) to Vg(2) corresponding to the second minimum light emission level of the semiconductor laser 1, and resets the comparator 77. Also in this case, the CPU 78 calculates a value V(2) expressed as $$V(2) = Vg(2) + \Delta V(2)$$

and creates a table for converting the reference signal Vg(2) into the signal of the voltage value V(2) in the RAM 9.

The aforesaid operations are carried out sequentially up to a reference signal Vg(1024) corresponding to the maximum light emission level of the semiconductor laser 1 and, as a result, the tables for converting 1024 signal values Vin(n) into the values V(n) are created in the RAM 79. These tables are then interpolated to obtain a 16-bit table, which is sent to the RAM constituting the correction table 40 via a signal line 80, and is set as the V-P characteristics correction table 14. As mentioned above, the correction table 14 is formed to convert the voltage value Vin into the voltage value V as shown in FIG. 8. Therefore, the relationship between the light emission level instructing signal S1" prior to the passage through the correction table 14 and the optical output Pf of the semiconductor laser 1 becomes linear.

After the correction table 14 has been created in the manner as mentioned above, the signal change-over switch 15 is changed over to the condition for image recording, and the switch 71 is closed.

Also in this embodiment, instead of detecting one by one the relationships between the voltage value Vin and the voltage value V for all image density levels in the manner as mentioned above, the V-P characteristics correction table 14 may also be created by detecting the relationships between the voltage value Vin and the voltage value V for some major image density levels and carrying out signal interpolation in the same manner as in the creation of the gradation correction table 12. Also, the gradation correction table 12, the inverse logarithmic conversion table 13, and the V-P characteristics correction table 14 may be combined into a single correction table having all of the necessary conversion characteristics, or may be constituted independently of one another.

Also, instead of using the test signal S10 whose level increases step-wise with the passage of time, a test signal whose level decreases step-wise or continuously with the passage of time may be used.

Figure 18:
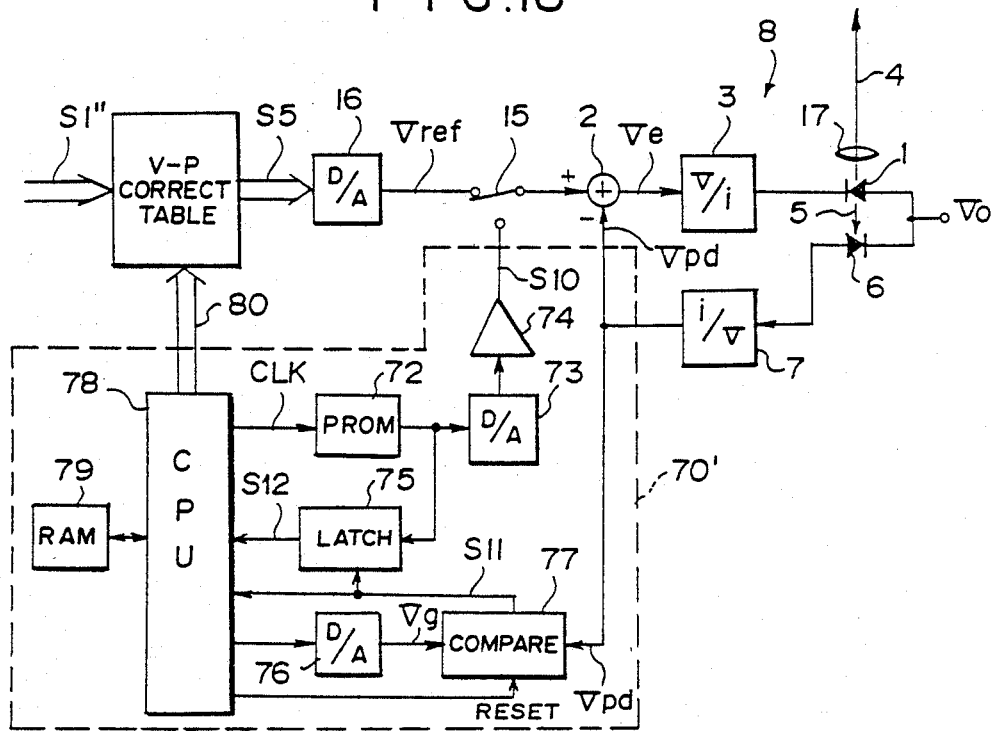
FIG. 18 is a block diagram showing the semiconductor laser operation control circuit and the table creation means in another embodiment of the third laser beam recording apparatus in accordance with the present invention.

Another embodiment of the third laser beam recording apparatus in accordance with the present invention will hereinbelow be described with reference to FIG. 18. In FIG. 18, similar elements are numbered with the same reference numerals with respect to FIG. 16 (this also applies to FIGS. 19 and 20). Though only the laser operation control circuit and a table creation means 70′ are shown in FIG. 18, the sections such as the laser beam scanning system in this embodiment which are not shown in FIG. 18 are formed in the same manner as in the embodiment shown in FIG. 16. The table creation means 70′ in the embodiment shown in FIG. 18 is different from the table creation means 70 shown in FIG. 16 only in that the switch 71 is removed. Specifically, in this embodiment, the APC circuit 8 is operated in the same manner as the normal operation used also in the course of the creation of the correction table 14. Therefore, in this embodiment, the signal S12 latched by the latch 75 at the time the coincidence signal S11 is fed corresponds to the voltage value V as shown in FIG. 8. In this case, the CPU 78 directly determines the values of V(n) without carrying out the calculation expressed as $$V(n) = Vg(n) + \Delta V(n)$$

and creates the tables for converting the voltage values Vg(n) into V(n).

A further embodiment of the third laser beam recording apparatus in accordance with the present invention will hereinbelow be described with reference to FIG. 19. In this embodiment, the light emission level instructing signal S1" generated by the inverse logarithmic conversion table 13 is directly fed to the D/A converter 16. On the other hand, the light emission level instructing signal S1" is branched and fed to the V-P characteristics correction table 44. The V-P characteristics correction table 44 is slightly different from the V-P characteristics correction table 14 as shown in FIG. 16, and is constituted for calculating a difference $\Delta V$ between the voltage values V and Vin shown in FIG. 8. The digital signal S5' representing the voltage difference $\Delta V$ is converted by the D/A converter 45 into an analog signal, and is then added to the voltage value Vin (which corresponds to the light emission level instructing signal S1") at the addition point 2. This operation is equivalent to the feeding of the signal representing the voltage value V as the light emission level instructing signal Vref to the addition point 2 as in the embodiment shown in FIG. 16, and therefore the same effects as mentioned above can be obtained.

Figure 19:
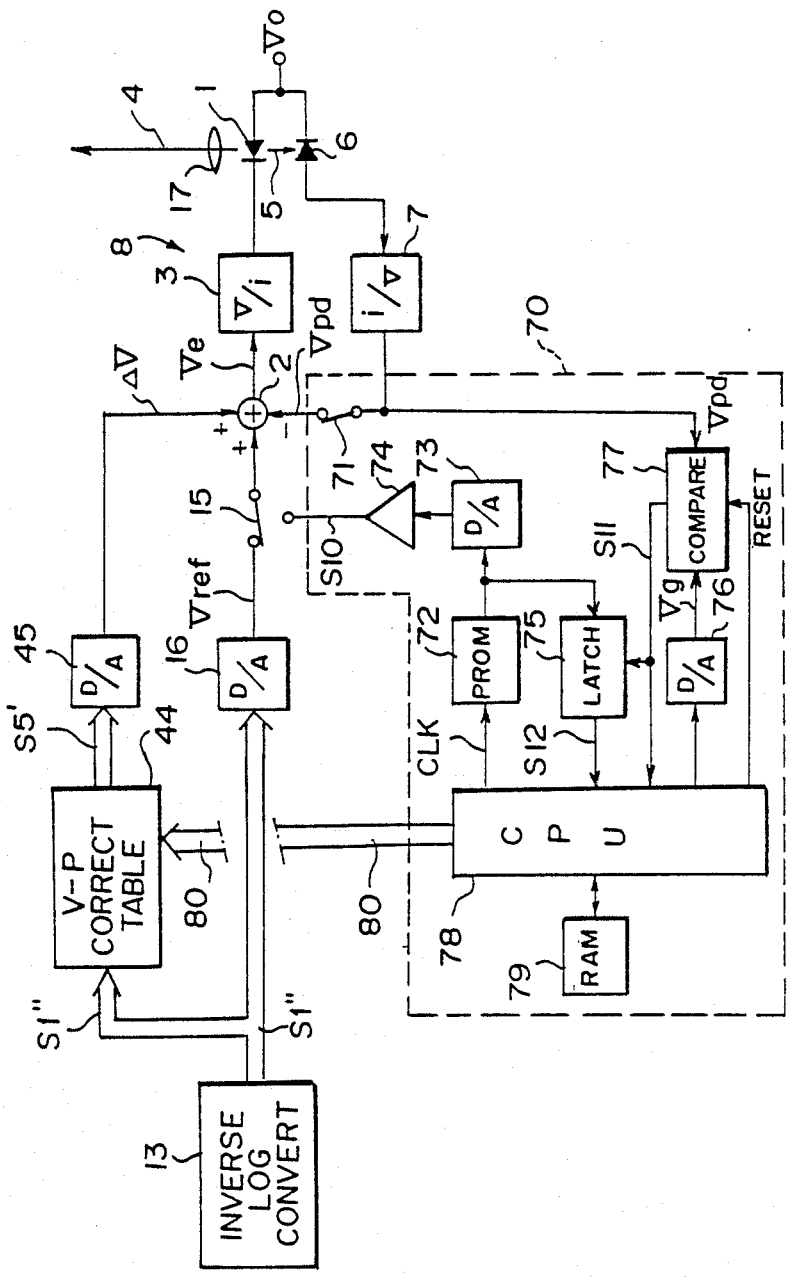
FIG. 19 is a block diagram showing the semiconductor laser operation control circuit and the table creation means in a further embodiment of the third laser beam recording apparatus in accordance with the present invention.

In the embodiment shown in FIG. 19, since the V-P characteristics correction table 44 must be formed to determine the voltage difference $\Delta V$ as mentioned above, it is impossible to use the table creation means 70' as shown in FIG. 18. Therefore, a table creation table 70 of the same type as the table creation table 70 shown in FIG. 16 is used. Also, in this case, the table creation means 70 does not carry out the aforesaid operation expressed as $$V(n) = Vg(n) + \Delta V(n),$$

but instead creates the correction table 44 which generates the values of $\Delta V(n)$ represented by the signal S12 with respect to the reference signals Vg(n).

A still further embodiment of the third laser beam recording apparatus in accordance with the present invention will now be described with reference to FIG. 20. In this embodiment, the light emission level instructing signal S1" is branched and fed to the V-P characteristics correction table 44 for carrying out correction as mentioned above, and the obtained signal S5' is converted by the D/A converter 45 into the analog signal in the same manner as in the embodiment shown in FIG. 19. However, the voltage signal $\Delta V$ generated by the D/A converter 45 is not fed to the addition point 2, but instead is fed to the voltage-to-current conversion amplifier 46 which converts the voltage signal $\Delta V$ into a current $\Delta i$. The current $\Delta i$ is added to a drive current, which is obtained by conversion of the deviation signal Ve, at the addition point 47 disposed at the stage after the voltage-to-current conversion amplifier 3 of the APC circuit 8. This embodiment is different from the embodiment shown in FIG. 19 only in that the voltage signal $\Delta V$ is not directly fed to the APC circuit 8, but instead is converted into the current $\Delta i$ and then fed to the APC circuit 8. Therefore, also with this embodiment, the same effects as with the embodiment shown in FIG. 16 are obtained.

Figure 20:
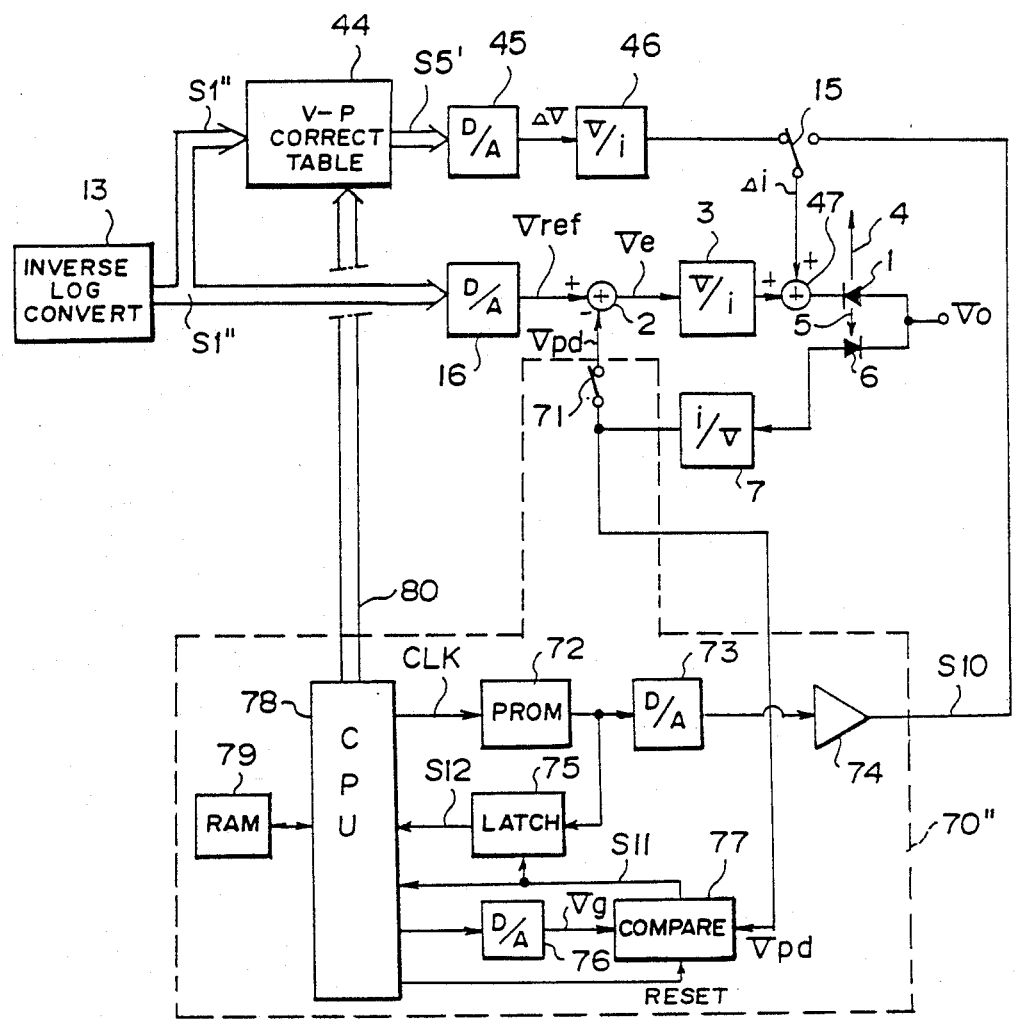
FIG. 20 is a block diagram showing the semiconductor laser operation control circuit and the table creation means in a still further embodiment of the third laser beam recording apparatus in accordance with the present invention.

A table creation means 70" in the embodiment shown in FIG. 20 is different from the table creation means 70 shown in FIG. 16 only in that the test signal S10 is fed to the addition point 47. However, also in this case, the signal S12 representing the voltage value $\Delta V$ shown in FIG. 8 is fed to the CPU 78. Therefore, the CPU 78 may be constituted to create the correction table 44 for generating the values of $\Delta V(n)$ with respect to the reference signals Vg(n) on the basis of the signal S12 and the reference signals Vg(n).

Figure 21:
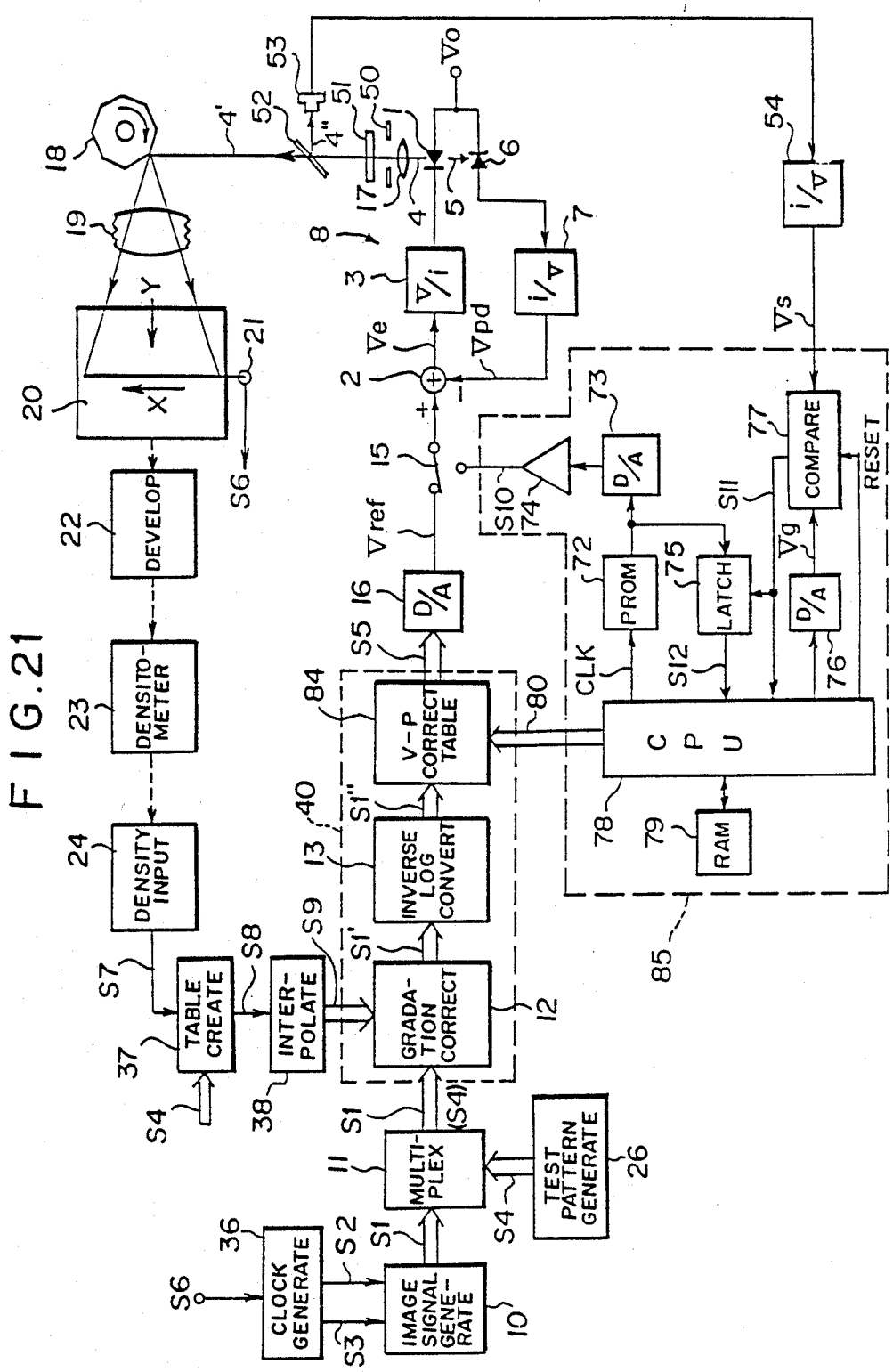
FIG. 21 is a schematic view showing an embodiment of the fourth laser beam recording apparatus in accordance with the present invention.

An embodiment of the fourth laser beam recording apparatus in accordance with the present invention will now be described with reference to FIG. 21. In FIG. 21, similar elements are numbered with the same reference numerals with respect to FIG. 11, except that the reference numeral 15 denotes a signal change-over switch. In the embodiment shown in FIG. 21, the image signal S1 generated by the image signal generator 10 is corrected by the correction table 40 via the multiplexer 11, and is converted into the light emission level instructing signal S5 of 16 bits for example. The light emission level instructing signal S5 is fed to the D/A converter 16, and is converted by the D/A converter 16 into the light emission level instructing signal Vref composed of an analog voltage signal. The light emission level instructing signal Vref is fed to the addition point 2 of the APC circuit 8 via the signal change-over switch 15.

In the embodiment shown in FIG. 21, the V-P characteristics correction table 84 is provided for making linear the relationship between the intensity of the scanning beam 4' and the light emission level instructing signal in the same manner as mentioned with reference to FIG. 12 for the embodiment shown in FIG. 11. Thus the nonlinearity of the scanning beam intensity characteristics with respect to the light emission level instructing signal, which nonlinearity is caused by nonlinearity of the optical output characteristics of the semiconductor laser 1 with respect to the drive current and nonlinearity of the optical transmittance characteristics of the aperture stop plate 50 and the polarizing filter 51 with respect to the incident light intensity, is eliminated and said characteristics are made linear by the V-P characteristics correction table 84 in the same manner as in the embodiment shown in FIG. 11.

In the embodiment shown in FIG. 21, the V-P characteristics correction table 84 is created in the manner as described below. The apparatus shown in FIG. 21 is provided with a table creation means 85. The test signal S10 generated by the table creation means 85 is fed to the addition point 2 via the signal change-over switch 15. Also, the laser beam 4" reflected by the semi-transparent mirror 52 for branching a part of the laser beam 4' is received by the photodetector 53 constituted by a photodiode or the like. The scanning beam intensity signal Vs generated by the current-to-voltage conversion amplifier 54 for converting the output of the photodetector 53 into a voltage signal is fed to the table creation means 85. When the correction table is to be created, the signal change-over switch 15 is changed over from the condition for feeding the light emission level instructing signal Vref to the addition point 2 in the course of image recording to the condition for feeding the test signal S10 to the addition point 2.

The level of the test signal S10 increases stepwise with the passage of time. Specifically, the PROM 72 stores progressions which are arithmetical on the logarithmic axis, and the progressions are sequentially accessed by the clock CLK. The digital values thus read from the PROM 72 are converted into analog values by the D/A converter 73 and amplified by the amplifier 74. As a result, the test signal S10 whose voltage value V increases step-wise with increase of the number of pulses of the clock CLK, i.e. with the passage of time, as shown in FIG. 17 is obtained. Instead of the light emission level instructing signal Vref, the test signal S10 is fed to the addition point 2 via the signal change over switch 15. As the PROM 72, a PROM storing progressions (e.g. of 14 bits) substantially higher than the density scale (i.e. the light emission level resolution of the semiconductor laser 1) of 10 bits is used.

Upon feeding of the test signal S10 to the addition point 2, the semiconductor laser 1 emits the laser beam 4, and the signal Vs representing the intensity of the scanning beam 4' at this time is fed to the comparator 77. The comparator 77 receives the reference signal Vg which has been generated by the CPU 78 and converted by the D/A converter 76 into an analog signal, and compares the scanning beam intensity signal Vs with the reference signal Vg. At this time, the CPU 78 first outputs a reference signal Vg(1) corresponding to the minimum light emission level of the semiconductor laser 1, and the comparator 77 generates the coincidence signal S11 when the scanning beam intensity signal Vs coincides with the reference signal Vg(1). The coincidence signal S11 is fed to the latch 75. The latch 75 receives the input from the PROM 72, and latches the input from the PROM 72 at the time the coincidence signal S11 is fed to the latch 75. The signal S12 thus latched represents the value of V as shown in FIG. 12 at the time the value of the reference signal Vg is equal to Vin. The voltage values V corresponding to the reference signals Vg(n) will hereinafter be expressed as V(n). The CPU 78 creates a table for converting the reference signal Vg(1) into the signal of the voltage value V(1) in the RAM 79.

The coincidence signal S11 is also fed to the CPU 78. Upon receiving the coincidence signal S11, the CPU 78 changes over the reference signal from Vg(1) to Vg(2) corresponding to the second minimum light emission level of the semiconductor laser 1, and resets the comparator 77. Also in this case, the CPU 78 creates a table for converting the reference signal Vg(2) into the signal of the voltage value V(2) in the RAM 79.

The aforesaid operations are carried out sequentially up to the reference signal Vg(1024) corresponding to the maximum light emission level of the semiconductor laser 1 and, as a result, the tables for converting 1024 signal values Vin(n) into the values V(n) are created in the RAM 79. These tables are then interpolated to obtain a 16-bit table, which is sent to the RAM constituting the correction table 40 via the signal line 80, and is set as the V-P characteristics correction table 84. As mentioned above, the correction table 84 is formed to convert the voltage value Vin into the voltage value V as shown in FIG. 12. Therefore, the relationship between the light emission level instructing signal S1"

prior to the passage through the correction table 84 and the scanning beam intensity Ps becomes linear.

Also in this embodiment, instead of detecting one by one the relationships between the voltage value Vin and the voltage value V for all image density levels in the manner as mentioned above, the V-P characteristics correction table 84 may also be created by detecting the relationships between the voltage value Vin and the voltage value V for some major image density levels and carrying out signal interpolation in the same manner as the creation of the gradation correction table 12. Also, the gradation correction table 12, the inverse logarithmic conversion table 13, and the V-P characteristics correction table 84 may be combined into a single correction table having all of the necessary conversion characteristics, or may be constituted independently of one another.

Also in this embodiment, instead of using the test signal S10 whose level increases step-wise with the passage of time, a test signal whose level decreases step-wise or continuously with the passage of time may be used.

Figure 22:
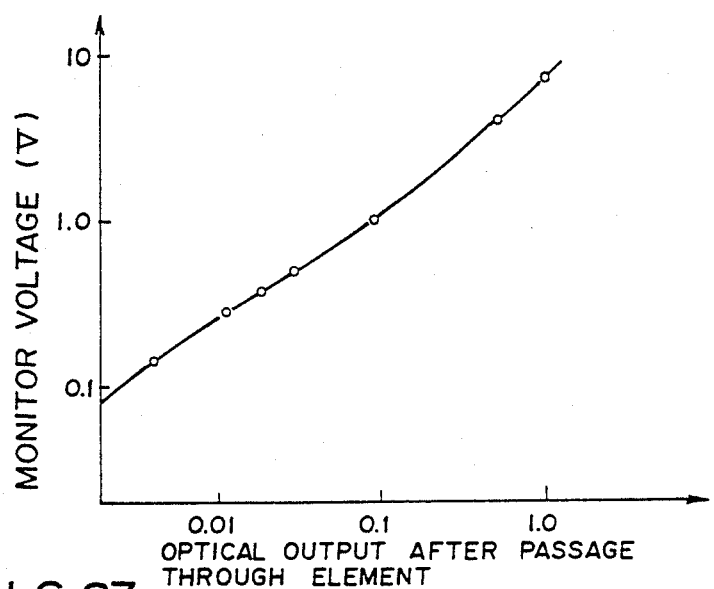
FIG. 22 is a graph showing an example of the incident light intensity-passing light intensity characteristics of a combination of the polarizing filter with an aperture stop plate in an embodiment of the fifth laser beam recording apparatus in accordance with the present invention.

On the other hand, FIG. 22 shows an example of the relationship between the intensity of the laser beam after passage through the aperture stop plate and a prism type polarization beam splitter used as the polarizing filter on one hand and the voltage value obtained by conversion from the output current of the pin photodiode built in the semiconductor laser on the other hand. The output current of the pin photodiode is proportional to the optical output of the semiconductor laser, i.e. to the intensity of the laser beam before incidence upon the optical elements, and therefore the relationship between the intensity of the laser beam and the optical transmittance of the optical elements is nonlinear.

Figure 23:
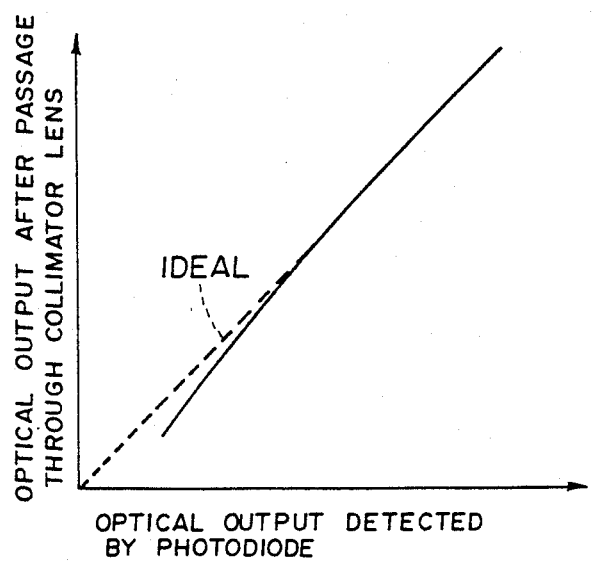
FIG. 23 is a graph showing an example of the incident light intensity-passing light intensity characteristics of a collimator lens in the embodiment of the fifth laser beam recording apparatus in accordance with the present invention.

Also, the radiant beam emitted by the semiconductor laser is usually passed through and collimated by the collimator lens. In this case, when the spread angle of the radiant beam increases, a part of the beam turns aside from the collimator lens. The light amount turning aside from the collimator lens (or the light amount impinging thereupon) changes as the optical output of the semiconductor laser changes and the spread angle of the radiant beam changes. Therefore, also in this case, the optical transmittance of the collimator lens changes in accordance with the intensity of light incident upon the collimator lens. FIG. 23 shows an example of the relationship between the optical output detected at the pin photodiode built in the semiconductor laser and the optical intensity after passage through the collimator lens. As shown in FIG. 23, said relationship is nonlinear.

Accordingly, in an embodiment of the fifth laser beam recording apparatus in accordance with the present invention, the scanning beam intensity characteristics of the semiconductor laser with respect to the light emission level instructing signal are made linear over the LED region and the laser oscillation region even though the optical element such as the polarizing filter, the interference filter, the aperture stop plate or the collimator lens is disposed in the beam scanning system, so that a high-gradation image is recorded quickly by optical intensity modulation. The embodiment will hereinbelow be described with reference to FIG. 21.

The V-P characteristics correction table 84 in this embodiment will be described below. Even though the relationship between the light emission level instructing signal and the intensity of the laser beam 4 can be made linear by feeding back the feedback signal Vpd to the addition point in the APC circuit 8, the relationship between the light emission level instructing signal and the optical intensity of the scanning beam 4' does not become linear since the optical transmittance characteristics of the aperture stop plate 50 and the polarizing filter 51, and of the collimator lens 17 in some cases, with respect to the incident light intensity are nonlinear as mentioned above. The V-P characteristics correction table 84 is provided for making linear the relationship between the scanning beam intensity and the light emission level instructing signal in the same manner as mentioned with reference to FIG. 12. In the course of creation of the V-P characteristics correction table 84, the tables for converting 1024 signal values Vin(n) into the values V(n) which are created in the RAM 79 in the same manner as mentioned with reference to FIG. 21 are sent to the RAM constituting the correction table 40 via the signal line 80, and are set as the V-P characteristics correction table 84.

In the embodiment of the fifth laser beam recording apparatus in accordance with the present invention, the nonlinearity of the scanning beam intensity with respect to the light emission level instructing signal, which nonlinearity is caused by the nonlinearity of the optical output characteristics of the semiconductor laser with respect to the drive current, can be eliminated by the APC circuit. Also, even though the optical transmittance characteristics of the optical element of the beam scanning system, such as the polarizing filter, the interference filter, the aperture stop plate or the collimator lens, with respect to the incident light intensity are nonlinear, the nonlinearity thereof can be eliminated by the correction table.

In the embodiment of the fifth laser beam recording apparatus, the table creation means 85 may be omitted, and the V-P characteristics correction table 84 may be created by calculation or the like. However, in the case where the means for creating the correction table is provided as in this embodiment, the correction table can be re-created when necessary. Therefore, even though the performance of the semiconductor laser changes with the passage of time for example, an appropriate correction table can always be re-created by compensating for such changes, and the condition for achieving accurate recording can be maintained for a long period.

Figure 24:
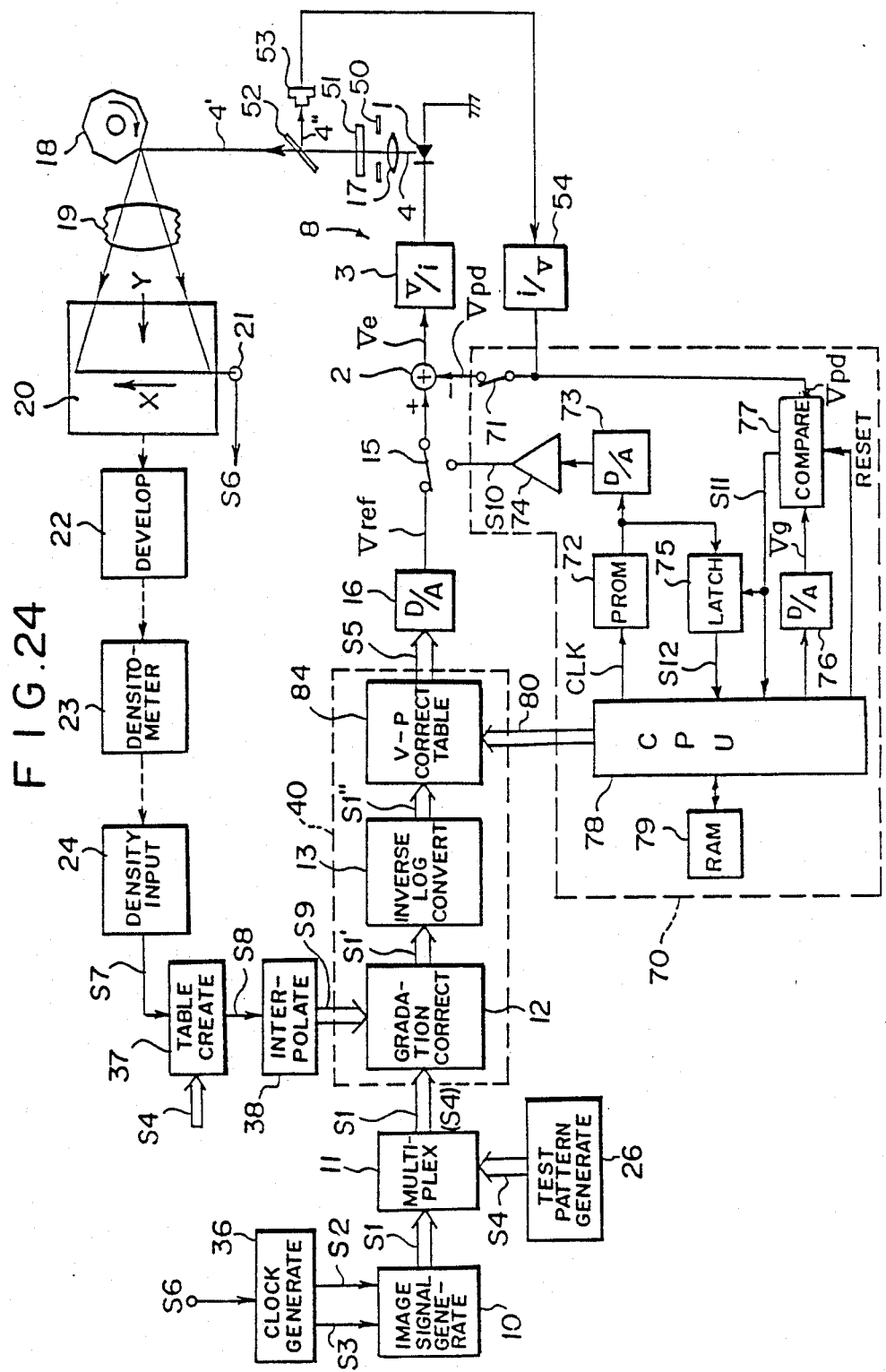
FIG. 24 is a schematic view showing an embodiment of the sixth laser beam recording apparatus in accordance with the present invention.

An embodiment of the sixth laser beam recording apparatus in accordance with the present invention will now be described with reference to FIG. 24. In FIG. 24, similar elements are numbered with the same reference numerals with respect to FIG. 11, except that the reference numeral 15 denotes a signal change-over switch. In the embodiment shown in FIG. 24, the image signal S1 generated by the image signal generator 10 is corrected by the correction table 40 via the multiplexer 11, and is converted into the light emission level instructing signal S5 of 16 bits for example. The light emission level instructing signal S5 is fed to the D/A converter 16, and is converted by the D/A converter 16 into the light emission level instructing signal Vref composed of an analog voltage signal. The light emission level instructing signal Vref is fed to the addition point 2 of the APC circuit 8 via the signal change-over switch 15. The addition point 2, the voltage-to-current conversion amplifier 3, and the semiconductor laser 1 of the APC circuit 8 are equivalent to the ones in the circuit mentioned above with reference to FIG. 3.

The laser beam 4" reflected by the semi-transparent mirror 52 for branching a part of the laser beam 4' is received by the photodetector 53 constituted by a photodiode or the like. The output current of the photodetector 53 represents the intensity of the laser beam 4". The intensity of the laser beam 4" corresponds to the intensity of the scanning beam 4', and therefore the output current of the photodetector 53 represents the intensity of the scanning beam 4'. The output current is converted by the current-to-voltage conversion amplifier 54 into a voltage signal, which is then fed as the feedback signal Vpd to the addition point 2. Specifically, in this embodiment, the APC circuit 8 is constituted to include the photodetector 53, the current-to-voltage conversion amplifier 54, and the line from the photodetector 53 to the addition point 2. In the APC circuit 8, unlike the APC circuit 8 shown in FIG. 3, the feedback signal Vpd representing the light amount of the laser beam 4' after passage through the aperture stop plate 50 and the polarizing filter 51 is fed to the addition point 2. Therefore, both the nonlinearity of the optical output characteristics of the semiconductor laser 1 with respect to the drive current and the nonlinearity of the optical transmittance characteristics of the aperture stop plate 50 and the polarizing filter 51 with respect to the incident light intensity are eliminated to some extent by the APC circuit 8.

In the embodiment shown in FIG. 24, the V-P characteristics correction table 84 is provided for making linear the relationship between the intensity of the scanning beam 4' and the light emission level instructing signal in the same manner as mentioned with reference to FIG. 12 for the embodiment shown in FIG. 11. Thus the nonlinearity of the scanning beam intensity characteristics with respect to the light emission level instructing signal, which nonlinearity is caused by nonlinearity of the optical output characteristics of the semiconductor laser 1 with respect to the drive current and nonlinearity of the optical transmittance characteristics of the aperture stop plate 50 and the polarizing filter 51 with respect to the incident light intensity, is eliminated and said characteristics are made linear by the V-P characteristics correction table 84 as mentioned with reference to the embodiment shown in FIG. 11. Accordingly, the loop gain of the system of the APC circuit 8 passing through the addition point 2, the voltage-to-current conversion amplifier 3, the semiconductor laser 1, the photodetector 6, and the current-to-voltage conversion amplifier 54 and then returning to the addition point 2 need not include the gain necessary for the correction for eliminating the aforesaid nonlinearity. Thus it is only necessary that the loop gain be of a value required for the compensation for deviations of the optical output characteristics of the semiconductor laser 1 with respect to the drive current which are caused by transitional changes in the temperature arising in the course of the operation of the semiconductor laser 1 or by error or hunting in the control for making constant the temperature in the case of the semiconductor laser 1, and for the compensation for drifts of the amplifiers or the like. Specifically, in the case where the picture element clock frequency is 1 MHz and the semiconductor laser 1 is operated to generate an optical output of 3 mW, it is only necessary that the aforesaid loop gain be approximately 30 dB as in the other embodiments. As mentioned above, the loop gain of this order can be achieved easily with the present technical level.

In the embodiment shown in FIG. 24, the table creation means 70 is of the same type as the table creation means 70 in the embodiment shown in FIG. 16, and the V-P characteristics correction table 84 is created in the same manner as mentioned with reference to FIG. 16, except that the feedback signal Vpd representing the light amount of the laser beam 4' after passage through the aperture stop plate 50 and the polarizing filter 51 is fed from the current-to-voltage conversion amplifier 54 of the APC circuit 8 to the table creation means 70. Thus in this case, the signal S12 latched by the latch 75 represents the value of ΔV as shown in FIG. 12 at the time the value of the reference signal Vg is equal to Vin. The tables for converting 1024 signal values Vin(n) to V(n) created in the RAM 79 by the calculation expressed as $$V(n) = Vg(n) + \Delta V(n)$$

in the same manner as with the table creation means 70 in the embodiment shown in FIG. 16 are sent to the RAM constituting the correction table 40 via the signal line 80, and are set as the V-P characteristics correction table 84. The correction table 84 is formed to convert the voltage value Vin into the voltage value V as shown in FIG. 12. Therefore, the relationship between the light emission level instructing signal S1" prior to the passage through the correction table 84 and the scanning beam intensity Ps becomes linear.

Figure 25:
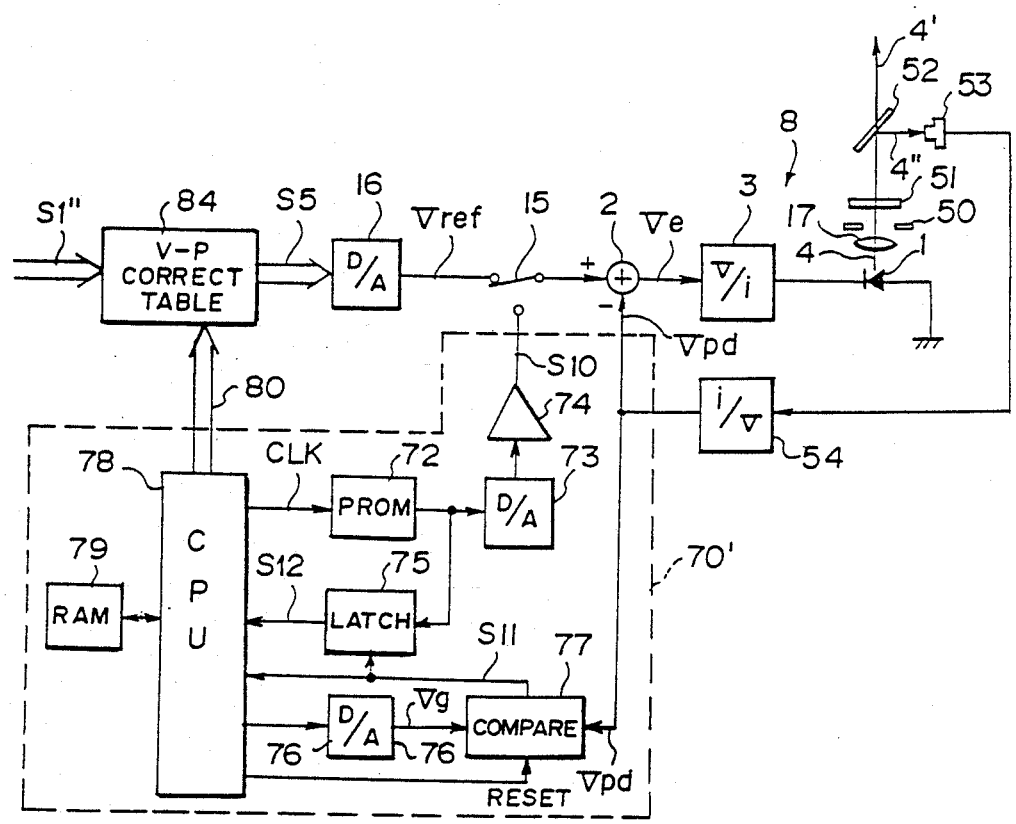
FIG. 25 is a block diagram showing the semiconductor laser operation control circuit and the table creation means in another embodiment of the sixth laser beam recording apparatus in accordance with the present invention.

Another embodiment of the sixth laser beam recording apparatus in accordance with the present invention will hereinbelow be described with reference to FIG. 25. In FIG. 25, similar elements are numbered with the same reference numerals with respect to FIG. 24 (this also applies to FIGS. 26 and 27). Though only the laser operation control circuit and the table creation means 70' are shown in FIG. 25, the sections such as the laser beam scanning system in this embodiment which are not shown in FIG. 25 are formed in the same manner as in the embodiment shown in FIG. 24. The table creation means 70' in the embodiment shown in FIG. 25 is different from the table creation means 70 shown in FIG. 24 only in that the switch 71 is removed. Specifically, in this embodiment, the APC circuit 8 is operated in the same manner as the normal operation used also in the course of the creation of the correction table 84. Therefore, in this embodiment, the signal S12 latched by the latch 75 at the time the coincidence signal S11 is fed corresponds to the voltage value V as shown in FIG. 12. In this case, the CPU 78 directly determines the values of V(n) without carrying out the calculation expressed as $$V(n) = Vg(n) + \Delta V(n)$$

and creates the tables for converting the voltage values Vg(n) into V(n).

A further embodiment of the sixth laser beam recording apparatus in accordance with the present invention will hereinbelow be described with reference to FIG. 26. In this embodiment, the light emission level instructing signal S1" generated by the inverse logarithmic conversion table 13 is directly fed to the D/A converter 16. On the other hand, the light emission level instructing signal S1" is branched and fed to the V-P characteristics correction table 104. The V-P characteristics correction table 104 is slightly different from the V-P characteristics correction table 84 as shown in FIG. 24, and is constituted for calculating the difference ΔV between the voltage values V and Vin shown in FIG. 12. The digital signal S5' representing the voltage difference ΔV is converted by the D/A converter 45 into an analog signal, and is then added to the voltage value Vin (which corresponds to the light emission level instructing signal S1") at the addition point 2. This operation is equivalent to the feeding of the signal representing the voltage value V as the light emission level instructing signal Vref to the addition point 2 as in the embodiment shown in FIG. 24, and therefore the same effects as mentioned above can be obtained.

Figure 26:
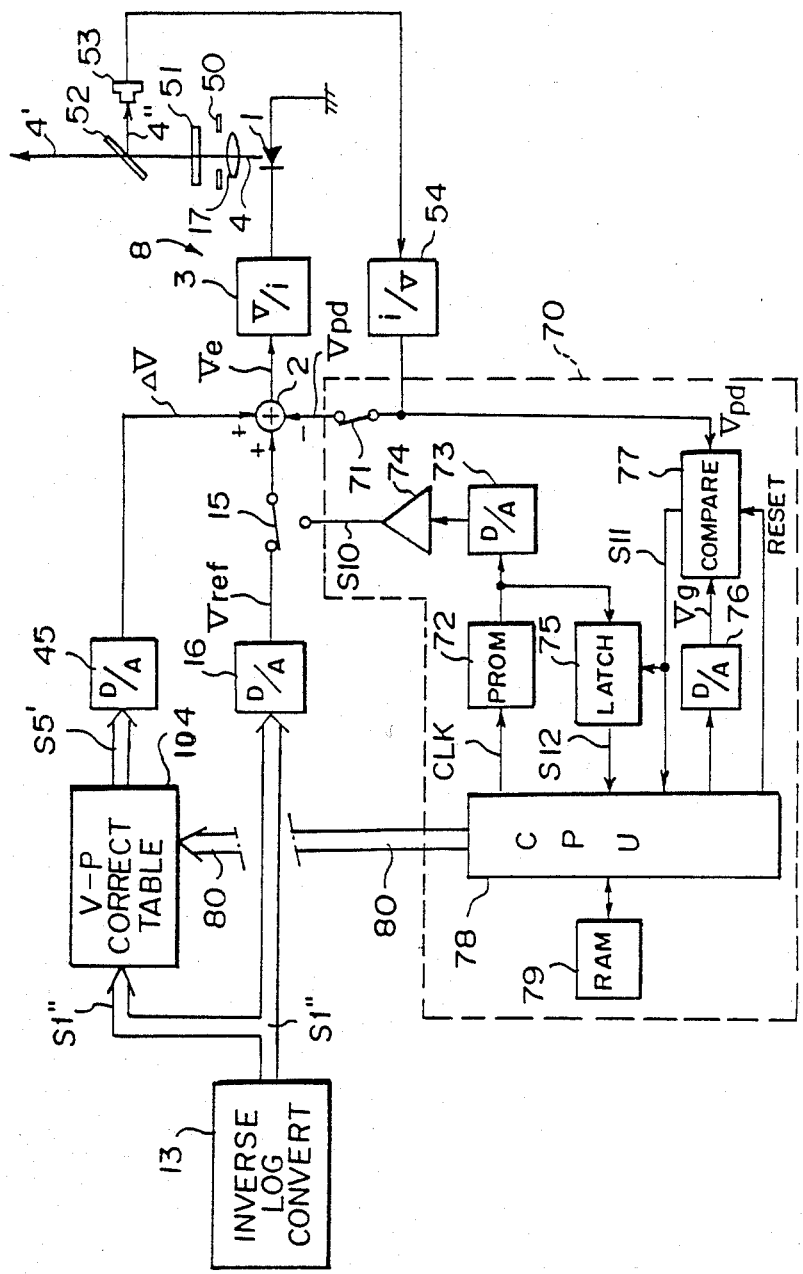
FIG. 26 is a block diagram showing the semiconductor laser operation control circuit and the table creation means in a further embodiment of the sixth laser beam recording apparatus in accordance with the present invention.

In the embodiment shown in FIG. 26, since the V-P characteristics correction table 104 must be formed to determine the voltage difference ΔV as mentioned above, it is impossible to use the table creation means 70' shown in FIG. 25. Therefore, a table creation table 70 of the same type as the table creation table 70 shown in FIG. 24 is used. Also, in this case, the table creation means 70 does not carry out the aforesaid operation expressed as $$V(n) = Vg(n) + \Delta V(n),$$

but instead creates the correction table 104 which generates the values of ΔV(n) represented by the signal S12 with respect to the reference signals Vg(n).

A still further embodiment of the sixth laser beam recording apparatus in accordance with the present invention will now be described with reference to FIG. 27. In this embodiment, the light emission level instructing signal S1" is branched and fed to the V-P characteristics correction table 104 for carrying out correction as mentioned above, and the obtained signal S5' is converted by the D/A converter 45 into the analog signal in the same manner as in the embodiment shown in FIG. 26. However, the voltage signal ΔV generated by the D/A converter 45 is not fed to the addition point 2, but instead is fed to the voltage-to-current conversion amplifier 46 which converts the voltage signal ΔV into a current Δi. The current Δi is added to a drive current, which is obtained by conversion of the deviation signal Ve, at the addition point 47 disposed at the stage after the voltage-to-current conversion amplifier 3 of the APC circuit 8. This embodiment is different from the embodiment shown in FIG. 26 only in that the voltage signal ΔV is not directly fed to the APC circuit 8, but instead is converted into the current Δi and then fed to the APC circuit 8. Therefore, also with this embodiment, the same effects as with the embodiment shown in FIG. 24 are obtained.

Figure 27:
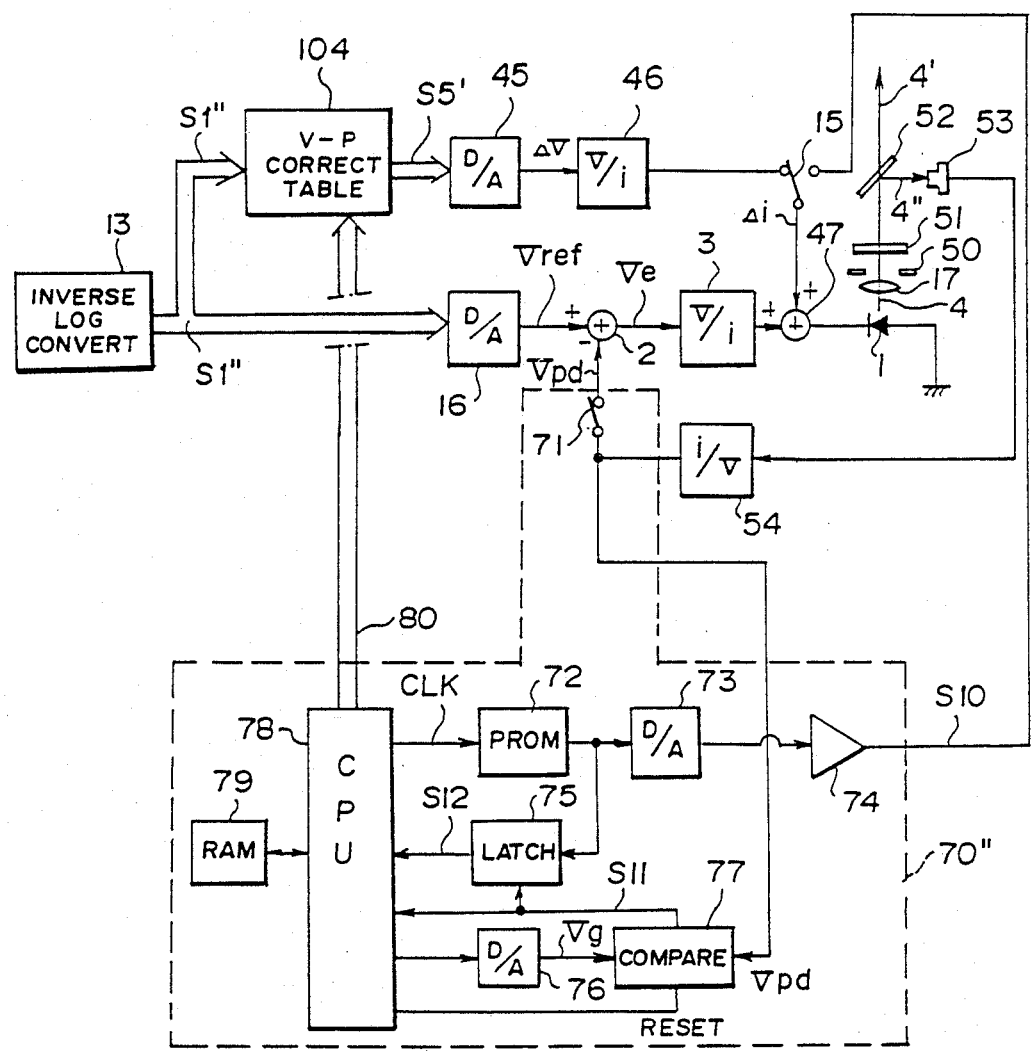
FIG. 27 is a block diagram showing the semiconductor laser operation control circuit and the table creation means in a still further embodiment of the sixth laser beam recording apparatus in accordance with the present invention.

The table creation means 70" in the embodiment shown in FIG. 27 is different from the table creation means 70 shown in FIG. 24 only in that the test signal S10 is fed to the addition point 47. However, also in this case, the signal S12 representing the voltage value ΔV shown in FIG. 12 is fed to the CPU 78. Therefore, the CPU 78 may be constituted to create the correction table 104 for generating the values of ΔV(n) with respect to the reference signals Vg(n) on the basis of the signal S12 and the reference signals Vg(n).

Figure 28:
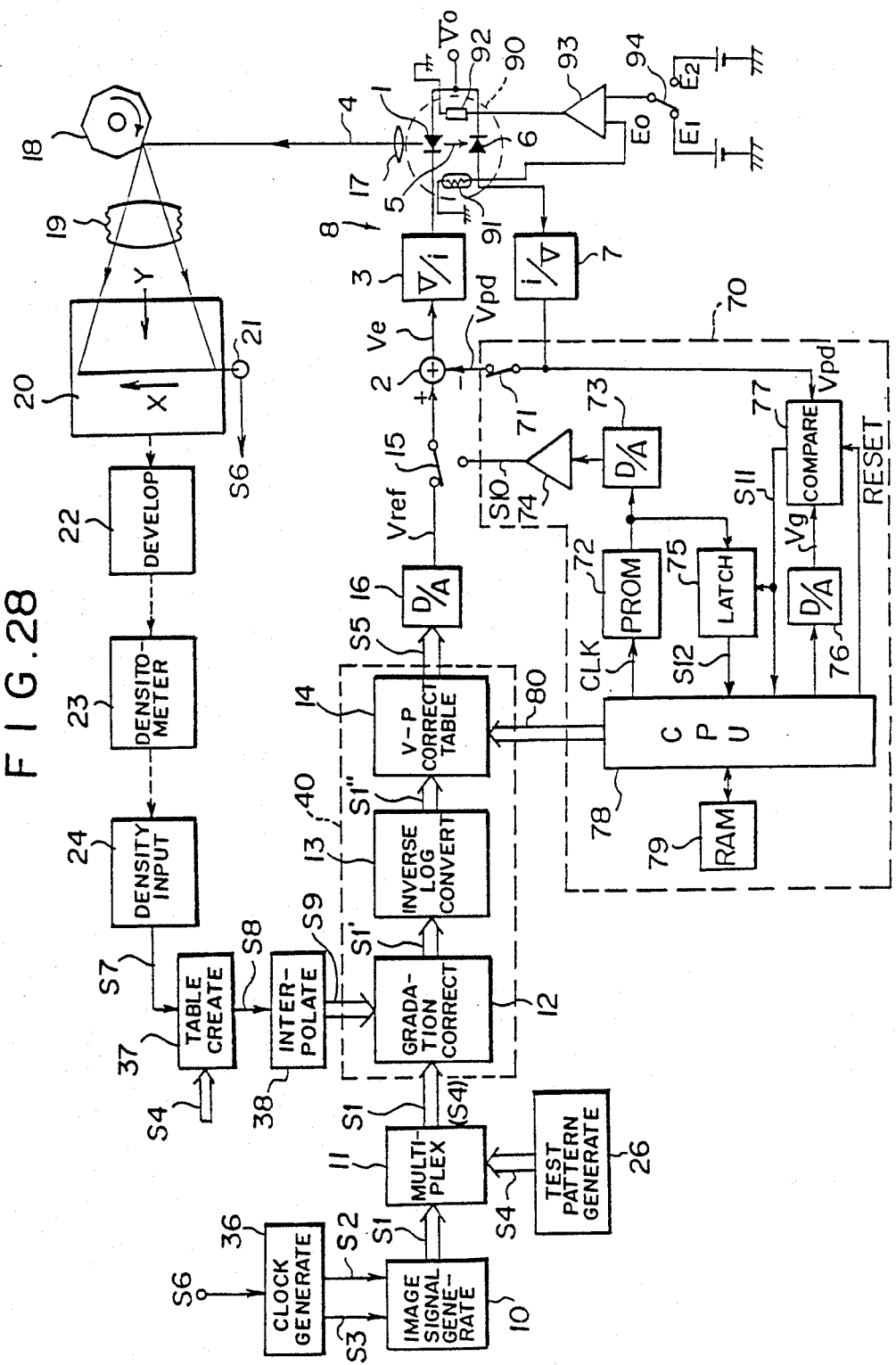
FIG. 28 is a schematic view showing an embodiment of the seventh laser beam recording apparatus in accordance with the present invention.

An embodiment of the seventh laser beam recording apparatus in accordance with the present invention will hereinbelow be described with reference to FIG. 28. In FIG. 28, similar elements are numbered with the same reference numerals with respect to FIG. 16. In this embodiment, the tables for converting 1024 signal values Vin(n) to V(n) created in the RAM 79 by the calculation expressed as $$V(n) = Vg(n) + \Delta V(n)$$

in the same manner as with the table creation means 70 in the embodiment shown in FIG. 16 are sent to the RAM constituting the correction table 40 via the signal line 80, and are set as the V-P characteristics correction table 14.

In this embodiment, the V-P characteristics correction table 14 is formed as described below so that the optical output characteristics of the semiconductor laser 1 with respect to the light emission level instructing signal can be particularly accurately corrected to the linear characteristics. As shown in FIG. 28, a thermistor 91 and an electronic heating and cooling element 92 are disposed in a case 90 housing the semiconductor laser 1. The thermistor 91 is connected to a comparator 93 which compares a voltage Eo at one terminal of the thermistor 91 with a reference voltage E1 or a reference voltage E2. The comparator 93 generates an output in accordance with the results of the comparison, and controls the operation of the electronic heating and cooling element 92 to maintain the temperature in the case 90 at the value corresponding to the reference voltage E1 or the reference voltage E2. The reference voltage E1 and the reference voltage E2 are selectively applied to the comparator 93 by change-over of a switch 94. In the course of normal image recording, the switch 94 is maintained in the condition for applying the reference voltage E1 to the comparator 93. As a result, the temperature in the case 90 is maintained at, for example, 48° C. On the other hand, at the time the correction table 14 is to be created in the same manner as mentioned with reference to FIG. 16, the switch 94 is changed over to the condition for applying the reference voltage E2 to the comparator 93, and the temperature in the case 90 is thus maintained at, for example, 44° C.

The timing of the comparison of the feedback signal Vpd with the reference signal Vg in the comparator 77 of the table creation means 70 is adjusted so that the comparison is carried out at the time the optical output of the semiconductor laser 1 has converged to the steady condition via the transitional change as shown in FIG. 7C.

With reference to FIG. 7B, it has been found that the extent of increase in the temperature of the laser diode chip arising when the current is applied step-wise to the semiconductor laser 1 is approximately 10° C. for the ordinary semiconductor laser. Also, as indicated by the chain line in FIG. 29, the optical output of the semiconductor laser 1 undershoots when the applied current is intercepted stepwise after the optical output of the semiconductor laser 1 has converged to the steady condition. It has been found that the extent of decrease in the optical output caused by undershooting corresponds to the extent of the decrease arising in the case where the temperature of the laser diode chip increases by approximately 2° C. Consequently, even though the control for maintaining the temperature in the case 90 at 48° C. is carried out in the course of image recording, there is the risk of the optical output of the semiconductor laser 1 decreasing to the optical output corresponding to the case where the temperature in the case 90 is higher by 12° C. than 48° C. Accordingly, when the laser beam intensity is measured at the time the temperature of the chip has changed by a half of the aforesaid change width, i.e. at the time the temperature is equal to $(48+12)-12/2=54°$ C., in the course of creation of the V-P characteristics correction table 14, the correction table 14 capable of achieving the correction accurately even though the recording timing for a single picture element in the course of image recording fluctuates can be obtained.

As mentioned above, the extent of increase in the temperature of the laser diode chip at the time the current is applied step-wise to the semiconductor laser 1 is approximately 10° C. Therefore, the control for adjusting the temperature in the case 90 at $54-10=44°$ C. is carried out in the course of creation of the correction table 14, and the intensity of the laser beam 4 is measured at the time the optical output of the semiconductor laser 1 has converged to the steady condition. As a result, the laser beam intensity at the time the chip temperature is 54° C. is measured. Accordingly, in the embodiment shown in FIG. 28, the correction table 14 capable of achieving the correction accurately can be obtained.

Figure 30:
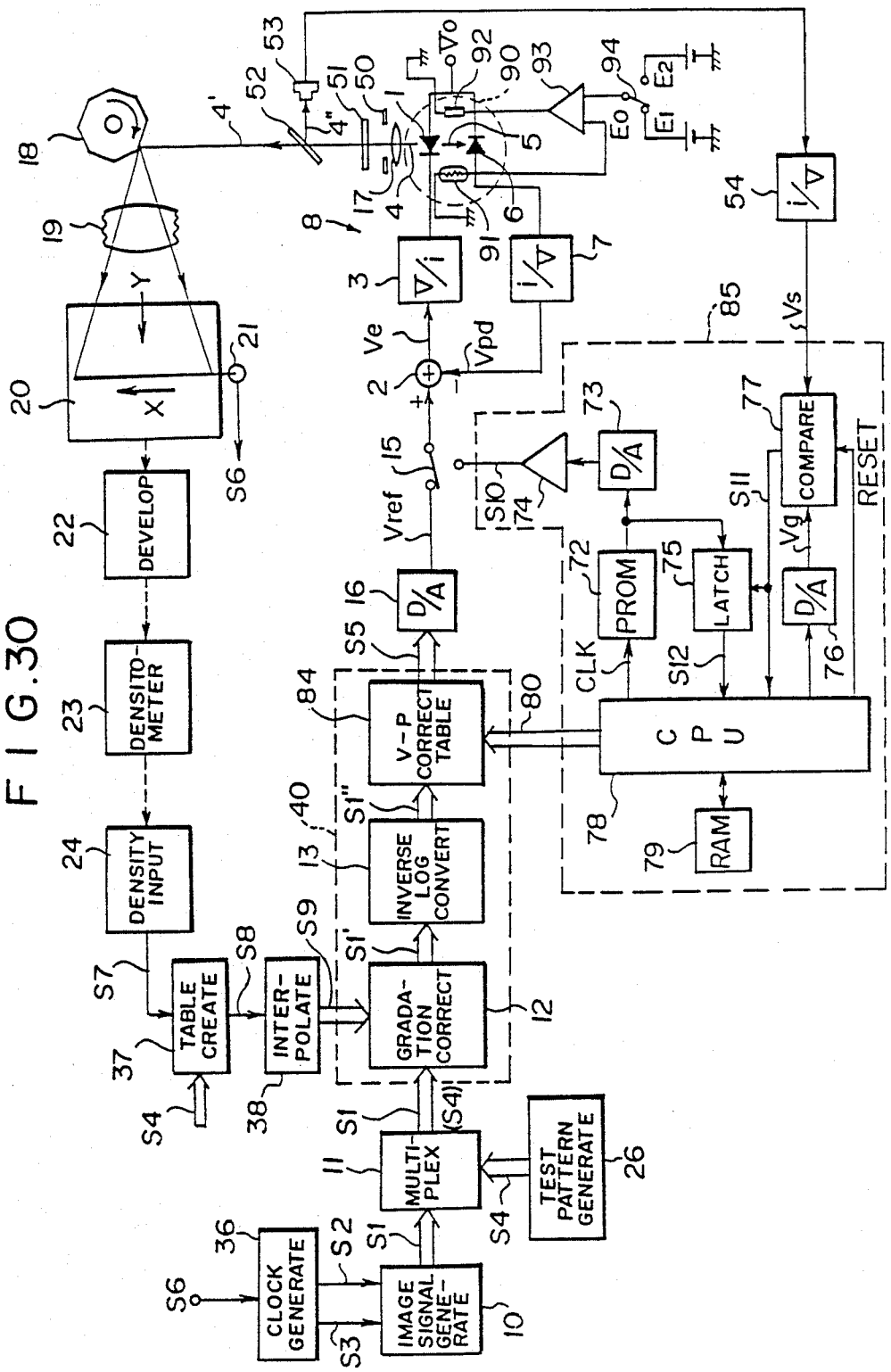
FIG. 30 is a schematic view showing another embodiment of the seventh laser beam recording apparatus in accordance with the present invention.

FIG. 30 shows another embodiment of the seventh laser beam recording apparatus in accordance with the present invention. In FIG. 30, similar elements are numbered with the same reference numerals with respect to FIG. 28. Though the nonlinearity of the optical output characteristics of the semiconductor laser 1 with respect to the drive current is eliminated in the embodiment shown in FIG. 28, the nonlinearity of the optical transmittance characteristics of the optical element of the beam scanning system with respect to the incident light intensity is also eliminated in the embodiment shown in FIG. 30.

In the embodiment shown in FIG. 30, the aperture stop plate 50, the polarizing filter 51, the semi-transparent mirror 52, the photodetector 53, the current-to-voltage conversion amplifier 54, the V-P characteristics correction table 84, and the table creation means 85 of the same type as in FIG. 21 are provided. In the course of creation of the V-P characteristics correction table 84, the tables for converting 1024 signal values Vin(n) into the values V(n) which are created in the RAM 79 in the same manner as mentioned with reference to FIG. 21 are sent to the RAM constituting the correction table 40 via the signal line 80, and are set as the V-P characteristics correction table 84.

Also in the embodiment shown in FIG. 30, the thermistor 91, the electronic heating and cooling element 92, the comparator 93 and the switch 94 of the same types as in FIG. 28 are provided, and the temperature of the case 90 housing the semiconductor laser 1 is adjusted to 48° C. in the course of image recording and to 44° C. in the course of creation of the V-P characteristics correction table 84. Also, as in the embodiment shown in FIG. 28, the timing of comparison of the scanning beam intensity signal Vs with the reference signal Vg in the course of creation of the V-P characteristics correction table 84 carried out in the same manner as mentioned with reference to FIG. 21 is adjusted so that the comparison is effected at the time the optical output of the semiconductor laser 1 has converged to the steady condition via the transitional changes as shown in FIG. 7C. Accordingly, also in this case, the V-P characteristics correction table 84 capable of achieving the correction accurately can be obtained.

Figure 29:
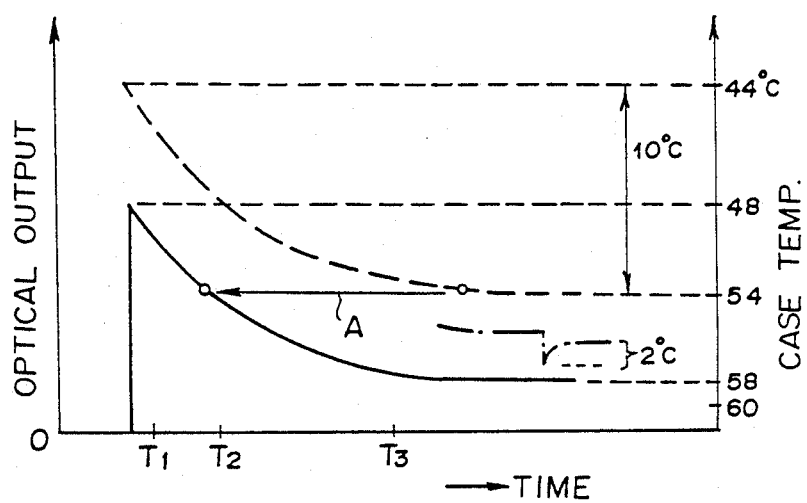
FIG. 29 is an explanatory view showing the effects of the seventh laser beam recording apparatus in accordance with the present invention.

In the embodiments shown in FIGS. 28 and 30, the temperature in the case 90 housing the semiconductor laser 1 is adjusted by taking the effects of undershooting as indicated by the chain line in FIG. 29 into consideration. However, the effects of undershooting need not necessarily be taken into consideration. In this case, when the temperature in the case 90 in the course of image recording is adjusted to 48° C., the temperature in the case 90 in the course of creation of the V-P characteristics correction table 84 may be controlled at 43° C.

Figure 31:
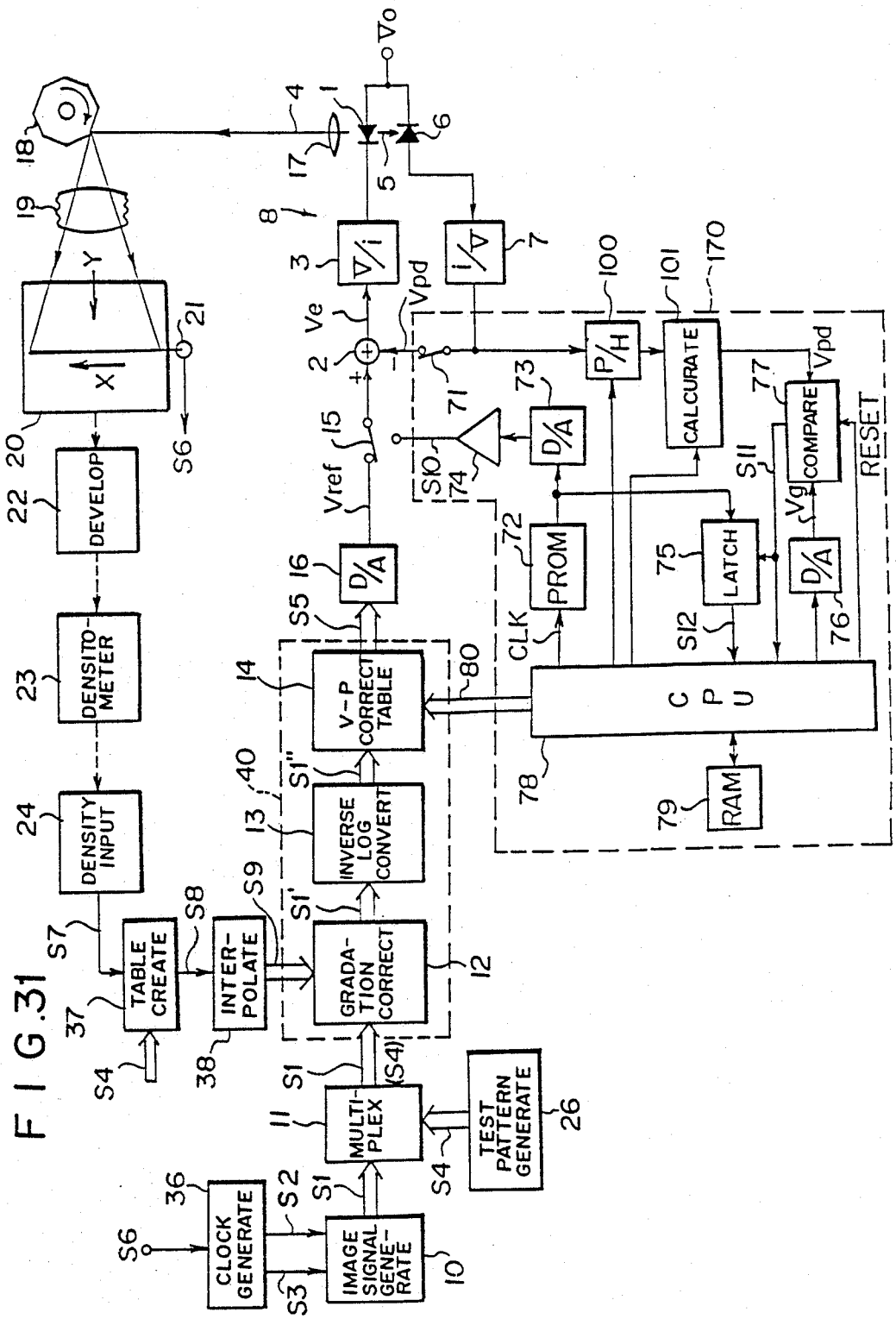
FIG. 31 is a schematic view showing an embodiment of the eighth laser beam recording apparatus in accordance with the present invention.

An embodiment of the eighth laser beam recording apparatus in accordance with the present invention will hereinbelow be described with reference to FIG. 31. In FIG. 31, similar elements are numbered with the same reference numerals with respect to FIG. 16. A table creation means 170 in this embodiment is constituted in the same manner as the table creation means 70 shown in FIG. 16, except that a peak holding circuit 100 and a calculation circuit 101 are added. The tables for converting 1024 signal values Vin(n) to V(n) created in the RAM 79 by the calculation expressed as $$V(n) = Vg(n) + \Delta V(n)$$

in the same manner as with the table creation means 70 in the embodiment shown in FIG. 16 are sent to the RAM constituting the correction table 40 via the signal line 80, and are set as the V-P characteristics correction table 14.

Figure 32A:
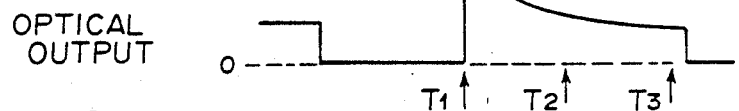
FIGS. 32A, 32B and 32C are explanatory views showing the effects of the eighth laser beam recording apparatus in accordance with the present invention.
Figure 32B:
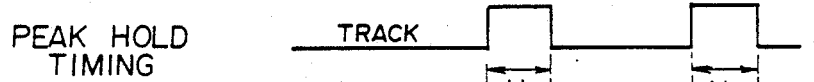
Figure 32C:
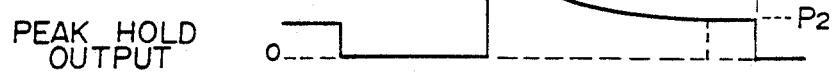

In this embodiment, the V-P characteristics correction table 14 is formed as described below so that the optical output characteristics of the semiconductor laser 1 with respect to the light emission level instructing signal can be particularly accurately corrected to the linear characteristics. As shown in FIG. 31, the peak holding circuit 100, which is controlled by the CPU 78, and the calculation circuit 101 are disposed between the current-to-voltage conversion amplifier 7 and the comparator 77 of the table creation means 170. The peak holding circuit 100 applies peak holding to the output of the amplifier 7 in a first period H1 including the optical output rise timing of the semiconductor laser 1 by the input of the test signal S10 and in a second period H2 after the optical output of the semiconductor laser 1 has converged nearly to the steady condition as shown in FIGS. 32A and 32B. As shown in FIG. 32C, the signals peak-held in the periods H1 and H2 respectively represent the maximum value P1 (i.e. the peak value at the time of the rising of the optical output) and the minimum value P2 (i.e. the value at the time the optical output has converged to the steady condition) of the optical output of the semiconductor laser 1 changing based on the drooping characteristics. The signals representing the maximum value P1 and the minimum value P2 are fed to the calculation circuit 101. Based on the signals, the calculation circuit 101 carries out calculation expressed as $$P3 = P2 + 0.4(P1 - P2),$$

and feeds the signal representing the value P3 as the feedback signal Vpd to the comparator 77.

It has been known that the optical output of the semiconductor laser 1 undershoots when the applied current is intercepted step-wise after the optical output has converged to the steady condition, and the extent of the undershooting is, in general, approximately 20% of the aforesaid change width (P1−P2). Therefore, the laser beam intensity P3 is approximately equal to the median value of the optical output change width in the case where the undershooting is taken into consideration as well as the drooping characteristics. When the feedback signal Vpd representing the median value P3 is fed to the comparator 77 and the V-P characteristics correction table 14 is created based on the feedback signal Vpd, the V-P characteristics correction table 14 capable of achieving the correction accurately even though the recording timing for a single picture element fluctuates in the course of image recording can be obtained.

In this embodiment, the test signal S10 whose level changes step-wise as shown in FIG. 17 is used. Specifically, the test signal S10 includes short no-signal periods at the level change points. Therefore, as shown in FIG. 32A, the semiconductor laser 1 is turned off before it is turned on by each level of the test signal S10, whereby the laser diode chip is allowed to cool before the measurement of the optical output is effected.

In the embodiment shown in FIG. 31, the value of k is adjusted to 0.4, and the V-P characteristics correction table 14 is created based on the median value of the width of the optical output change given rise to by the drooping characteristics and the undershooting in the course of image recording carried out without correction by the V-P characteristics correction table 14. However, the value of k may be adjusted to any other value satisfying the condition of $0.0 < k < 1.0$, preferably satisfying the condition of $0.2 < k < 0.6$.

Figure 33:
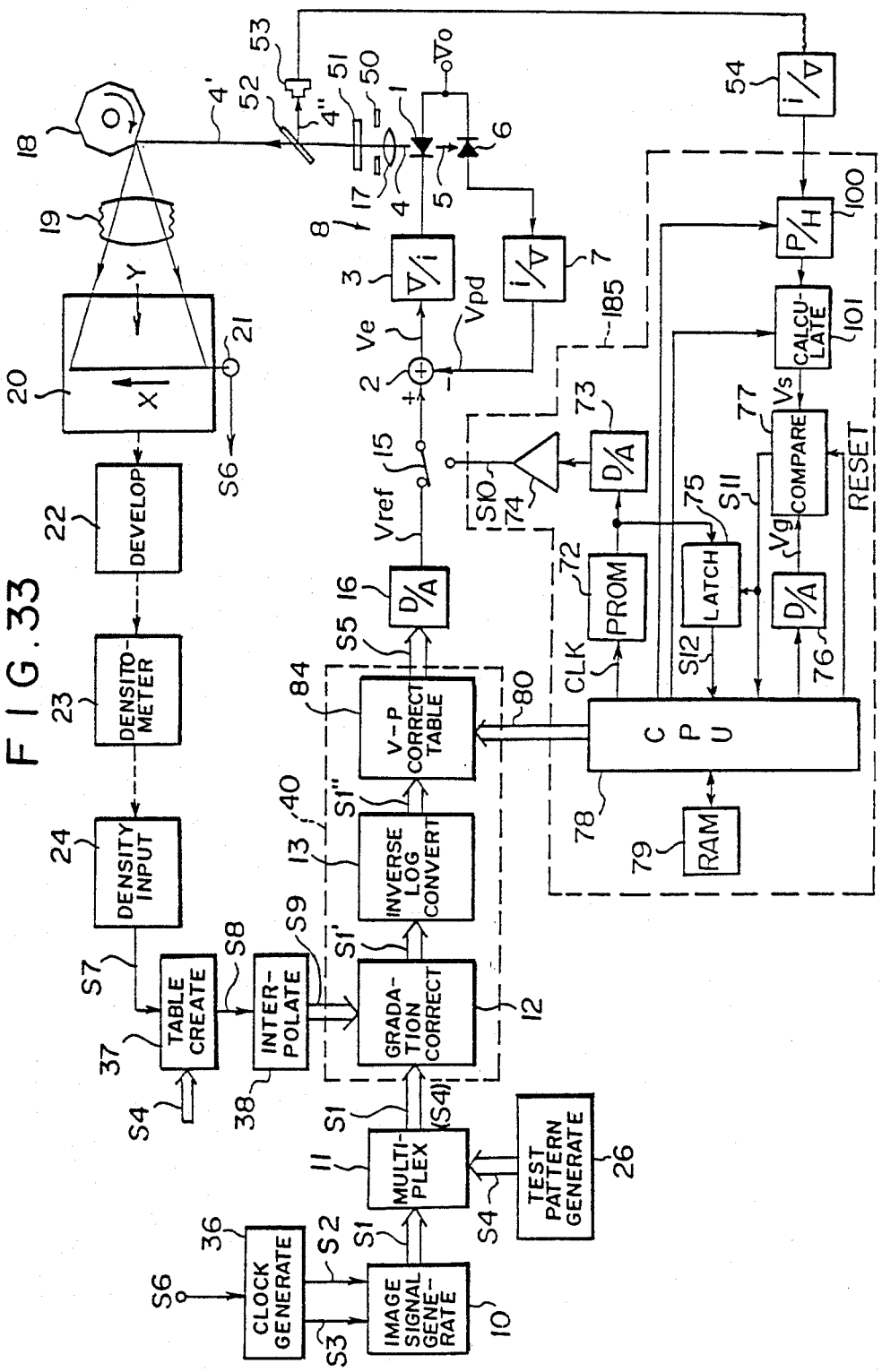
FIG. 33 is a schematic view showing another embodiment of the eighth laser beam recording apparatus in accordance with the present invention.

FIG. 33 shows another embodiment of the eighth laser beam recording apparatus in accordance with the present invention. In FIG. 33, similar elements are numbered with the same reference numerals with respect to FIG. 31. Though the nonlinearity of the optical output characteristics of the semiconductor laser 1 with respect to the drive current is eliminated in the embodiment shown in FIG. 31, the nonlinearity of the optical transmittance characteristics of the optical element of the beam scanning system with respect to the incident light intensity is also eliminated in the embodiment shown in FIG. 33.

In the embodiment shown in FIG. 33, the aperture stop plate 50, the polarizing filter 51, the semi-transparent mirror 52, the photodetector 53, the current-to-voltage conversion amplifier 54, and the V-P characteristics correction table 84 of the same type as in FIG. 21 are provided. A table creation means 185 shown in FIG. 33 is constituted in the same manner as the table creation means 85 shown in FIG. 21, except that the peak holding circuit 100 and the calculation circuit 101 are added. The test signal S10 of the same type as in the embodiment shown in FIG. 31 is used also in this embodiment. In the course of creation of the V-P characteristics correction table 84, the tables for converting 1024 signal values Vin(n) into the values V(n) which are created in the RAM 79 in the same manner as mentioned with reference to FIG. 21 are sent to the RAM constituting the correction table 40 via the signal line 80, and are set as the V-P characteristics correction table 84.

Also in the embodiment shown in FIG. 33, the peak holding circuit 100 and the calculation circuit 101 of the same types as in FIG. 31 are provided. The peak holding circuit 100 carries out peak holding of the output of the current-to-voltage conversion amplifier 54 in the first period H1 and in the second period H2 as shown in FIG. 32B, and the calculation circuit 101 carries out the aforesaid calculation expressed as $$P3 = P2 + 0.4(P1 - P2)$$

based on the peak-held signals. Accordingly, also in this case, the V-P characteristics correction table 84 capable of achieving the correction accurately can be obtained.

In the embodiments shown in FIGS. 31 and 33, the value of k is adjusted by taking the effects of the aforesaid undershooting into consideration. However, the effects of undershooting need not necessarily be taken into consideration.

Figure 34:
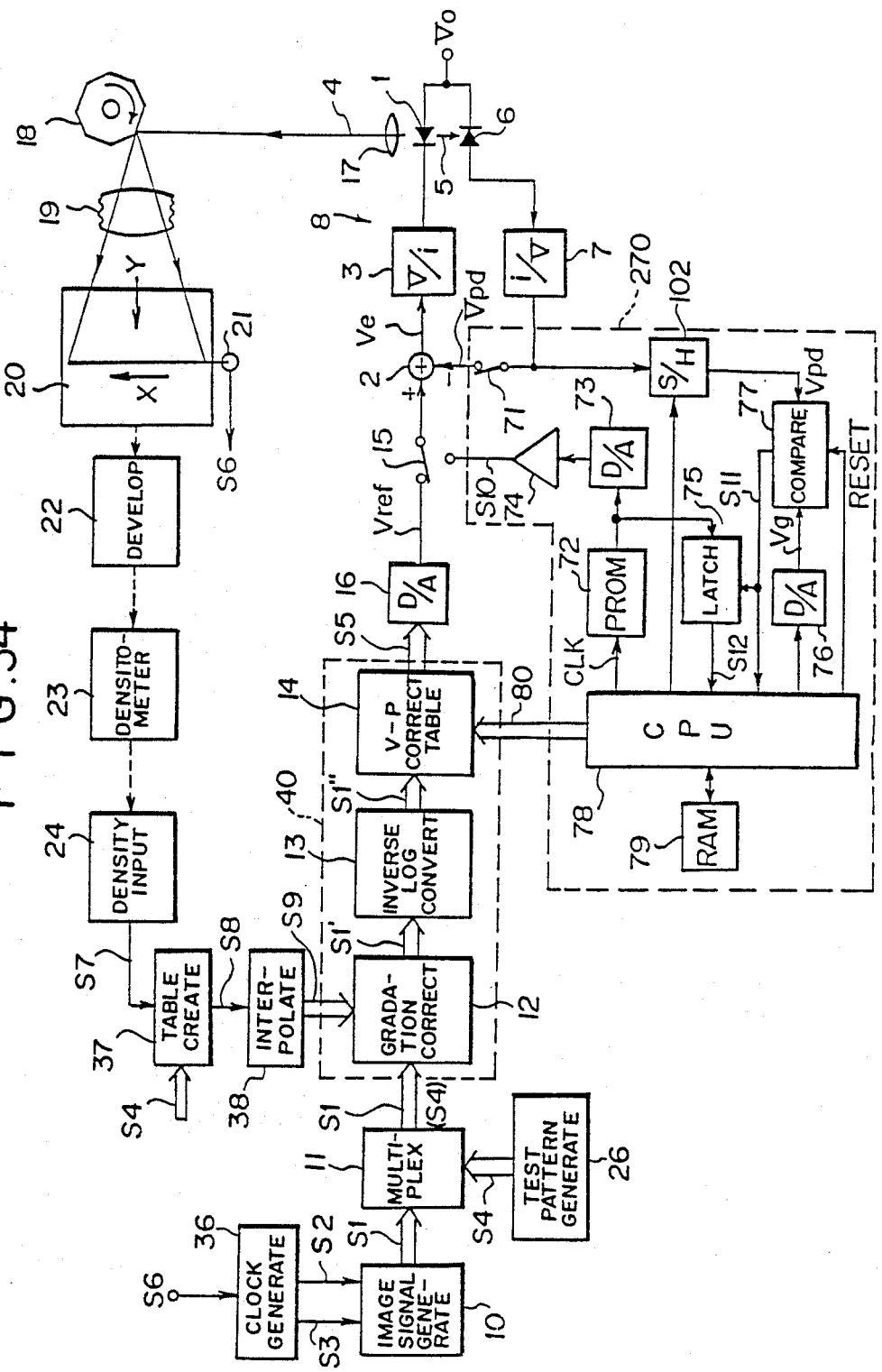
FIG. 34 is a schematic view showing an embodiment of the ninth laser beam recording apparatus in accordance with the present invention.

An embodiment of the ninth laser beam recording apparatus in accordance with the present invention will hereinbelow be described with reference to FIG. 34. In FIG. 34, similar elements are numbered with the same reference numerals with respect to FIG. 16. A table creation means 270 in this embodiment is constituted in the same manner as the table creation means 70 shown in FIG. 16, except that a sample holding circuit 102 is added. The tables for converting 1024 signal values Vin(n) to V(n) created in the RAM 79 by the calculation expressed as $$V(n) = Vg(n) + \Delta V(n)$$

in the same manner as with the table creation means 70 in the embodiment shown in FIG. 16 are sent to the RAM constituting the correction table 40 via the signal line 80, and are set as the V-P characteristics correction table 14.

In this embodiment, the V-P characteristics correction table 14 is formed as described below so that the optical output characteristics of the semiconductor laser 1 with respect to the light emission level instructing signal can be particularly accurately corrected to the linear characteristics. As shown in FIG. 34, the sample holding circuit 102, which is controlled by the CPU 78, is disposed between the current-to-voltage conversion amplifier 7 and the comparator 77 of the table creation means 270. The sample holding circuit 102 sample-holds the output of the current-to-voltage conversion amplifier 7 at the time a period equal to a time constant $\tau$ of the transitional temperature increase of the semiconductor laser 1 as shown in FIG. 7B has elapsed after the input of each level of the test signal S10 as shown in FIGS. 35A and 35B. The sample-held output of the amplifier 7 is fed as the aforesaid feedback signal Vpd to the comparator 77. As mentioned above, the feedback signal Vpd sample-held with this timing represents approximately the median value of the optical output change width in the case where the undershooting at the time of interception of the applied current is taken into consideration as well as the drooping characteristics of the semiconductor laser 1.

When the V-P characteristics correction table 14 is created based on the feedback signal Vpd representing such an optical output, i.e. such a laser beam intensity, the V-P characteristics correction table 14 capable of achieving the correction accurately even though the recording timing for a single picture element fluctuates in the course of image recording can be obtained.

In this embodiment, the test signal S10 whose level changes step-wise as shown in FIG. 17 is used. Specifically, the test signal S10 includes short no-signal periods at the level change points. Therefore, as shown in FIG. 35A, the semiconductor laser 1 is turned off before it is turned on by each level of the test signal S10, whereby the laser diode chip is allowed to cool before the measurement of the optical output is effected.

Figure 36:
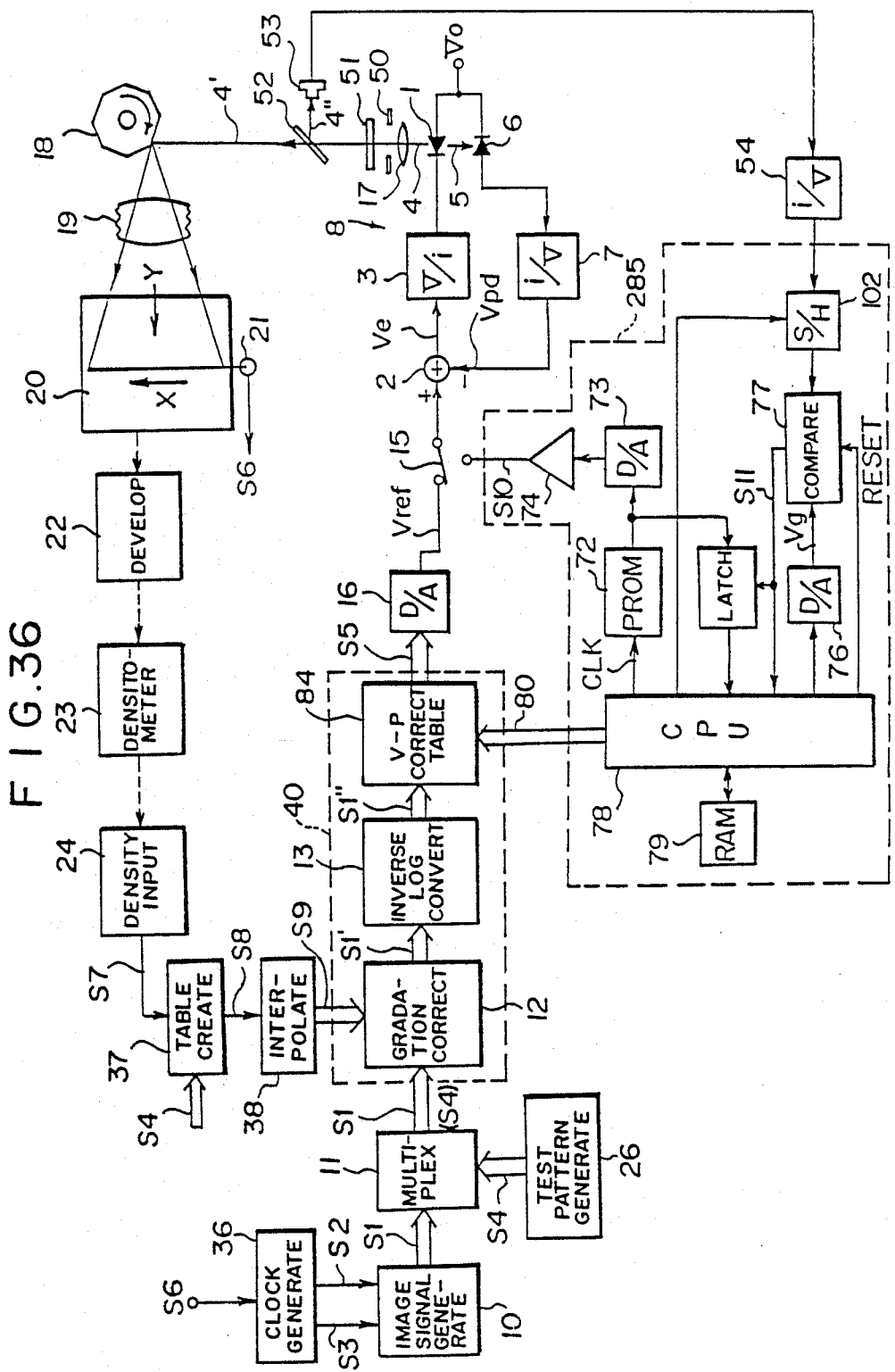
FIG. 36 is a schematic view showing another embodiment of the ninth laser beam recording apparatus in accordance with the present invention.

FIG. 36 shows another embodiment of the ninth laser beam recording apparatus in accordance with the present invention. In FIG. 36, similar elements are numbered with the same reference numerals with respect to FIG. 34. Though the nonlinearity of the optical output characteristics of the semiconductor laser 1 with respect to the drive current is eliminated in the embodiment shown in FIG. 34, the nonlinearity of the optical transmittance characteristics of the optical element of the beam scanning system with respect to the incident light intensity is also eliminated in the embodiment shown in FIG. 36.

In the embodiment shown in FIG. 36, the aperture stop plate 50, the polarizing filter 51, the semi-transparent mirror 52, the photodetector 53, the current-to-voltage conversion amplifier 54, and the V-P characteristics correction table 84 of the same type as in FIG. 21 are provided. A table creation means 285 shown in FIG. 36 is constituted in the same manner as the table creation means 85 shown in FIG. 21, except that the sample holding circuit 102 is added. The test signal S10 of the same type as in the embodiment shown in FIG. 34 is used also in this embodiment. In the course of creation of the V-P characteristics correction table 84, the tables for converting 1024 signal values Vin(n) into the values V(n) which are created in the RAM 79 in the same manner as mentioned with reference to FIG. 21 are sent to the RAM constituting the correction table 40 via the signal line 80, and are set as the V-P characteristics correction table 84.

Also in the embodiment shown in FIG. 36, the sample holding circuit 102 is provided as in the embodiment shown in FIG. 34. The sample holding circuit 102 sample-holds the output of the current-to-voltage conversion amplifier 54 at the time a period equal to a time constant $\tau$ of the transitional temperature increase of the semiconductor laser 1 has elapsed after the input of each level of the test signal S10, and feeds the sample-held output to the comparator 77. Accordingly, also in this case, the V-P characteristics correction table 84 capable of achieving the correction accurately can be obtained.

Figure 37:
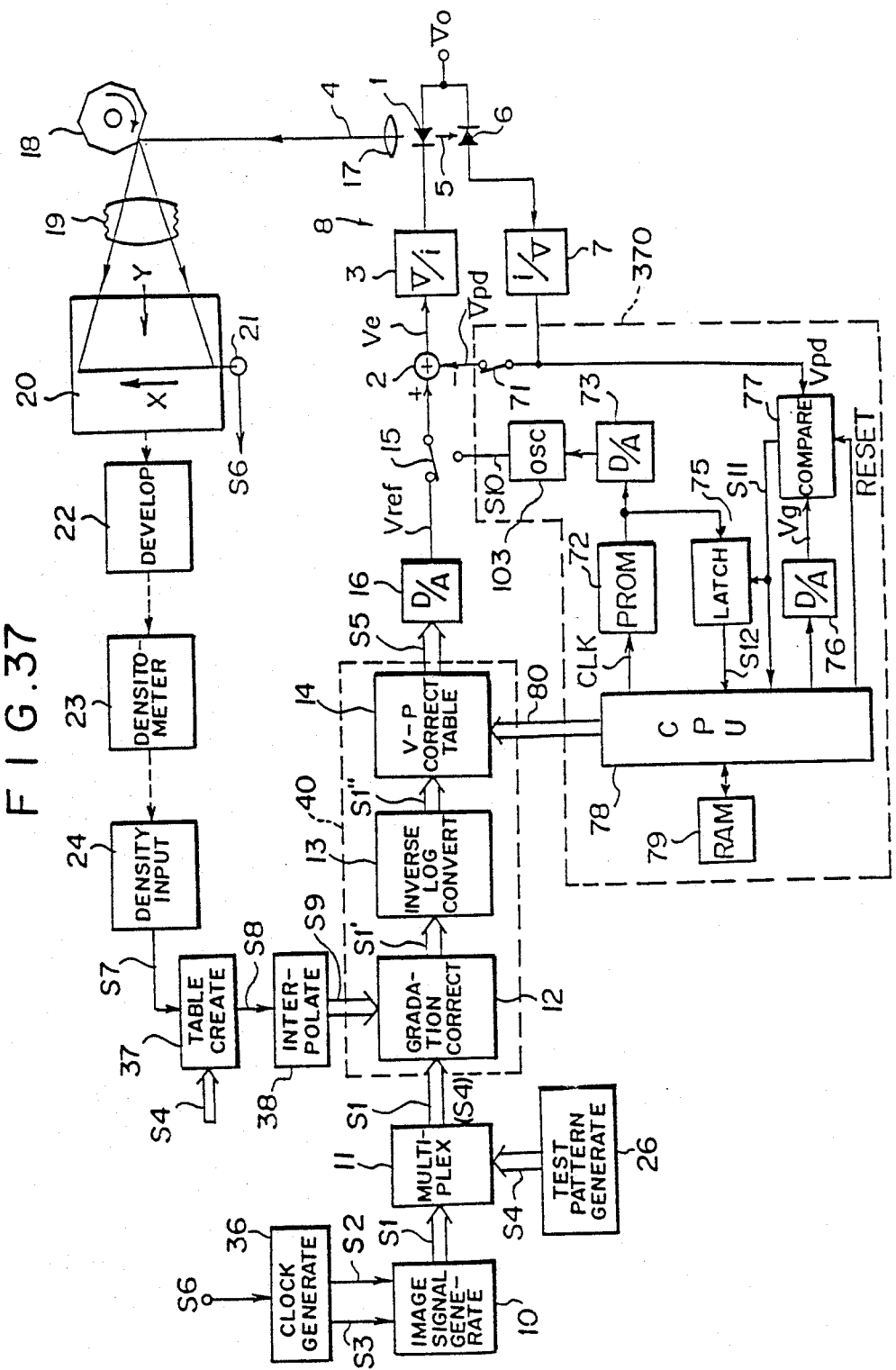
FIG. 37 is a schematic view showing an embodiment of the tenth laser beam recording apparatus in accordance with the present invention.

An embodiment of the tenth laser beam recording apparatus in accordance with the present invention will hereinbelow be described with reference to FIG. 37. In FIG. 37, similar elements are numbered with the same reference numerals with respect to FIG. 16. A table creation means 370 in this embodiment is constituted in the same manner as the table creation means 70 shown in FIG. 16, except that a pulse oscillator 103 is provided instead of the amplifier 74 and a test signal comprising pulses is used as the test signal S10. The level of the test signal S10 increases step-wise with the passage of time. Specifically, the PROM 72 stores progressions which are arithmetical on the logarithmic axis, and the progressions are sequentially accessed by the clock CLK. The digital values thus read from the PROM 72 are converted into analog values by the D/A converter 73 and then fed as a pulse amplitude control signal to the pulse oscillator 103. As a result, the test signal S10 comprising the pulses whose voltage value V (amplitude) increases step-wise with the increase of the number of pulses of the clock CLK, i.e. with the passage of time, as shown in FIG. 38 is obtained. Instead of the light emission level instructing signal Vref, the test signal S10 thus obtained is fed to the addition point 2 via the signal change-over switch 15 in the same manner as in the embodiment shown in FIG. 16. The tables for converting 1024 signal values Vin(n) to V(n) created in the RAM 79 by the calculation expressed as $$V(n) = Vg(n) + \Delta V(n)$$

in the same manner as with the table creation means 70 in the embodiment shown in FIG. 16 are sent to the RAM constituting the correction table 40 via the signal line 80, and are set as the V-P characteristics correction table 14.

In this embodiment, the V-P characteristics correction table 14 is formed as described below so that the optical output characteristics of the semiconductor laser 1 with respect to the light emission level instructing signal can be particularly accurately corrected to the linear characteristics. As one of the requirements of this embodiment, each level of the test signal S10 is output as the pulse signal as mentioned above. Therefore, the semiconductor laser 1 is turned on pulse-wise in the course of creation of the V-P characteristics correction table 14. The pulse turn-on period is adjusted to a value substantially shorter than the optical output change period of the semiconductor laser 1 based on the drooping characteristics. Also, by way of example, the pulse turn-on duty ratio is adjusted to 40%. On the other hand, in the course of image recording, the semiconductor laser 1 is turned on continuously for each picture element recording (i.e. in a duty ratio of 100%). Also, the temperature in the case housing the semiconductor laser 1 is controlled at 48° C. by an ordinarily used means.

On the other hand, the timing of the comparison of the feedback signal Vpd with the reference signal Vg in the comparator 77 of the table creation means 370 is adjusted so that the comparison is carried out at the time the optical output of the semiconductor laser 1 has converged to the steady condition via the transitional change as shown in FIG. 7C.

With reference to FIG. 7B, it has been found that the extent of increase in the temperature of the laser diode chip arising when the current is applied step-wise to the semiconductor laser 1 is approximately 10° C. for the ordinary semiconductor laser. Also, as indicated by the chain line in FIG. 29, the optical output of the semiconductor laser 1 undershoots when the applied current is intercepted step-wise after the optical output of the semiconductor laser 1 has converged to the steady condition. It has been found that the extent of decrease in the optical output caused by undershooting corresponds to the extent of the decrease arising in the case where the temperature of the laser diode chip increases by approximately 2° C. Consequently, even though the control for maintaining the temperature in the case housing of the semiconductor laser 1 at 48° C. is carried out in the course of image recording, there is the risk of the optical output of the semiconductor laser 1 decreasing to the optical output corresponding to the case where the temperature in the case housing of the semiconductor laser 1 is higher by 12° C. than 48° C. Accordingly, when the laser beam intensity is measured at the time the temperature in the case housing of the semiconductor laser 1 has changed by a half of the aforesaid change width, i.e. at the time the temperature is equal to $60 - (60-48)/2 = 54°$ C., in the course of creation of the V-P characteristics correction table 14, the correction table 14 capable of achieving the correction accurately even though the recording timing for a single picture element in the course of image recording fluctuates can be obtained.

In the case where the semiconductor laser 1 is turned on pulse-wise in the duty ratio of 40% as mentioned above, the extent of increase in the temperature of the semiconductor laser 1 is 40% of the extent of the temperature increase arising when the semiconductor laser 1 is turned on continuously. Specifically, the temperature in the case housing of the semiconductor laser 1 changes as indicated by the broken line in FIG. 29 in the course of creation of the V-P characteristics correction table 14 as if the control were carried out for adjusting the temperature in the case housing of the semiconductor laser 1 at 44° C. $[=48-(58-48)\times 0.4]$. In this condition, the intensity of the laser beam 4 is measured at the time the optical output of the semiconductor laser 1 has converged to the steady condition. As a result, as indicated by the arrow A in FIG. 29, the laser beam intensity at the time the temperature in the case housing of the semiconductor laser 1 is 54° C. is measured. Accordingly, in the embodiment shown in FIG. 37, the correction table 14 capable of achieving the correction accurately can be obtained.

Figure 39:
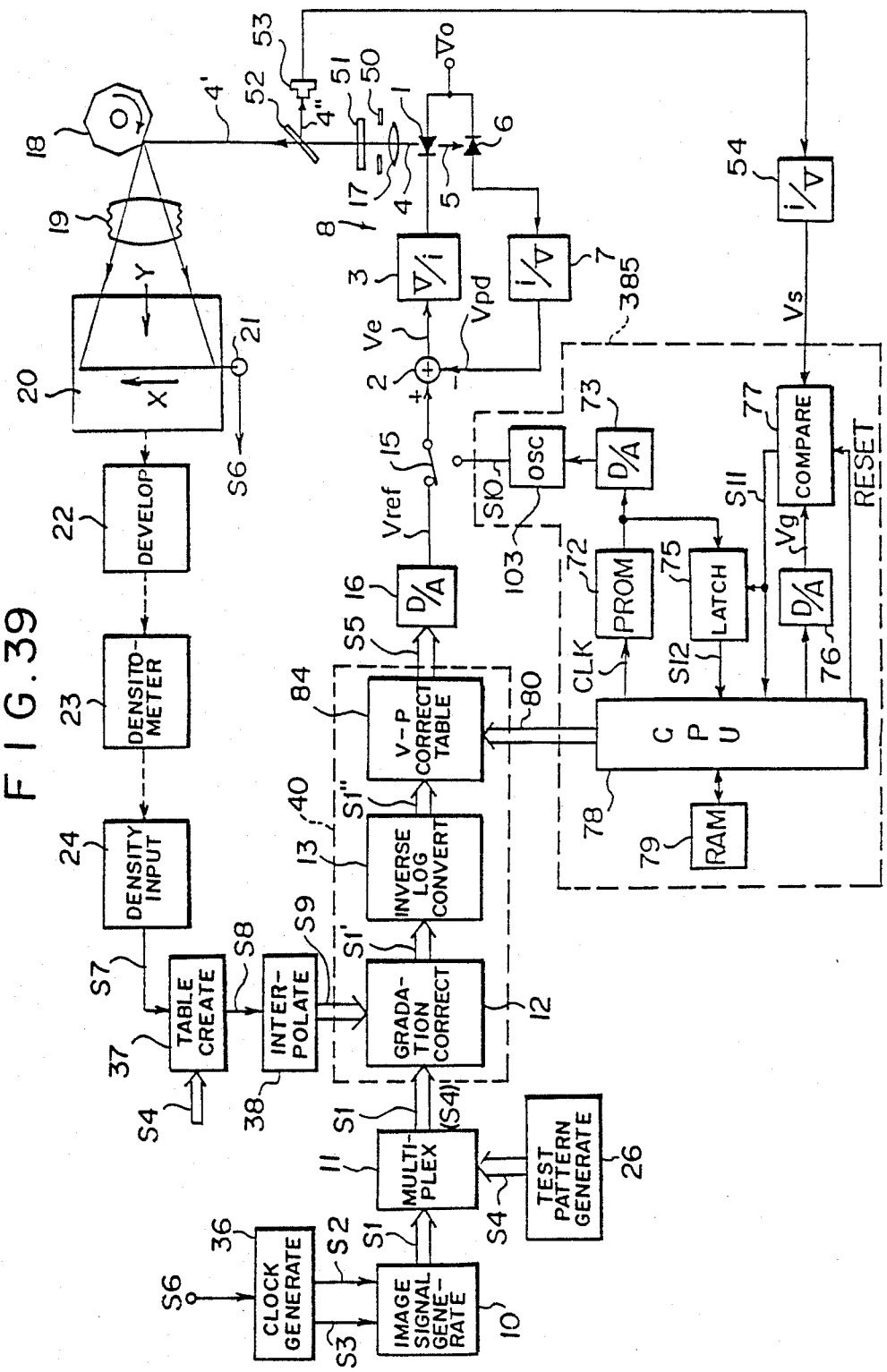
FIG. 39 is a schematic view showing another embodiment of the tenth laser beam recording apparatus in accordance with the present invention.

FIG. 39 shows another embodiment of the tenth laser beam recording apparatus in accordance with the present invention. In FIG. 39, similar elements are numbered with the same reference numerals with respect to FIG. 37. Though the nonlinearity of the optical output characteristics of the semiconductor laser 1 with respect to the drive current is eliminated in the embodiment shown in FIG. 37, the nonlinearity of the optical transmittance characteristics of the optical element of the beam scanning system with respect to the incident light intensity is also eliminated in the embodiment shown in FIG. 39.

In the embodiment shown in FIG. 39, the aperture stop plate 50, the polarizing filter 51, the semi-transparent mirror 52, the photodetector 53, the current-to-voltage conversion amplifier 54, and the V-P characteristics correction table 84 of the same type as in FIG. 21 are provided. A table creation means 385 shown in FIG. 39 is constituted in the same manner as the table creation means 85 shown in FIG. 21, except that the pulse oscillator 103 is provided instead of the amplifier 74 and the test signal of the same type as in the embodiment shown in FIG. 37 is used as the test signal S10. In the course of creation of the V-P characteristics correction table 84, the tables for converting 1024 signal values Vin(n) into the values V(n) which are created in the RAM 79 in the same manner as mentioned with reference to FIG. 21 are sent to the RAM constituting the correction table 40 via the signal line 80, and are set as the V-P characteristics correction table 84.

Also in the embodiment shown in FIG. 39, the semiconductor laser 1 is turned on pulse-wise with the short turn-on period in the same manner as in the embodiment shown in FIG. 37. Also, as in the embodiment shown in FIG. 37, the timing of comparison of the scanning beam intensity signal Vs with the reference signal Vg in the course of creation of the V-P characteristics correction table 84 carried out in the same manner as mentioned with reference to FIG. 21 is adjusted so that the comparison is effected at the time the optical output of the semiconductor laser 1 has converged to the steady condition via the transitional changes as shown in FIG. 7C. Accordingly, also in this case, the V-P characteristics correction table 84 capable of achieving the correction accurately can be obtained.

In the embodiments shown in FIGS. 37 and 39, the pulse turn-on duty ratio of the semiconductor laser 1 is adjusted by taking the aforesaid effects of undershooting into consideration. However, the effects of undershooting need not necessarily be taken into consideration.

We claim:

1. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam, wherein the improvement comprises the steps of:
(i) detecting the optical intensity of said laser beam, and feeding back a feedback signal corresponding to the detected optical intensity to said light emission level instructing signal, and
(ii) correcting said light emission level instructing signal by use of a correction table so as to compensate for nonlinearity of optical output characteristics of said semiconductor laser with respect to the drive current, thereby to make linear the relationship between the optical output of said semiconductor laser based on said corrected light emission level instructing signal and said uncorrected light emission level instructing signal.

2. A method as defined in claim 1 wherein said correction table is disposed in a stage prior to the stage for detecting the optical intensity of said laser beam and feeding back said feedback signal corresponding to the detected optical intensity to said light emission level instructing signal.

3. A method as defined in claim 1 wherein said correction table is disposed in a line branched from a line of said light emission level instructing signal and is constituted for calculating a correction amount for said light emission level instructing signal, and a correction signal representing said correction amount is added to said light emission level instructing signal.

4. A method as defined in claim 1 wherein said correction table is disposed in a line branched from a line of said light emission level instructing signal and is constituted for calculating a correction amount for said light emission level instructing signal and generating a current corresponding to said correction amount, and said current is added to said drive current for said semiconductor laser.

5. A laser beam recording apparatus provided with a semiconductor laser for emitting a laser beam, a beam scanning system for scanning the laser beam on a photosensitive material, and a laser operation control circuit for creating a light emission level instructing signal corresponding to an image signal, and controlling a drive current for the semiconductor laser on the basis of the light emission level instructing signal, thereby to modulate the optical intensity of the laser beam, wherein the improvement comprises providing said laser operation control circuit with:
(i) an optical output stabilizing circuit for detecting the optical intensity of said laser beam, and feeding back a feedback signal corresponding to the detected optical intensity to said light emission level instructing signal, and
(ii) a correction table for correcting said light emission level instructing signal so as to compensate for nonlinearity of optical output characteristics of said semiconductor laser with respect to the drive current, thereby to make linear the relationship between the optical output of said semiconductor laser based on said corrected light emission level instructing signal and said uncorrected light emission level instructing signal.

6. An apparatus as defined in claim 5 wherein said correction table is disposed in a stage prior to said optical output stabilizing circuit.

7. An apparatus as defined in claim 5 wherein said correction table is disposed in a line branched from a line of said light emission level instructing signal and is constituted for calculating a correction amount for said light emission level instructing signal, and a correction signal representing said correction amount is added to said light emission level instructing signal.

8. An apparatus as defined in claim 5 wherein said correction table is disposed in a line branched from a line of said light emission level instructing signal and is constituted for calculating a correction amount for said light emission level instructing signal and generating a current corresponding to said correction amount, and said current is added to said drive current for said semiconductor laser.

9. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam, wherein the improvement comprises the steps of:
(i) detecting the optical intensity of said laser beam, and feeding back a feedback signal corresponding to the detected optical intensity to said light emission level instructing signal, and
(ii) correcting said light emission level instructing signal by use of a correction table so as to compensate for nonlinearity of optical output characteristics of said semiconductor laser with respect to the drive current and nonlinearity of optical transmittance characteristics of an optical element of said beam scanning system with respect to the incident light intensity, thereby to make linear the relationship between the intensity of the scanning beam based on said corrected light emission level instructing signal and said uncorrected light emission level instructing signal.

10. A method as defined in claim 9 wherein said correction table is disposed in a stage prior to the stage for detecting the optical intensity of said laser beam and feeding back said feedback signal corresponding to the detected optical intensity to said light emission level instructing signal.

11. A method as defined in claim 9 wherein said correction table is disposed in a line branched from a line of said light emission level instructing signal and is constituted for calculating a correction amount for said light emission level instructing signal, and a correction signal representing said correction amount is added to said light emission level instructing signal.

12. A method as defined in claim 9 wherein said correction table is disposed in a line branched from a line of said light emission level instructing signal and is constituted for calculating a correction amount for said light emission level instructing signal and generating a current corresponding to said correction amount, and said current is added to said drive current for said semiconductor laser.

13. A laser beam recording apparatus provided with a semiconductor laser for emitting a laser beam, a beam scanning system for scanning the laser beam on a photosensitive material and comprising an optical element whose optical transmittance characteristics with respect to the incident light intensity are nonlinear, and a laser operation control circuit for creating a light emission level instructing signal corresponding to an image signal, and controlling a drive current for the semiconductor laser on the basis of the light emission level instructing signal, thereby to modulate the optical intensity of the laser beam,
    wherein the improvement comprises providing said laser operation control circuit with:
    (i) an optical output stabilizing circuit for detecting the optical intensity of said laser beam, and feeding back a feedback signal corresponding to the detected optical intensity to said light emission level instructing signal, and
    (ii) a correction table for correcting said light emission level instructing signal so as to compensate for nonlinearity of optical output characteristics of said semiconductor laser with respect to the drive current and nonlinearity of the optical transmittance characteristics of said optical element of said beam scanning system with respect to the incident light intensity, thereby to make linear the relationship between the intensity of the scanning beam based on said corrected light emission level instructing signal and said uncorrected light emission level instructing signal.

14. An apparatus as defined in claim 13 wherein said correction table is disposed in a stage prior to said optical output stabilizing circuit.

15. An apparatus as defined in claim 13 wherein said correction table is disposed in a line branched from a line of said light emission level instructing signal and is constituted for calculating a correction amount for said light emission level instructing signal, and a correction signal representing said correction amount is added to said light emission level instructing signal.

16. An apparatus as defined in claim 13 wherein said correction table is disposed in a line branched from a line of said light emission level instructing signal and is constituted for calculating a correction amount for said light emission level instructing signal and generating a current corresponding to said correction amount, and said current is added to said drive current for said semiconductor laser.

17. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam,
    wherein the improvement comprises the steps of:
    (i) detecting the optical intensity of said laser beam, and feeding back a feedback signal corresponding to the detected optical intensity to said light emission level instructing signal,
    (ii) correcting said light emission level instructing signal by use of a correction table so as to compensate for nonlinearity of optical output characteristics of said semiconductor laser with respect to the drive current, thereby to make linear the relationship between the optical output of said semiconductor laser based on said corrected light emission level instructing signal and said uncorrected light emission level instructing signal, and
    (iii) feeding a test signal whose level changes to said laser operation control circuit, and creating said correction table on the basis of the relationship between the intensity of said laser beam and said test signal at the time said test signal is fed to said laser operation control circuit.

18. A method as defined in claim 17 wherein said correction table is disposed in a stage prior to the stage for detecting the optical intensity of said laser beam and feeding back said feedback signal corresponding to the detected optical intensity to said light emission level instructing signal.

19. A method as defined in claim 17 wherein said correction table is disposed in a line branched from a line of said light emission level instructing signal and is constituted for calculating a correction amount for said light emission level instructing signal, and a correction signal representing said correction amount is added to said light emission level instructing signal.

20. A method as defined in claim 17 wherein said correction table is disposed in a line branched from a line of said light emission level instructing signal and is constituted for calculating a correction amount for said light emission level instructing signal and generating a current corresponding to said correction amount, and said current is added to said drive current for said semiconductor laser.

21. A laser beam recording apparatus provided with a semiconductor laser for emitting a laser beam, a beam scanning system for scanning the laser beam on a photosensitive material, and a laser operation control circuit for creating a light emission level instructing signal corresponding to an image signal, and controlling a drive current for the semiconductor laser on the basis of the light emission level instructing signal, thereby to modulate the optical intensity of the laser beam,
    wherein the improvement comprises the provision of:
    (i) said laser operation control circuit provided with:
        (a) an optical output stabilizing circuit for detecting the optical intensity of said laser beam, and feeding back a feedback signal corresponding to the detected optical intensity to said light emission level instructing signal, and
        (b) a correction table for correcting said light emission level instructing signal so as to compensate for nonlinearity of optical output characteristics of said semiconductor laser with respect to the drive current, thereby to make linear the relationship between the optical output of said semiconductor laser based on said corrected light emission level instructing signal and said uncorrected light emission level instructing signal, and
    (ii) a table creation means for feeding a test signal whose level changes to said laser operation control circuit, and creating said correction table on the basis of the relationship between the intensity of said laser beam and said test signal at the time said test signal is fed to said laser operation control circuit.

22. An apparatus as defined in claim 21 wherein said table creation means comprises:

(a) a switch for opening a feedback line of said feedback signal in the course of the creation of said correction table,
(b) a test signal generating means for generating said test signal whose level changes with the passage of time,
(c) a reference signal generating means for generating a reference signal corresponding to said light emission level instructing signal so that the level of said reference signal changes step-wise,
(d) a comparator for comparing each level of said reference signal with said feedback signal, and generating a coincidence signal when the level of said reference signal and the level of said feedback signal coincide with each other,
(e) a signal holding means connected to said comparator and said test signal generating means for holding the level of said test signal until the time said coincidence signal is fed to said signal holding means, and
(f) a table creating means for creating a table of such characteristics that said reference signal is converted to a signal obtained by adding the held test signal to said reference signal, on the basis of said held test signal generated by said signal holding means and said reference signal, and for setting the table thus created as said correction table.

23. An apparatus as defined in claim 21 wherein said table creation means comprises:
(a) a test signal generating means for generating said test signal whose level changes with the passage of time,
(b) a reference signal generating means for generating a reference signal corresponding to said light emission level instructing signal so that the level of said reference signal changes step-wise,
(c) a comparator for comparing each level of said reference signal with said feedback signal, and generating a coincidence signal when the level of said reference signal and the level of said feedback signal coincide with each other,
(d) a signal holding means connected to said comparator and said test signal generating means for holding the level of said test signal until the time said coincidence signal is fed to said signal holding means, and
(e) a table creating means for creating a table of such characteristics that said reference signal is converted to the held test signal, on the basis of said held test signal generated by said signal holding means and said reference signal, and for setting the table thus created as said correction table.

24. An apparatus as defined in claim 21 wherein said correction table is disposed in a stage prior to said optical output stabilizing circuit.

25. An apparatus as defined in claim 21 wherein said correction table is disposed in a line branched from a line of said light emission level instructing signal and is constituted for calculating a correction amount for said light emission level instructing signal, and a correction signal representing said correction amount is added to said light emission level instructing signal.

26. An apparatus as defined in claim 21 wherein said correction table is disposed in a line branched from a line of said light emission level instructing signal and is constituted for calculating a correction amount for said light emission level instructing signal and generating a current corresponding to said correction amount, and said current is added to said drive current for said semiconductor laser.

27. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam,
wherein the improvement comprises the steps of:
(i) detecting the optical intensity of said laser beam, and feeding back a feedback signal corresponding to the detected optical intensity to said light emission level instructing signal,
(ii) correcting said light emission level instructing signal by use of a correction table so as to compensate for nonlinearity of optical output characteristics of said semiconductor laser with respect to the drive current and nonlinearity of optical transmittance characteristics of an optical element of said beam scanning system with respect to the incident light intensity, thereby to make linear the relationship between the intensity of the scanning beam based on said corrected light emission level instructing signal and said uncorrected light emission level instructing signal, and
(iii) feeding a test signal whose level changes to said laser operation control circuit, and creating said correction table on the basis of the relationship between the intensity of said laser beam and said test signal at the time said test signal is fed to said laser operation control circuit.

28. A method as defined in claim 27 wherein said correction table is disposed in a stage prior to the stage for detecting the optical intensity of said laser beam and feeding back said feedback signal corresponding to the detected optical intensity to said light emission level instructing signal.

29. A laser beam recording apparatus provided with a semiconductor laser for emitting a laser beam, a beam scanning system for scanning the laser beam on a photosensitive material and comprising an optical element whose optical transmittance characteristics with respect to the incident light intensity are nonlinear, and a laser operation control circuit for creating a light emission level instructing signal corresponding to an image signal, and controlling a drive current for the semiconductor laser on the basis of the light emission level instructing signal, thereby to modulate the optical intensity of the laser beam,
wherein the improvement comprises the provision of:
(i) said laser operation control circuit provided with:
(a) an optical output stabilizing circuit for detecting the optical intensity of said laser beam, and feeding back a feedback signal corresponding to the detected optical intensity to said light emission level instructing signal, and
(b) a correction table for correcting said light emission level instructing signal so as to compensate for nonlinearity of optical output characteristics of said semiconductor laser with respect to the drive current and nonlinearity of the optical transmittance characteristics of said optical element of said beam scanning system with respect to the incident light intensity, thereby to make linear the relationship between the intensity of the scanning beam based on said corrected light emission level instructing signal and said uncorrected light emission level instructing signal, and (ii) a table creation means for feeding a test signal whose level changes to said laser operation control circuit, and creating said correction table on the basis of the relationship between the intensity of said scanning beam and said test signal at the time said test signal is fed to said laser operation control circuit.

30. An apparatus as defined in claim 29 wherein said table creation means comprises:

(a) a light detecting means for detecting the intensity of said scanning beam and generating a scanning beam intensity signal, (b) a test signal generating means for generating said test signal whose level changes with the passage of time, (c) a reference signal generating means for generating a reference signal corresponding to said light emission level instructing signal so that the level of said reference signal changes step-wise, (d) a comparator for comparing each level of said reference signal with said scanning beam intensity signal, and generating a coincidence signal when the level of said reference signal and the level of said scanning beam intensity signal coincide with each other, (e) a signal holding means connected to said comparator and said test signal generating means for holding the level of said test signal until the time said coincidence signal is fed to said signal holding means, and (f) a table creating means for creating a table of such characteristics that said reference signal is converted to the held test signal, on the basis of said held test signal generated by said signal holding means and said reference signal, and for setting the table thus created as said correction table.

31. An apparatus as defined in claim 29 wherein said correction table is disposed in a stage prior to said optical output stabilizing circuit.

32. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam, wherein the improvement comprises the steps of:

(i) detecting the optical intensity of said laser beam, and feeding back a feedback signal corresponding to the detected optical intensity to said light emission level instructing signal, and (ii) correcting said light emission level instructing signal by use of a correction table so as to compensate for nonlinearity of optical transmittance characteristics of an optical element of said beam scanning system with respect to the incident light intensity, thereby to make linear the relationship between the intensity of the scanning beam based on said corrected light emission level instructing signal and said uncorrected light emission level instructing signal.

33. A method as defined in claim 32 wherein said correction table is disposed in a stage prior to the stage for detecting the optical intensity of said laser beam and feeding back said feedback signal corresponding to the detected optical intensity to said light emission level instructing signal.

34. A laser beam recording apparatus provided with a semiconductor laser for emitting a laser beam, a beam scanning system for scanning the laser beam on a photosensitive material and comprising an optical element whose optical transmittance characteristics with respect to the incident light intensity are nonlinear, and a laser operation control circuit for creating a light emission level instructing signal corresponding to an image signal, and controlling a drive current for the semiconductor laser on the basis of the light emission level instructing signal, thereby to modulate the optical intensity of the laser beam, wherein the improvement comprises providing said laser operation control circuit with:

(i) an optical output stabilizing circuit for detecting the optical intensity of said laser beam, and feeding back a feedback signal corresponding to the detected optical intensity to said light emission level instructing signal, and (ii) a correction table for correcting said light emission level instructing signal so as to compensate for nonlinearity of the optical transmittance characteristics of said optical element of said beam scanning system with respect to the incident light intensity, thereby to make linear the relationship between the intensity of the scanning beam based on said corrected light emission level instructing signal and said uncorrected light emission level instructing signal.

35. An apparatus as defined in claim 34 wherein said correction table is disposed in a stage prior to said optical output stabilizing circuit.

36. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam, wherein the improvement comprises the steps of:

(i) detecting the optical intensity of said laser beam after passage through an optical element of said beam scanning system, and feeding back a feedback signal corresponding to the detected optical intensity to said light emission level instructing signal, and (ii) correcting said light emission level instructing signal by use of a correction table so as to compensate for nonlinearity of optical output characteristics of said semiconductor laser with respect to the drive current and nonlinearity of optical transmittance characteristics of said optical element of said beam scanning system with respect to the incident light intensity, thereby to make linear the relationship between the intensity of the scanning beam based on said corrected light emission level instructing signal and said uncorrected light emission level instructing signal.

37. A method as defined in claim 36 wherein said correction table is disposed in a stage prior to the stage for detecting the optical intensity of said laser beam and feeding back said feedback signal corresponding to the detected optical intensity to said light emission level instructing signal.

38. A method as defined in claim 36 wherein said correction table is disposed in a line branched from a line of said light emission level instructing signal and is constituted for calculating a correction amount for said light emission level instructing signal, and a correction signal representing said correction amount is added to said light emission level instructing signal.

39. A method as defined in claim 36 wherein said correction table is disposed in a line branched from a line of said light emission level instructing signal and is constituted for calculating a correction amount for said light emission level instructing signal and generating a current corresponding to said correction amount, and said current is added to said drive current for said semiconductor laser.

40. A laser beam recording apparatus provided with a semiconductor laser for emitting a laser beam, a beam scanning system for scanning the laser beam on a photosensitive material and comprising an optical element whose optical transmittance characteristics with respect to the incident light intensity are nonlinear, and a laser operation control circuit for creating a light emission level instructing signal corresponding to an image signal, and controlling a drive current for the semiconductor laser on the basis of the light emission level instructing signal, thereby to modulate the optical intensity of the laser beam,
wherein the improvement comprises providing said laser operation control circuit with:
(i) an optical output stabilizing circuit for detecting the optical intensity of said laser beam after passage through said optical element of said beam scanning system, and feeding back a feedback signal corresponding to the detected optical intensity to said light emission level instructing signal, and
(ii) a correction table for correcting said light emission level instructing signal so as to compensate for nonlinearity of optical output characteristics of said semiconductor laser with respect to the drive current and nonlinearity of the optical transmittance characteristics of said optical element of said beam scanning system with respect to the incident light intensity, thereby to make linear the relationship between the intensity of the scanning beam based on said corrected light emission level instructing signal and said uncorrected light emission level instructing signal.

41. An apparatus as defined in claim 40 wherein said correction table is disposed in a stage prior to said optical output stabilizing circuit.

42. An apparatus as defined in claim 40 wherein said correction table is disposed in a line branched from a line of said light emission level instructing signal and is constituted for calculating a correction amount for said light emission level instructing signal, and a correction signal representing said correction amount is added to said light emission level instructing signal.

43. An apparatus as defined in claim 40 wherein said correction table is disposed in a line branched from a line of said light emission level instructing signal and is constituted for calculating a correction amount for said light emission level instructing signal and generating a current corresponding to said correction amount, and said current is added to said drive current for said semiconductor laser.

44. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam,
wherein the improvement comprises the steps of:
(i) detecting the optical intensity of said laser beam, and feeding back a feedback signal corresponding to the detected optical intensity to said light emission level instructing signal,
(ii) correcting said light emission level instructing signal by use of a correction table so as to compensate for nonlinearity of optical output characteristics of said semiconductor laser with respect to the drive current and/or nonlinearity of optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and
(iii) in the course of feeding a test signal whose level changes to said laser operation control circuit and creating said correction table on the basis of the relationship between the intensity of said laser beam and said test signal at the time said test signal is fed to said laser operation control circuit, controlling so that the temperature in a case housing of said semiconductor laser is maintained at a predetermined temperature lower than a setting temperature at the time of image recording, and measuring the intensity of said laser beam at the time the optical output of said semiconductor laser has converged nearly to a steady condition.

45. A method as defined in claim 44 wherein said correction table is disposed in a stage prior to the stage for detecting the optical intensity of said laser beam and feeding back said feedback signal corresponding to the detected optical intensity to said light emission level instructing signal.

46. A laser beam recording apparatus provided with a semiconductor laser for emitting a laser beam, a beam scanning system for scanning the laser beam on a photosensitive material, and a laser operation control circuit for creating a light emission level instructing signal corresponding to an image signal, and controlling a drive current for the semiconductor laser on the basis of the light emission level instructing signal, thereby to modulate the optical intensity of the laser beam,
wherein the improvement comprises the provision of:
(i) said laser operation control circuit provided with:
(a) an optical output stabilizing circuit for detecting the optical intensity of said laser beam, and feeding back a feedback signal corresponding to the detected optical intensity to said light emission level instructing signal, and
(b) a correction table for correcting said light emission level instructing signal so as to compensate for nonlinearity of optical output characteristics of said semiconductor laser with respect to the drive current and/or nonlinearity of the optical transmittance characteristics of an optical element of said beam scanning system with respect to the incident light intensity, thereby to make linear the relationship between the intensity of the laser beam based on said corrected light emission level instructing signal and said uncorrected light emission level instructing signal, (ii) a table creation means for feeding a test signal whose level changes to said laser operation control circuit, and creating said correction table on the basis of the relationship between the intensity of said laser beam and said test signal at the time said test signal is fed to said laser operation control circuit, and (iii) a temperature control means for maintaining the temperature in a case housing of said semiconductor laser at a setting temperature, and changing said setting temperature to a value at the time of image recording and to a value lower than said value at the time of image recording, said table creation means being formed for measuring the intensity of said scanning beam at the time the optical output of said semiconductor laser has converged nearly to a steady condition.

47. An apparatus as defined in claim 46 wherein said table creation means comprises:

(a) a switch for opening a feedback line of said feedback signal in the course of the creation of said correction table, (b) a test signal generating means for generating said test signal whose level changes with the passage of time, (c) a reference signal generating means for generating a reference signal corresponding to said light emission level instructing signal so that the level of said reference signal changes step-wise, (d) a comparator for comparing each level of said reference signal with said feedback signal, and generating a coincidence signal when the level of said reference signal and the level of said feedback signal coincide with each other, (e) a signal holding means connected to said comparator and said test signal generating means for holding the level of said test signal until the time said coincidence signal is fed to said signal holding means, and (f) a table creating means for creating a table of such characteristics that said reference signal is converted to a signal obtained by adding the held test signal to said reference signal, on the basis of said held test signal generated by said signal holding means and said reference signal, and for setting the table thus created as said correction table.

48. An apparatus as defined in claim 46 wherein said table creation means comprises:

(a) a light detecting means for detecting the intensity of the scanning beam and generating a scanning beam intensity signal, (b) a test signal generating means for generating said test signal whose level changes with the passage of time, (c) a reference signal generating means for generating a reference signal corresponding to said light emission level instructing signal so that the level of said reference signal changes step-wise, (d) a comparator for comparing each level of said reference signal with said scanning beam intensity signal, and generating a coincidence signal when the level of said reference signal and the level of said scanning beam intensity signal coincide with each other, (e) a signal holding means connected to said comparator and said test signal generating means for holding the level of said test signal until the time said coincidence signal is fed to said signal holding means, and (f) a table creating means for creating a table of such characteristics that said reference signal is converted to the held test signal, on the basis of said held test signal generated by said signal holding means and said reference signal, and for setting the table thus created as said correction table.

49. An apparatus as defined in claim 46 wherein said correction table is disposed in a stage prior to said optical output stabilizing circuit.

50. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam, wherein the improvement comprises the steps of:

(i) detecting the optical intensity of said laser beam, and feeding back a feedback signal corresponding to the detected optical intensity to said light emission level instructing signal, (ii) correcting said light emission level instructing signal by use of a correction table so as to compensate for nonlinearity of optical output characteristics of said semiconductor laser with respect to the drive current and/or nonlinearity of optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and (iii) in the course of feeding a test signal whose level changes to said laser operation control circuit and creating said correction table on the basis of the relationship between the intensity of said laser beam and said test signal at the time said test signal is fed to said laser operation control circuit, measuring the intensity of said laser beam by applying peak holding to the measurement signal of the intensity of said laser beam in a first period including rise timing of the optical output of said semiconductor laser by input of said test signal and in a second period after the optical output of said semiconductor laser has converged nearly to a steady condition, and creating said correction table on the basis of a laser beam intensity P3 expressed as $$P3 = P2 + k(P1 - P2) \quad [0.0 < k < 1.0]$$

where P1 denotes the laser beam intensity detected by applying peak holding in said first period, and P2 denotes the laser beam intensity detected by applying peak holding in said second period.

51. A method as defined in claim 50 wherein the value of k is adjusted to a value satisfying the condition of $0.2 < k < 0.6$.

52. A method as defined in claim 50 wherein the value of k is adjusted to 0.4.

53. A method as defined in claim 50 wherein said correction table is disposed in a stage prior to the stage for detecting the optical intensity of said laser beam and feeding back said feedback signal corresponding to the detected optical intensity to said light emission level instructing signal.

54. A laser beam recording apparatus provided with a semiconductor laser for emitting a laser beam, a beam scanning system for scanning the laser beam on a photosensitive material, and a laser operation control circuit for creating a light emission level instructing signal corresponding to an image signal, and controlling a drive current for the semiconductor laser on the basis of the light emission level instructing signal, thereby to modulate the optical intensity of the laser beam, wherein the improvement comprises the provision of:
(i) said laser operation control circuit provided with:
(a) an optical output stabilizing circuit for detecting the optical intensity of said laser beam, and feeding back a feedback signal corresponding to the detected optical intensity to said light emission level instructing signal, and
(b) a correction table for correcting said light emission level instructing signal so as to compensate for nonlinearity of optical output characteristics of said semiconductor laser with respect to the drive current and/or nonlinearity of the optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and
(ii) a table creation means for feeding a test signal whose level changes to said laser operation control circuit, and creating said correction table on the basis of the relationship between the intensity of said laser beam and said test signal at the time said test signal is fed to said laser operation control circuit, said table creation means being formed for measuring the intensity of said laser beam by applying peak holding to the measurement signal of the intensity of said laser beam in a first period including rise timing of the optical output of said semiconductor laser by input of said test signal and in a second period after the optical output of said semiconductor laser has converged nearly to a steady condition, and creating said correction table on the basis of a laser beam intensity P3 expressed as $$P3 = P2 + k(P1 - P2) \quad [0.0 < k < 1.0]$$

where P1 denotes the laser beam intensity detected by applying peak holding in said first period, and P2 denotes the laser beam intensity detected by applying peak holding in said second period.

55. An apparatus as defined in claim 54 wherein the value of k is adjusted to a value satisfying the condition of $0.2 < k < 0.6$.

56. An apparatus as defined in claim 54 wherein the value of k is adjusted to 0.4.

57. An apparatus as defined in claim 54 wherein said table creation means comprises:

(a) a switch for opening a feedback line of said feedback signal in the course of the creation of said correction table,
(b) a test signal generating means for generating said test signal whose level changes with the passage of time,
(c) a reference signal generating means for generating a reference signal corresponding to said light emission level instructing signal so that the level of said reference signal changes step-wise,
(d) a comparator for comparing each level of said reference signal with said feedback signal, and generating a coincidence signal when the level of said reference signal and the level of said feedback signal coincide with each other,
(e) a signal holding means connected to said comparator and said test signal generating means for holding the level of said test signal until the time said coincidence signal is fed to said signal holding means,
(f) a table creating means for creating a table of such characteristics that said reference signal is converted to a signal obtained by adding the held test signal to said reference signal, on the basis of said held test signal generated by said signal holding means and said reference signal, and for setting the table thus created as said correction table,
(g) a peak holding circuit for carrying out said application of peak holding to the measurement signal of the intensity of said laser beam, and
(h) a calculation circuit connected to said peak holding circuit and said comparator for calculating said laser beam intensity P3 and feeding a signal representing said laser beam intensity P3 as said feedback signal to said comparator.

58. An apparatus as defined in claim 54 wherein said table creation means comprises:
(a) a light detecting means for detecting the intensity of the scanning beam and generating a scanning beam intensity signal,
(b) a test signal generating means for generating said test signal whose level changes with the passage of time,
(c) a reference signal generating means for generating a reference signal corresponding to said light emission level instructing signal so that the level of said reference signal changes step-wise,
(d) a comparator for comparing each level of said reference signal with said scanning beam intensity signal, and generating a coincidence signal when the level of said reference signal and the level of said scanning beam intensity signal coincide with each other,
(e) a signal holding means connected to said comparator and said test signal generating means for holding the level of said test signal until the time said coincidence signal is fed to said signal holding means,
(f) a table creating means for creating a table of such characteristics that said reference signal is converted to the held test signal, on the basis of said held test signal generated by said signal holding means and said reference signal, and for setting the table thus created as said correction table,
(g) a peak holding circuit for carrying out said application of peak holding to the measurement signal of the intensity of said scanning beam, and (h) a calculation circuit connected to said peak holding circuit and said comparator for calculating the scanning beam intensity P3 and feeding a signal representing said scanning beam intensity P3 as said scanning beam intensity signal to said comparator.

59. An apparatus as defined in claim 54 wherein said correction table is disposed in a stage prior to said optical output stabilizing circuit.

60. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam, wherein the improvement comprises the steps of:
(i) detecting the optical intensity of said laser beam, and feeding back a feedback signal corresponding to the detected optical intensity to said light emission level instructing signal,
(ii) correcting said light emission level instructing signal by use of a correction table so as to compensate for nonlinearity of optical output characteristics of said semiconductor laser with respect to the drive current and/or nonlinearity of optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and
(iii) in the course of feeding a test signal whose level changes to said laser operation control circuit and creating said correction table on the basis of the relationship between the intensity of said laser beam and said test signal at the time said test signal is fed to said laser operation control circuit, measuring the intensity of said laser beam by sample holding the measurement signal of the intensity of said laser beam at the time a period approximately equal to the time constant of transitional temperature increase characteristics of said semiconductor laser has elapsed after the input of said test signal.

61. A method as defined in claim 60 wherein said correction table is disposed in a stage prior to the stage for detecting the optical intensity of said laser beam and feeding back said feedback signal corresponding to the detected optical intensity to said light emission level instructing signal.

62. A laser beam recording apparatus provided with a semiconductor laser for emitting a laser beam, a beam scanning system for scanning the laser beam on a photosensitive material, and a laser operation control circuit for creating a light emission level instructing signal corresponding to an image signal, and controlling a drive current for the semiconductor laser on the basis of the light emission level instructing signal, thereby to modulate the optical intensity of the laser beam, wherein the improvement comprises the provision of:
(i) said laser operation control circuit provided with:
(a) an optical output stabilizing circuit for detecting the optical intensity of said laser beam, and feeding back a feedback signal corresponding to the detected optical intensity to said light emission level instructing signal, and
(b) a correction table for correcting said light emission level instructing signal so as to compensate for nonlinearity of optical output characteristics of said semiconductor laser with respect to the drive current and/or nonlinearity of the optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and
(ii) a table creation means for feeding a test signal whose level changes to said laser operation control circuit, and creating said correction table on the basis of the relationship between the intensity of said laser beam and said test signal at the time said test signal is fed to said laser operation control circuit,
said table creation means being formed for measuring the intensity of said laser beam by sample holding the measurement signal of the intensity of said laser beam at the time a period approximately equal to the time constant of transitional temperature increase characteristics of said semiconductor laser has elapsed after the input of said test signal.

63. An apparatus as defined in claim 62 wherein said table creation means comprises:
(a) a switch for opening a feedback line of said feedback signal in the course of the creation of said correction table,
(b) a test signal generating means for generating said test signal whose level changes with the passage of time,
(c) a reference signal generating means for generating a reference signal corresponding to said light emission level instructing signal so that the level of said reference signal changes step-wise,
(d) a comparator for comparing each level of said reference signal with said feedback signal, and generating a coincidence signal when the level of said reference signal and the level of said feedback signal coincide with each other,
(e) a signal holding means connected to said comparator and said test signal generating means for holding the level of said test signal at the time said coincidence signal is fed to said signal holding means,
(f) a table creating means for creating a table of such characteristics that said reference signal is converted to a signal obtained by adding the held test signal to said reference signal, on the basis of said held test signal generated by said signal holding means and said reference signal, and for setting the table thus created as said correction table, and
(g) a sample holding circuit connected to said comparator for carrying out said sample holding of the measurement signal of the intensity of said laser beam, and feeding the sample-held signal as said feedback signal to said comparator.

64. An apparatus as defined in claim 62 wherein said table creation means comprises:
(a) a light detecting means for detecting the intensity of the scanning beam and generating a scanning beam intensity signal, (b) a test signal generating means for generating said test signal whose level changes with the passage of time, (c) a reference signal generating means for generating a reference signal corresponding to said light emission level instructing signal so that the level of said reference signal changes step-wise, (d) a comparator for comparing each level of said reference signal with said scanning beam intensity signal, and generating a coincidence signal when the level of said reference signal and the level of said scanning beam intensity signal coincide with each other, (e) a signal holding means connected to said comparator and said test signal generating means for holding the level of said test signal until the time said coincidence signal is fed to said signal holding means, (f) a table creating means for creating a table of such characteristics that said reference signal is converted to the held test signal, on the basis of said held test signal generated by said signal holding means and said reference signal, and for setting the table thus created as said correction table, and (g) a sample holding circuit connected to said comparator for carrying out said sample holding of the measurement signal of the intensity of said scanning beam, and feeding the sample-held signal as said scanning beam intensity signal to said comparator.

65. An apparatus as defined in claim 62 wherein said correction table is disposed in a stage prior to said optical output stabilizing circuit.

66. A laser beam recording method for recording a continuous tone image on a photosensitive material by scanning a laser beam emitted by a semiconductor laser on the photosensitive material by a beam scanning system, and controlling a drive current for the semiconductor laser by a laser operation control circuit on the basis of a light emission level instructing signal corresponding to an image signal, thereby to modulate the optical intensity of the laser beam, wherein the improvement comprises the steps of:
(i) detecting the optical intensity of said laser beam, and feeding back a feedback signal corresponding to the detected optical intensity to said light emission level instructing signal, (ii) correcting light emission level instructing signal by use of a correction table so as to compensate for nonlinearity of optical output characteristics of said semiconductor laser with respect to the drive current and/or nonlinearity of optical transmittance characteristics of an optical element of said beam scanning system with respect to the incident light intensity, thereby to make linear the relationship between the intensity of the laser beam based on said corrected light emission level instructing signal and said uncorrected light emission level instructing signal, and (iii) in the course of feeding a test signal whose level changes to said laser operation control circuit and creating said correction table on the basis of the relationship between the intensity of said laser beam and said test signal at the time said test signal is fed to said laser operation control circuit, turning on said semiconductor laser pulse-wise with a turn-on period substantially shorter than an optical output change period based on drooping characteristics of said semiconductor laser and in a duty ratio lower than the duty ratio at the time of image recording, and measuring the intensity of said laser beam at the time the optical output of said semiconductor laser has converged nearly to a steady condition.

67. A method as defined in claim 66 wherein said semiconductor laser is turned on continuously for each picture element in the course of image recording, and is turned on pulse-wise in a duty ratio of 40% in the course of creation of said correction table.

68. A method as defined in claim 66 wherein said correction table is disposed in a stage prior to the stage for detecting the optical intensity of said laser beam and feeding back said feedback signal corresponding to the detected optical intensity to said light emission level instructing signal.

69. A laser beam recording apparatus provided with a semiconductor laser for emitting a laser beam, a beam scanning system for scanning the laser beam on a photosensitive material, and a laser operation control circuit for creating a light emission level instructing signal corresponding to an image signal, and controlling a drive current for the semiconductor laser on the basis of the light emission level instructing signal, thereby to modulate the optical intensity of the laser beam, wherein the improvement comprises the provision of:
(i) said laser operation control circuit provided with:
(a) an optical output stabilizing circuit for detecting the optical intensity of said laser beam, and feeding back a feedback signal corresponding to the detected optical intensity to said light emission level instructing signal, and
(b) a correction table correcting said light emission level instructing signal so as to compensate for nonlinearity of optical output characteristics of said semiconductor laser with respect to the drive current and/or nonlinearity of the optical transmittance characteristics of an optical element of said beam scanning system with respect to the incident light intensity, thereby to make linear the relationship between the intensity of the laser beam based on said corrected light emission level instructing signal and said uncorrected light emission level instructing signal, (ii) a table creation means for feeding a test signal whose level changes to said laser operation control circuit, and creating said correction table on the basis of the relationship between the intensity of said laser beam and said test signal at the time said test signal is fed to said laser operation control circuit, and (iii) a pulse drive circuit for turning on said semiconductor laser pulse wise with a turn-on period substantially shorter than an optical output change period based on drooping characteristics of said semiconductor laser in the course of creation of said correction table, said table creation means being formed for measuring the intensity of said laser beam at the time the optical output of said semiconductor laser has converged nearly to a steady condition.

70. An apparatus as defined in claim 69 wherein said table creation means comprises:
(a) a switch for opening a feedback line of said feedback signal in the course of the creation of said correction table, (b) a test signal generating means for generating said test signal whose level changes with the passage of time,
(c) a reference signal generating means for generating a reference signal corresponding to said light emission level instructing signal so that the level of said reference signal changes step-wise,
(d) a comparator for comparing each level of said reference signal with said feedback signal, and generating a coincidence signal when the level of said reference signal and the level of said feedback signal coincide with each other,
(e) a signal holding means connected to said comparator and said test signal generating means for holding the level of said test signal until the time said coincidence signal is fed to said signal holding means, and
(f) a table creating means for creating a table of such characteristics that said reference signal is converted to a signal obtained by adding the held test signal to said reference signal, on the basis of said held test signal generated by said signal holding means and said reference signal, and for setting the table thus created as said correction table.

71. An apparatus as defined in claim 69 wherein said table creation means comprises:

(a) a light detecting means for detecting the intensity of the scanning beam and generating a scanning beam intensity signal,
(b) a test signal generating means for generating said test signal whose level changes with the passage of time,
(c) a reference signal generating means for generating a reference signal corresponding to said light emission level instructing signal so that the level of said reference signal changes step-wise,
(d) a comparator for comparing each level of said reference signal with said scanning beam intensity signal, and generating a coincidence signal when the level of said reference signal and the level of said scanning beam intensity signal coincide with each other,
(e) a signal holding means connected to said comparator and said test signal generating means for holding the level of said test signal until the time said coincidence signal is fed to said signal holding means, and
(f) a table creating means for creating a table of such characteristics that said reference signal is converted to the held test signal, on the basis of said held test signal generated by said signal holding means and said reference signal, and for setting the table thus created as said correction table.

72. An apparatus as defined in claim 69 wherein said correction table is disposed in a stage prior to said optical output stabilizing circuit.

* * * * *